US012464552B2

(12) United States Patent
Kusashima et al.

(10) Patent No.: US 12,464,552 B2
(45) Date of Patent: Nov. 4, 2025

(54) COMMUNICATION DEVICE AND COMMUNICATION METHOD

(71) Applicant: Sony Group Corporation, Tokyo (JP)

(72) Inventors: Naoki Kusashima, Tokyo (JP); Ren Sugai, Tokyo (JP); Hiroshi Harada, Kyoto (JP); Keiichi Mizutani, Kyoto (JP); Kyoya Teramae, Kyoto (JP)

(73) Assignee: SONY GROUP CORPORATION, Tokyo (JP)

( * ) Notice: Subject to any disclaimer, the term of this patent is extended or adjusted under 35 U.S.C. 154(b) by 517 days.

(21) Appl. No.: 17/912,039

(22) PCT Filed: Mar. 16, 2021

(86) PCT No.: PCT/JP2021/010666
§ 371 (c)(1),
(2) Date: Sep. 16, 2022

(87) PCT Pub. No.: WO2021/193251
PCT Pub. Date: Sep. 30, 2021

(65) Prior Publication Data
US 2023/0164824 A1 May 25, 2023

(30) Foreign Application Priority Data
Mar. 27, 2020 (JP) ................... 2020-058856

(51) Int. Cl.
*H04W 72/542* (2023.01)
*H04L 5/14* (2006.01)
(52) U.S. Cl.
CPC ............ *H04W 72/542* (2023.01); *H04L 5/14* (2013.01)

(58) Field of Classification Search
CPC ........................... H04W 72/542; H04W 16/10
See application file for complete search history.

(56) References Cited

U.S. PATENT DOCUMENTS

| 10,009,143 B2 | 6/2018 | Stirling-Gallacher |
| 2009/0156211 A1* | 6/2009 | Hande ............... H04W 36/22 455/436 |

(Continued)

FOREIGN PATENT DOCUMENTS

WO 2019/142512 A1 7/2019

OTHER PUBLICATIONS

International Search Report and Written Opinion mailed on Jun. 15, 2021, received for PCT Application PCT/JP2021/010666, filed on Mar. 16, 2021, 6 pages including English Translation.
(Continued)

*Primary Examiner* — Pamit Kaur
(74) *Attorney, Agent, or Firm* — XSENSUS LLP

(57) ABSTRACT

A communication device (200A) includes a communication unit (21) and a control unit (25). The communication unit (21) performs wireless communication with a first communication device (100) that supports in-band full-duplex (IBFD) communication that transmits and receives wireless signals using at least a part of resources of the same frequency and the same time. The control unit (25) measures channel quality with a first communication device (100) at each level of quality of service requested for the wireless communication with the first communication device (100) on the basis of interference from a second communication device (200B) that performs wireless communication with the first communication device (100).

13 Claims, 23 Drawing Sheets

(56) References Cited

U.S. PATENT DOCUMENTS

2017/0054544 A1\* 2/2017 Kazmi ...................... H04L 5/14
2018/0317123 A1\* 11/2018 Chen ..................... H04W 72/21
2019/0394758 A1\* 12/2019 Cheng .................. H04W 24/08

OTHER PUBLICATIONS

Cewit, "Proposals for Rel. 17", 3GPP TSG RAN #84, RP-191390, Jun. 3-6, 2019, 33 pages.
LG Electronics, "Motivation of flexible UL-DL Resource Allocation and Interference Mitigation", 3GPP TSG RAN #84 RP-191295, Jun. 3-6, 2019, 7 pages.
Intel Corporation: "DL shared channel enhancements for LTE UKLLC",3GPP Draft; R1-1802569 Intel-DL_Shared_LTE_URLLC, 3rd Generation Partnership Project (3GPP), Mobile Competence Centre ; 650, Route Des Lucioles ; F-06921 Sophia-Antipolis Cedex; France f vol. RAN WG1, No. Athens, Greece; Feb. 26, 2018-Mar. 2, 2018 Feb. 17, 2018 (Feb. 17, 2018), XP051398018. Retrieved from the Internet :\* Section 3 \*.

\* cited by examiner

FIG.26A

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 1 | GBR (NOTE 1) | 20 | 100 ms (NOTE 11, NOTE 13) | $10^{-2}$ | N/A | 2000 ms | Conversational Voice |
| 2 | | 40 | 150 ms (NOTE 11, NOTE 13) | $10^{-3}$ | N/A | 2000 ms | Conversational Video (Live Streaming) |
| 3 (NOTE 14) | | 30 | 50 ms (NOTE 11, NOTE 13) | $10^{-3}$ | N/A | 2000 ms | Real Time Gaming, V2X messages Electricity distribution-medium voltage, Process automation-monitoring |
| 4 | | 50 | 300 ms (NOTE 11, NOTE 13) | $10^{-6}$ | N/A | 2000 ms | Non-Conversational Video (Buffered Streaming) |
| 65 (NOTE 9, NOTE 12) | | 7 | 75 ms (NOTE 7, NOTE 8) | $10^{-2}$ | N/A | 2000 ms | Mission Critical user plane Push To Talk voice (e.g., MCPTT) |
| 66 (NOTE 12) | | 20 | 100 ms (NOTE 10, NOTE 13) | $10^{-2}$ | N/A | 2000 ms | Non-Mission-Critical user plane Push To Talk voice |
| 67 (NOTE 12) | | 15 | 100 ms (NOTE 10, NOTE 13) | $10^{-3}$ | N/A | 2000 ms | Mission Critical Video user plane |
| 75 (NOTE 14) | | | | | | | |

FIG.26B

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 5 | Non-GBR (NOTE 1) | 10 | 100 ms (NOTE 10, NOTE 13) | $10^{-6}$ | N/A | N/A | IMS Signalling |
| 6 | | 60 | 300 ms (NOTE 10, NOTE 13) | $10^{-6}$ | N/A | N/A | Video (Buffered Streaming) TCP-based (e.g., www, e-mail, chat, ftp, p2p file sharing, progressive video, etc.) |
| 7 | | 70 | 100 ms (NOTE 10, NOTE 13) | $10^{-3}$ | N/A | N/A | Voice, Video (Live Streaming) Interactive Gaming |
| 8 | | 80 | 300 ms (NOTE 13) | $10^{-6}$ | N/A | N/A | Video (Buffered Streaming) TCP-based (e.g., www, e-mail, chat, ftp, p2p file sharing, progressive video, etc.) |
| 9 | | 90 | | | | | |
| 69 (NOTE 9, NOTE 12) | | 5 | 60 ms (NOTE 7, NOTE 8) | $10^{-6}$ | N/A | N/A | Mission Critical delay sensitive signalling (e.g., MC-PTT signalling) |
| 70 (NOTE 12) | | 55 | 200 ms (NOTE 7, NOTE 10) | $10^{-6}$ | N/A | N/A | Mission Critical Data (e.g. example services are the same as 5QI 6/8/9) |
| 79 | | 65 | 50 ms (NOTE 10, NOTE 13) | $10^{-2}$ | N/A | N/A | V2X messages |
| 80 | | 68 | 10 ms (NOTE 5, NOTE 10) | $10^{-6}$ | N/A | N/A | Low Latency eMBB applications Augmented Reality |

FIG.26C

| 5QI Value | Resource Type | Default Priority Level | Packet Delay Budget | Packet Error Rate | Default Maximum Data Burst Volume (NOTE 2) | Default Averaging Window | Example Services |
|---|---|---|---|---|---|---|---|
| 82 | Delay Critical GBR | 19 | 10 ms (NOTE 4) | $10^{-4}$ | 255 bytes | 2000 ms | Discrete Automation (see TS 22.261 [2]) |
| 83 | | 22 | 10 ms (NOTE 4) | $10^{-4}$ | 1354 bytes (NOTE 3) | 2000 ms | Discrete Automation (see TS 22.261 [2]) |
| 84 | | 24 | 30 ms (NOTE 6) | $10^{-5}$ | 1354 bytes (NOTE 3) | 2000 ms | Intelligent transport systems (see TS 22.261 [2]) |
| 85 | | 21 | 5 ms (NOTE 5) | $10^{-5}$ | 255 bytes | 2000 ms | Electricity Distribution- high voltage (see TS 22.261 [2]) |

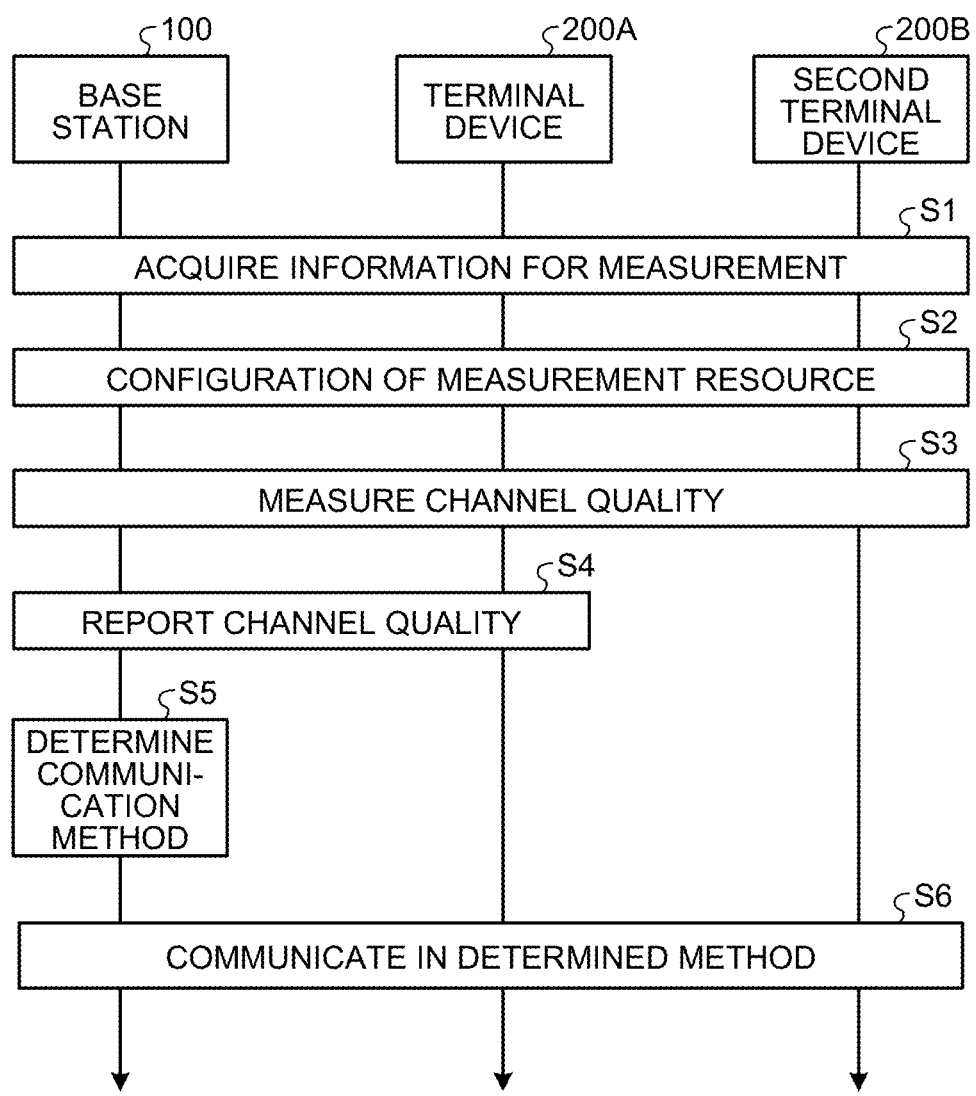

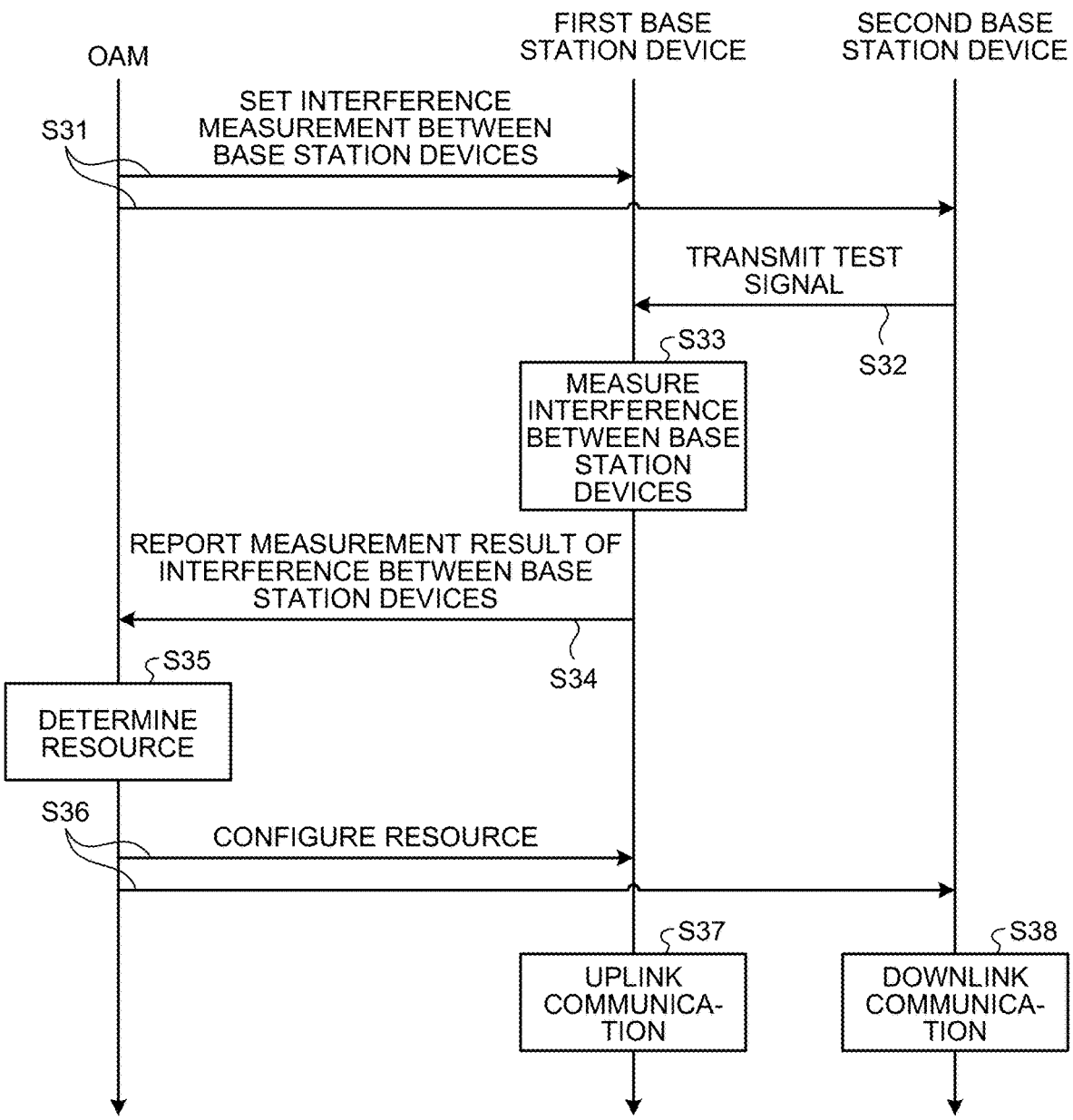

COMMUNICATION DEVICE AND COMMUNICATION METHOD

CROSS-REFERENCE TO RELATED APPLICATIONS

The present application is based on PCT filing PCT/JP2021/010666, filed Mar. 16, 2021, which claims priority to Japanese Application No. 2020-058856, filed Mar. 27, 2020, the entire contents of each are incorporated herein by reference.

FIELD

The present disclosure relates to a communication device and a communication method.

BACKGROUND

With a rapid increase in mobile traffic in recent years, innovative technologies for improving use efficiency of radio resources have been actively studied. As one of representative technologies, full duplex (FD) communication is considered.

In the conventional FD, in order to avoid interference between a transmission signal and a reception signal, communication is generally performed using different frequencies in a transmission band and a reception band. The conventional FD (using different frequencies) is also referred to as "frequency division duplex (FDD)".

On the other hand, in-band full-duplex communication (IBFD) is a duplex system in which transmission and reception are simultaneously performed using the same band. With the IBFD, it is possible to improve frequency utilization efficiency up to twice as compared with the conventional FDD using different frequencies in the transmission band and the reception band.

The IBFD has a problem that very strong self-interference occurs when a signal transmitted by a communication device leaks into a reception circuit of the communication device. Recently, with the progress of interference cancellation technology, it has become possible to reduce self-interference.

Further, in the IBFD, there is a problem that inter-link interference given by an uplink of the communication device to a downlink occurs. In order to solve this problem, there is known a technique in which a communication device (for example, a base station) selects a communication partner having small inter-link interference on the basis of inter-link interference amounts measured by communication partners (for example, terminal devices) and performs the IBFD.

CITATION LIST

Patent Literature

Patent Literature 1: WO 2019/142512

SUMMARY

Technical Problem

In the fifth generation mobile communication system (5G), in addition to an enhanced mobile broadband (eMBB) of data communication of a conventional smartphone, it is assumed that various communication use cases such as ultra reliable and low latency communications (URLLC) are supported by one wireless system. In the URLLC, high reliability and low latency such as emergency message transmission used for automatic driving are required. Since quality of service (QoS) requested for each of these use cases is also different, an allowable amount of inter-link interference is also different according to the different QoS.

However, in the above-described conventional technology, the QoS is not considered, and depending on the above-described use cases, inter-link interference occurs due to the IBFD performed by the communication device, and it is difficult for the communication partner to correctly receive a signal. That is, it is difficult to efficiently apply IBFD in a network in which different QoS request values (requested values for quality of service) are mixed, and there is a problem in improving the frequency utilization efficiency.

Accordingly, the present disclosure provides a system for improving the frequency utilization efficiency even in a network in which different request values for quality of service are mixed.

Solution to Problem

According to the present disclosure, a communication device is provided. The communication device includes a communication unit and a control unit. The communication unit performs wireless communication with a first communication device that supports in-band full-duplex (IBFD) communication that transmits and receives wireless signals using at least a part of resources of the same frequency and the same time. The control unit measures channel quality with a first communication device at each level of quality of service requested for the wireless communication with the first communication device on the basis of interference from a second communication device that performs wireless communication with the first communication device.

BRIEF DESCRIPTION OF DRAWINGS

FIG. 26A is a correspondence table of types of data and QoS request values of 5G.

FIG. 26B is a correspondence table of types of data and QoS request values of 5G.

FIG. 26C is a correspondence table of types of data and QoS request values of 5G.

FIG. 27 is a sequence diagram for explaining an operation example of the communication system according to the embodiment of the present disclosure.

FIG. 31 is a sequence diagram for explaining an operation example of a communication system according to a first modification example of the embodiment of the present disclosure.

DESCRIPTION OF EMBODIMENTS

Figure 1:
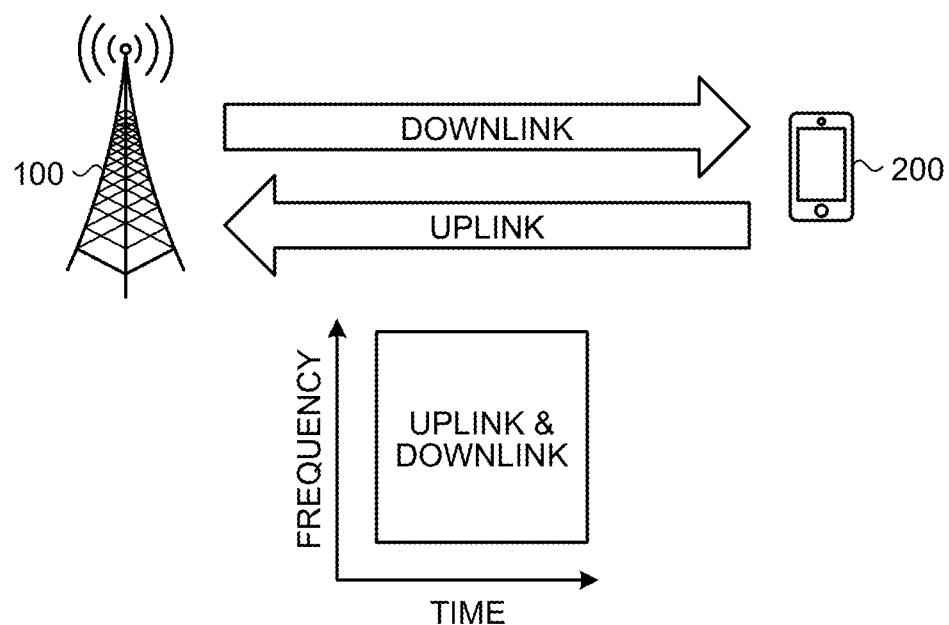
FIG. 1 is a diagram illustrating an outline of in-band full-duplex communication (IBFD).

Hereinafter, preferred embodiments of the present disclosure will be described in detail with reference to the accompanying drawings. Note that, in the present description and the drawings, components having substantially the same functional configuration are denoted by the same reference numerals, and redundant description is omitted.

Further, in the present description and the drawings, similar components of different embodiments may be distinguished by adding different alphabets after the same reference numerals. However, in a case where it is not necessary to particularly distinguish each of similar components, only the same reference numeral is assigned.

Note that the description will be given in the following order.

1. Introduction
1.1. Overview of In-Band Full-Duplex Communication
1.2. Communication method of eMBB and URLLC
1.3. Inter-link Interference
2. Summary of Embodiments
3. Configuration of Communication System
3.1. Overall Configuration of Communication System
3.2. Configuration of Management Device
3.3. Configuration of Base Station Device
3.4. Configuration of Relay Device
3.5. Configuration of Terminal Device
4. Overview of Assumed System
5. Outline of used signal
5.1. QoS Level
5.1.1. Example of Type of Data and QoS Request Values
5.1.2. Mapping Example of Data and QoS Index
6. Overview of Channel Quality Measurement Method
7. Operation Example of Communication System
7.1. Acquire Information For Measurement
7.2. Configuration of Measurement Resource
7.3. Measurement of Channel Quality
7.4. Report of Channel Quality
7.5. Determining Communication Method
8. In-Band Full-Duplex Communication Setting Operation
8.1. Operation Sequence When Setting IBFD
8.2. Operation Sequence When Setting OBFD
8.3. Flow of Determination Processing of Possibility to Execute IBFD
9. Modification Example
9.1. First Modification Example
9.2. Second Modification Example
9.3. Other Modification Examples
10. Conclusion

1. INTRODUCTION

With a rapid increase in mobile traffic in recent years, innovative technologies for improving frequency utilization efficiency have been actively studied. Among them, there is full duplex communication (FD). The full-duplex communication includes out-of-band full-duplex communication (OBFD) and in-band full-duplex communication (IBFD). In the out-of-band full-duplex communication, communication is performed using different frequencies in the transmission band and the reception band in order to avoid interference between the transmission signal and the reception signal. On the other hand, the in-band full-duplex communication is a duplex system in which transmission and reception are simultaneously performed using the same frequency band. In the in-band full-duplex communication, a signal transmitted by a communication device leaks into a reception circuit of the communication device, thereby causing very strong self-interference. However, the progress of interference cancellation technology has made it possible to reduce self-interference.

<1.1. Outline of In-Band Full-Duplex Communication>

FIG. 1 is a diagram illustrating an outline of in-band full-duplex communication (IBFD). An uplink (uplink access link and uplink backhaul link) and a downlink (downlink access link and downlink backhaul link) between a base station device 100 and a terminal device 200 illustrated in FIG. 1 employ the IBFD capable of simultaneously communicating transmission and reception using the same frequency band. Consequently, in the IBFD, since transmission and reception can be simultaneously communicated using the same frequency band, the frequency utilization efficiency can be improved up to twice as compared with the OBFD (out-of-band full-duplex communication).

Note that, in FIG. 1, the base station device 100 and the terminal device 200 perform the IBFD using resources of the same frequency band and the same time in the uplink and the downlink, but the frequency band and the time are not limited thereto. For example, the uplink and downlink frequency bands and times are only required to be at least partially overlap, and the uplink and downlink frequency bands and times do not have to be completely the same.

When the base station device 100 and the terminal device 200 use the same or overlapping frequency resources and the same or overlapping time resources in the uplink and the downlink, it is desirable to mount a self-interference canceller for eliminating or reducing self-interference.

In the OBFD, the communications device reduces leakage interference from transmission by techniques such as guard band and frequency filters. On the other hand, in the IBFD, the communication device reduces leakage interference from transmissions by self-interference cancelling techniques such as antenna-level cancelling, analog cancelling, and/or digital cancelling.

Note that, hereinafter, the same or overlapping frequency resources and the same or overlapping time resources may be simply referred to as the same resources in order to simplify the description.

Further, in the 5G, as described above, it is assumed that a communication mode such as ultra-reliable and low latency communication (URLLC) for emergency message transmission or the like used for automated driving and that requires high reliability and low latency is supported by one wireless system, in addition to enhanced mobile broadband (eMBB) of data communication of a conventional smartphone.

<1.2. Communication Method of eMBB and URLLC>

Figure 2:
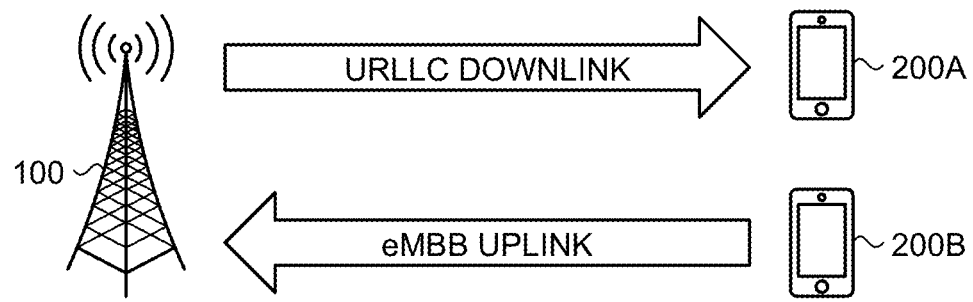
FIG. 2 is a diagram illustrating an example of a communication method of eMBB and URLLC.

FIG. 2 is a diagram illustrating an example of a communication method of eMBB and URLLC. The base station device 100 illustrated in FIG. 2 transmits a URLLC signal to a terminal device 200A using the downlink access link and receives an eMBB signal from a terminal device 200B using the uplink access link.

Figure 3:
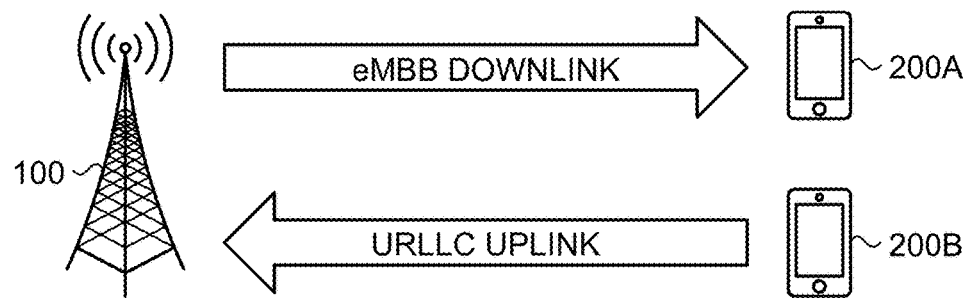
FIG. 3 is a diagram illustrating another example of a communication method of eMBB and URLLC.

FIG. 3 is a diagram illustrating another example of the communication method of eMBB and URLLC. The base station device 100 illustrated in FIG. 3 transmits the eMBB signal to the terminal device 200A using the downlink access link and receives the URLLC signal from the terminal device 200B using the uplink access link.

<1.3. Inter-Link Interference>

Here, technical problems of the IBFD include inter-link interference. Here, in order to simplify the description, it is assumed that the inter-link interference is interference between the terminal devices 200.

Figure 4:
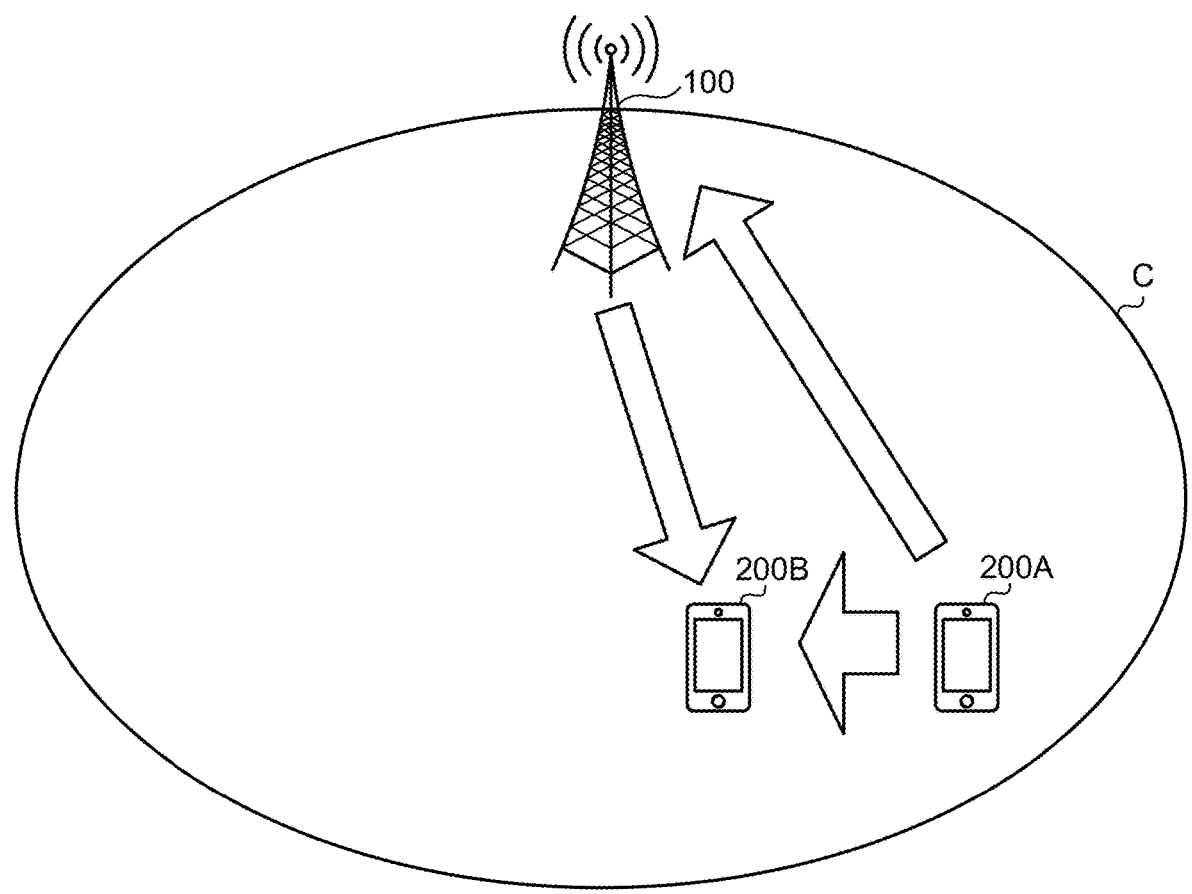
FIG. 4 is a diagram for explaining interference between terminal devices that occurs during an IBFD operation by a base station device.
Figure 5:
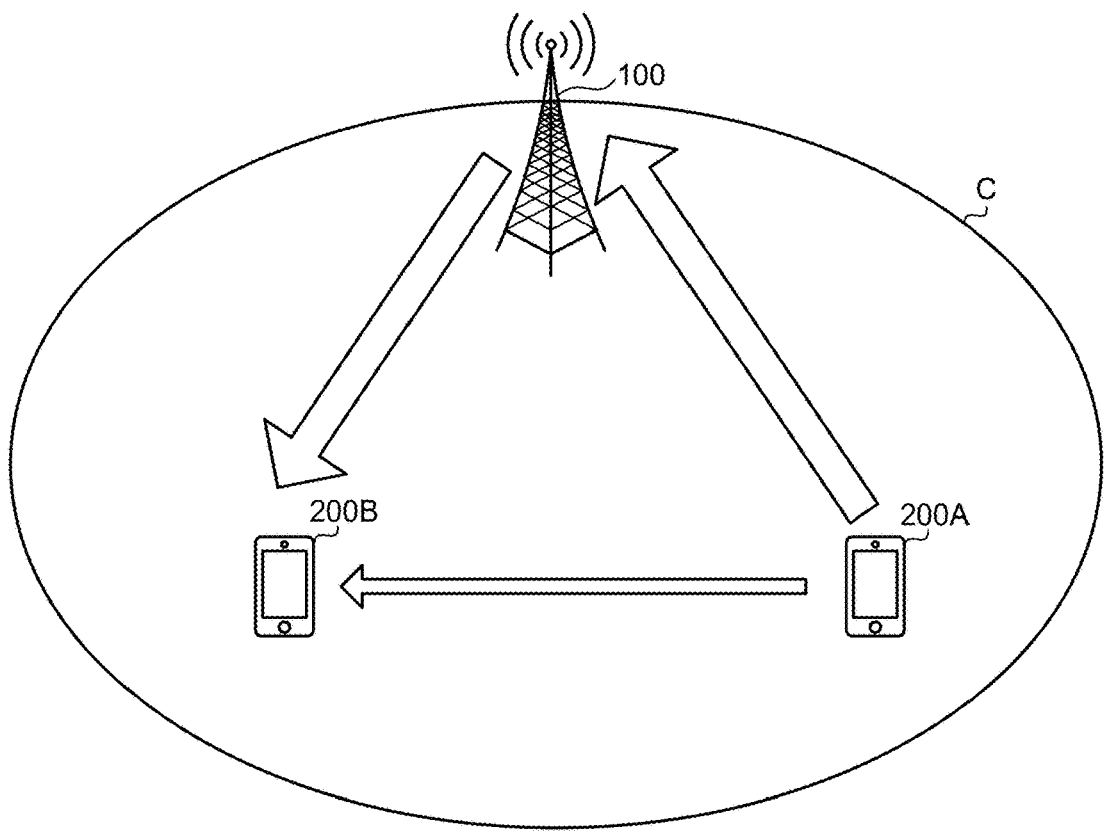
FIG. 5 is a diagram for explaining interference between terminal devices that occurs during the IBFD operation by the base station device.

FIGS. 4 and 5 are diagrams for explaining interference between the terminal devices 200 that occurs during an IBFD operation by the base station device 100. FIGS. 4 and 5 illustrate interference between the terminal devices 200 generated at the time of communication illustrated in FIGS. 2 and 3, for example.

As illustrated in FIG. 4, in the cell C in which the IBFD is performed, the terminal device 200A transmits an uplink signal to the base station device 100, and at the same time, the terminal device 200B, which is a different terminal device in the same cell, receives a downlink signal from the base station device 100. In this case, the uplink signal transmitted by the terminal device 200A interferes with reception of the downlink signal of the different terminal device 200B.

In order to reduce the influence of the interference between the terminal devices 200, for example, as illustrated in FIG. 5, it is necessary for the base station device 100 to search for an appropriate combination of the terminal devices 200 such as receiving the uplink signal from the terminal device 200A away from the terminal device 200B, or the like. As described above, the base station device 100 searches for an appropriate combination (terminal-terminal pairing) of the downlink terminal device 200B and the uplink terminal device 200A, so that the base station device 100 can execute the IBFD, and the frequency utilization efficiency can be improved.

Figure 6:
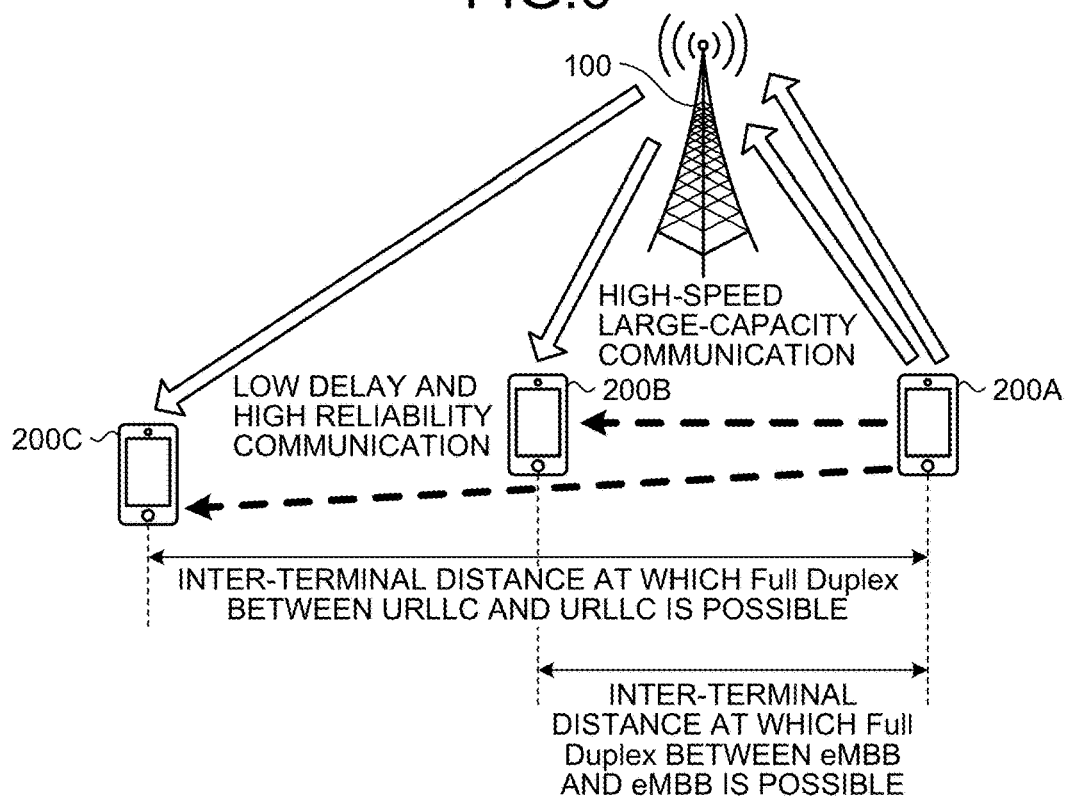
FIG. 6 is a diagram for explaining interference between terminal devices due to the IBFD according to an embodiment of the present disclosure.

FIG. 6 is a diagram for explaining interference between the terminal devices 200 due to the IBFD according to the embodiment of the present disclosure.

In a communication system that transmits and receives pieces of QoS data that differ in requested reception quality, it is more difficult to estimate inter-link interference (for example, interference between the terminal devices 200 and interference between the base station devices 100). For example, eMBB data in the wireless layer requires a packet error rate (Block Error Rate) of $10^{-1 \ to \ 2}$ or less for an allowable delay value of several tens of milliseconds or more. On the other hand, URLLC data requires a packet error rate of $10^{-3 \ to \ 5}$ or less for an allowable delay value within several milliseconds.

As illustrated in FIG. 6, when the terminal device 200A transmits the eMBB data to the base station device 100 in the uplink, a terminal device to which the base station device 100 can transmit the eMBB data in the downlink by the IBFD is assumed as the terminal device 200B. On the other hand, when the terminal device 200A transmits the URLLC data to the base station device 100 in the uplink, a terminal device to which the base station device 100 can transmit the URLLC data in the downlink by the IBFD is assumed as a terminal device 200C.

At this time, as the inter-terminal distance required for performing the IBFD while satisfying the requested reception quality of the eMBB data and the URLLC data described above, the distance between the terminal devices 200A and 200C is longer than the distance between the terminal devices 200A and 200B. That is, the amount of interference from the terminal device 200A allowed by the terminal device 200B that performs high-speed large-capacity communication by the eMBB is smaller than the amount of interference from the terminal device 200A allowed by the terminal device 200C that performs low-delay and high-reliability communication by the URLLC. Therefore, the inter-terminal distance at which the IBFD is possible between the URLLC and the URLLC is longer than the inter-terminal distance at which eMBB-eMBB is possible. In FIG. 6, the IBFD is simply referred to as Full Duplex.

As described above, since the requested reception quality is different between the eMBB and the URLLC, it is difficult for the base station device 100 to uniquely determine pairing of the terminal devices 200 for performing the IBFD. In such a network environment in which pieces of data that differ in requested reception quality are mixed, in order to implement a system that satisfies all the requested values, it is necessary to grasp an interference status in more detail and perform scheduling in more detail.

2. OUTLINE OF EMBODIMENT

Therefore, in the present embodiment, this problem is solved by the following means.

For example, the communication device (for example, the terminal device 200B) includes a communication unit and a control unit. The communication unit performs wireless communication with a first communication device (for example, the base station device 100) may support the IBFD (In Band full duplex) communication that transmits and receives wireless signals using at least a part of resources of the same frequency and the same time. The control unit measures channel quality with the first communication device at each level of quality of service (QoS) requested for wireless communication with the first communication device on the basis of interference from a second communication device (for example, the terminal device 200A) that performs wireless communication with the first communication device.

Thus, the base station device 100 can determine the pairing of the terminal devices 200 for performing the IBFD on the basis of the channel quality for each QoS level, and it is possible to grasp an interference status in more detail and perform more precise scheduling. Further, the base station device 100 determines the pairing of the terminal devices 200 for performing the IBFD, and performs the IBFD with the determined pairing, so that the frequency utilization efficiency can be further improved.

Figure 7:
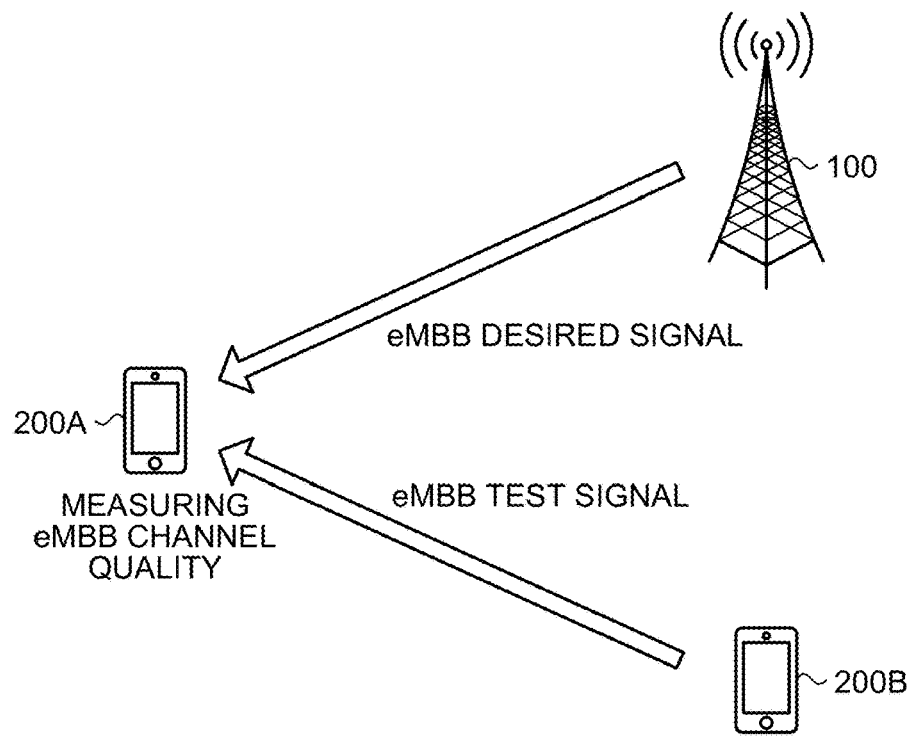
FIG. 7 is a diagram for explaining an outline of the embodiment of the present disclosure.
Figure 8:
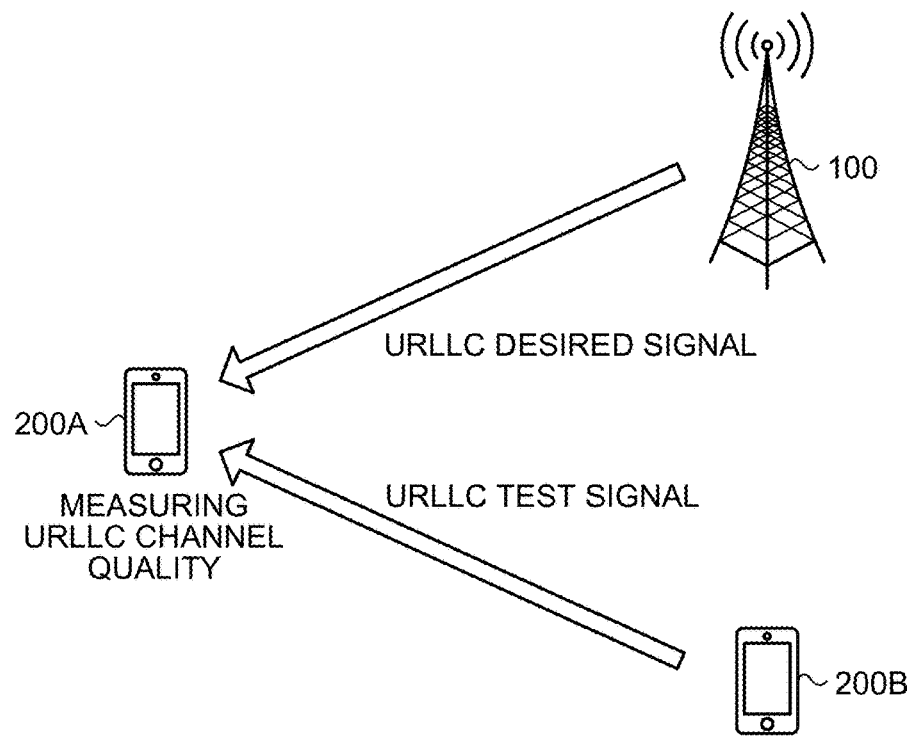
FIG. 8 is a diagram for explaining an outline of the embodiment of the present disclosure.

Next, an outline of the embodiment of the present disclosure will be described with reference to FIGS. 7 and 8. FIGS. 7 and 8 are diagrams for explaining an overview of the embodiment of the present disclosure. As described above, the terminal device 200A according to the present embodiment measures channel quality with the base station device 100 for each QoS level. At this time, for example, the transmission of the uplink signal by the terminal device 200B becomes interference for the terminal device 200A, and becomes a factor of deteriorating the channel quality.

Accordingly, the terminal device 200A measures the channel quality on the basis of a desired signal from the base station device 100 and a test signal from the terminal device 200B for each QoS level.

More specifically, as illustrated in FIG. 7, the terminal device 200A receives an eMBB desired signal from the base station device 100. Next, in the terminal device 200A, the terminal device 200B receives an eMBB test signal from the terminal device 200B.

The terminal device 200A measures the channel quality (hereinafter, also referred to as eMBB channel quality) in the eMBB on the basis of the received eMBB desired signal and eMBB test signal. The terminal device 200A calculates, for example, an SINR as the eMBB channel quality.

Further, as illustrated in FIG. 8, the terminal device 200A receives a URLLC desired signal from the base station device 100. Next, in the terminal device 200A, the terminal device 200B receives a URLLC test signal from the terminal device 200B.

The terminal device 200A measures channel quality in the URLLC (hereinafter, also referred to as URLLC channel quality) on the basis of the received URLLC desired signal and URLLC test signal. The terminal device 200A calculates, for example, an SINR as the URLLC channel quality.

Note that the eMBB desired signal and the eMBB test signal are signals transmitted so as to satisfy the reception quality requested by the eMBB, and the URLLC desired signal and the URLLC test signal are signals transmitted so as to satisfy the reception quality requested by the URLLC. The eMBB desired signal and the eMBB test signal are different in QoS level from the URLLC desired signal and the URLLC test signal.

Here, the terminal device 200A measures the channel quality separately for the eMBB channel quality and the URLLC channel quality, but more specifically, the terminal device 200A also measures the channel quality based on the eMBB desired signal and the URLLC test signal and the channel quality based on the URLLC desired signal and the eMBB test signal.

As described above, the terminal device 200A measures the channel quality for each combination of QoS levels. Thus, the terminal device 200A can report the measured channel quality to the base station device 100 for each combination of the QoS levels, and the base station device 100 can grasp the interference status (channel quality) for each combination of the QoS levels. Therefore, the base station device 100 can perform more precise scheduling.

3. CONFIGURATION OF COMMUNICATION SYSTEM

A communication system S includes the base station device 100 and a relay device 300, and can be wirelessly connected to the terminal device 200. Hereinafter, a configuration of the communication system S will be specifically described.

<3.1. Overall Configuration of Communication System>

Figure 9:
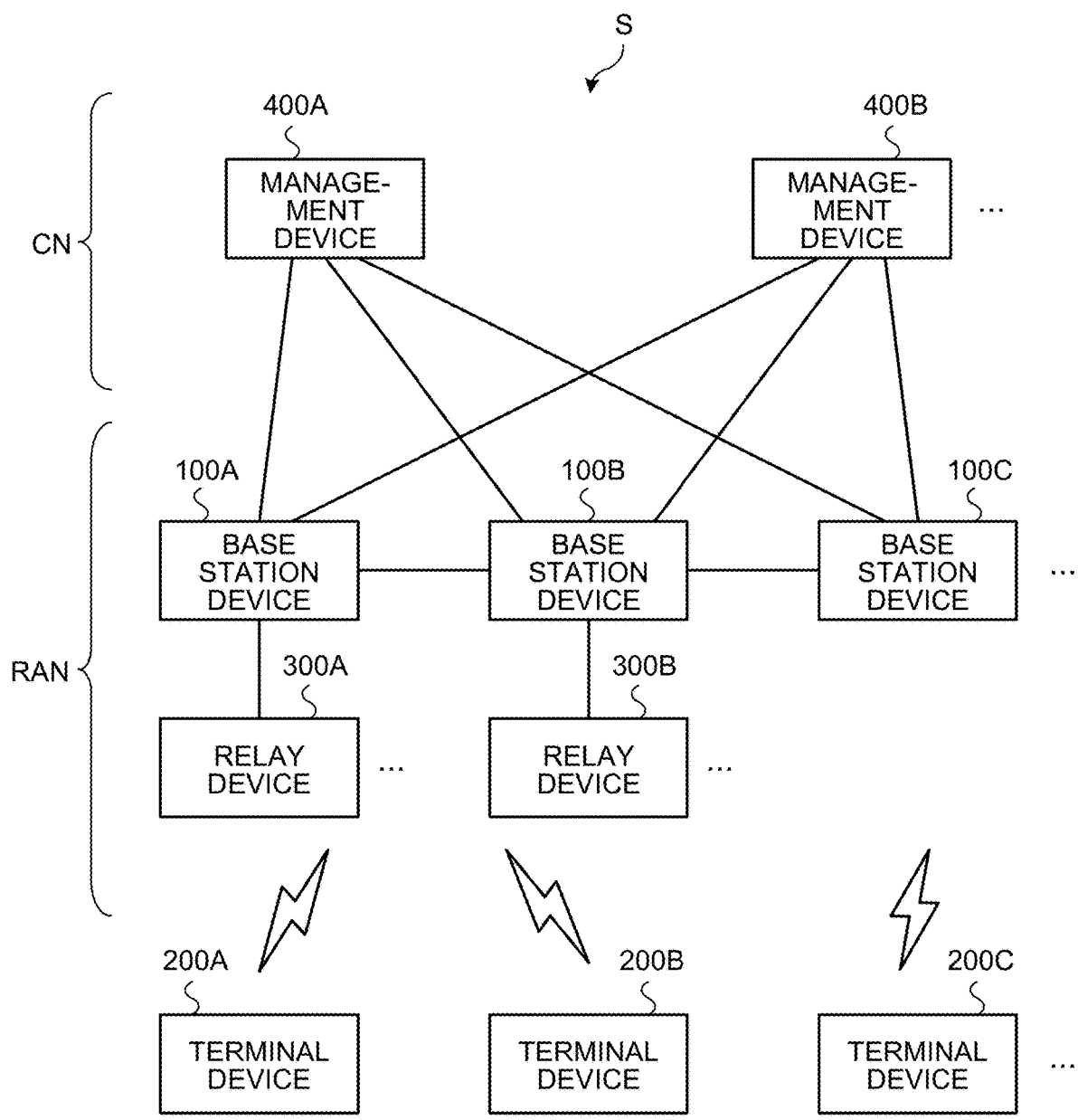
FIG. 9 is a diagram illustrating a configuration example of a communication system according to the embodiment of the present disclosure.

FIG. 9 is a diagram illustrating a configuration example of the communication system S according to the embodiment of the present disclosure. The communication system S is a wireless communication system that provides a wireless access network to the terminal device 200. For example, the communication system S is a cellular communication system using a wireless access technology such as long term evolution (LTE) or new radio (NR).

As illustrated in FIG. 9, the communication system S includes a management device 400, the base station device 100, the relay device 300, and the terminal device 200. The communication system S provides the user with a wireless network capable of mobile communication by wireless communication devices constituting the communication system S operating in cooperation. The wireless network of this embodiment includes a wireless access network RAN and a core network CN. Note that the wireless communication device is a device having a wireless communication function, and corresponds to the base station device 100, the relay device 300, and the terminal device 200 in the example of FIG. 9.

The communication system S may include a plurality of the management devices 400, a plurality of the base station devices 100, a plurality of the relay devices 300, and a plurality of the terminal devices 200. In the example of FIG. 9, the communication system S includes management devices 400A and 10B and the like as the management device 400. Further, the communication system S includes base station devices 100A, 100B, and 100C and the like as the base station device 100, and includes relay devices 300A and 300B as the relay device 300 and the like. Furthermore, the communication system S includes terminal devices 200A, 200B, and 200C and the like as the terminal devices 200.

Note that the devices in the drawings may be considered as devices in the logical sense. That is, a part of the device in the drawing may be implemented by a virtual machine (VM), Container, Docker, or the like, and these may be implemented on physically the same hardware.

Note that the base station device of the LTE may be referred to as an evolved node B (eNodeB) or an eNB. Further, the base station device of the NR may be referred to as a gNodeB or a gNB. In addition, in the LTE and the NR, a terminal device (also referred to as a mobile station, a mobile station device, or a terminal) may be referred to as user equipment (UE). Note that the terminal device is a type of communication device, and is also referred to as a mobile station, a mobile station device, or a terminal.

In the present embodiment, the concept of the communication device includes not only a portable mobile device (terminal device) such as a mobile terminal but also a device installed in a structure or a mobile object. The structure or the mobile object itself may be regarded as the communication device. Further, the concept of the communication device includes not only the terminal device but also the base station device and the relay device. The communication device is a type of a processing device and an information processing device. Furthermore, the communication device can be rephrased as a transmitting device (transmitting station) or a receiving device (receiving station).

[Management Device]

The management device 400 is a device that manages a wireless network. For example, the management device 400 is a device that manages communication of the base station device 100. For example, the management device 400 is a device that functions as a mobility management entity (MME), an access and mobility management function (AMF), or a session management function (SMF).

The management device 400 configures the core network CN together with a gateway device and the like. The core network CN is, for example, a network of a predetermined entity such as a mobile communication carrier. For example, the core network CN is an evolved packet core (EPC) or a 5G core network (5GC). Note that the predetermined entity may be the same as or different from an entity that uses, operates, and/or manages the base station device 100.

Note that the management device 400 may have a function of a gateway. For example, when the core network is an EPC, the management device 400 may have a function as an S-GW or a P-GW. In addition, when the core network is 5GC, the management device 400 may have a function as a user plane function (UPF). Note that the management device 400 is not necessarily a device constituting the core network CN. For example, it is assumed that the core network CN is a core network of Wideband Code Division Multiple Access (W-CDMA) or Code Division Multiple Access 2000 (cdma 2000). At this time, the management device 400 may be a device that functions as a radio network controller (RNC).

The management device 400 is connected to each of the plurality of base station devices 100 and manages communication of the base station device 100. For example, the management device 400 grasps and manages, for each terminal device 200, which base station device (or which cell) the terminal device 200 is connected to, which base station device (or which cell) has the communication area in which the terminal device exists, and the like. The cell may be a primary cell (pCell) or a secondary cell (sCell). In the cell, radio resources (for example, a frequency channel, a component carrier, or the like) that can be used by the terminal device 200 may be different for each cell. Further, one base station device may provide a plurality of cells. In addition, the management device 400 may be referred to as, for example, a control station.

[Base Station Device]

The base station device 100 is a wireless communication device that performs wireless communication with the terminal device 200. The base station device 100 is a type of communication device. The base station device 100 is, for example, a device corresponding to a wireless base station (Base Station, Node B, eNB, gNB, and the like) or a wireless access point (Access Point). The base station device 100 may be a wireless relay station. The base station device 100 may be an optical extension device called a remote radio head (RRH). Further, the base station device 100 may be a receiving station device such as a field pickup unit (FPU). In addition, the base station device 100 may be an integrated access and backhaul (IAB) donor node or an IAB relay node that provides a wireless access line and a radio backhaul line by time division multiplexing, frequency division multiplexing, or space division multiplexing.

Note that the wireless access technology used by the base station device 100 may be a cellular communication technology or a wireless LAN technology. Of course, the wireless access technology used by the base station device 100 is not limited thereto, and may be another wireless access technology. The wireless access technology used by the base station device 100 may be a low power wide area (LPWA) communication technology. Here, the LPWA communication is communication conforming to the LPWA standard. Examples of the LPWA standard include ELTRES, ZETA, SIGFOX, LoRaWAN, NB-Iot, and the like. Of course, the LPWA standard is not limited thereto, and may be other LPWA standards. In addition, the wireless communication used by the base station device 100 may be wireless communication using millimeter waves. In addition, the wireless communication used by the base station device 100 may be wireless communication using radio waves or wireless communication (optical radio) using infrared rays or visible light.

The base station device 100 may be capable of performing NOMA communication with the terminal device 200. Here, the NOMA communication is communication using a non-orthogonal resource (transmission, reception, or both). Note that the base station device 100 may be configured to be capable of performing the NOMA communication with another base station device 100 and the relay device 300.

Note that the base station devices 100 may be capable of communicating with each other via an interface between a base station device and core network interface (for example, S1 Interface or the like). This interface may be either wired or wireless. In addition, the base station devices 100 may be capable of communicating with each other via an inter-base station device interface (for example, X2 Interface, Xn Interface, S1 Interface, and the like). This interface may be either wired or wireless.

The base station device 100 can be used, operated, and/or managed by various entities. For example, a mobile network operator (MNO), a mobile virtual network operator (MVNO), a mobile virtual network enabler (MVNE), a neutral host network (NHN) operator, an enterprise, an educational institution (educational institutions, boards of local governments, and the like), a real estate (building, apartment, and the like) manager, an individual, and the like can be assumed as the entity.

Of course, the subject of use, operation, and/or management of the base station device 100 is not limited thereto. The base station device 100 may be installed and/or operated by one operator, or may be installed and/or operated by one individual. Of course, the installation/operation subject of the base station device 100 is not limited thereto. For example, the base station device 100 may be installed and operated by a plurality of operators or a plurality of individuals in cooperation. Further, the base station device 100 may be a shared facility used by a plurality of operators or a plurality of individuals. In this case, installation and/or operation of the equipment may be performed by a third party different from the user.

Note that the concept of the base station device (also referred to as a base station) includes not only a donor base station but also a relay base station (also referred to as a relay device or a relay device apparatus). Further, the concept of the base station includes not only a structure having a function of the base station but also a device installed in the structure.

The structure is, for example, a building such as a high-rise building, a house, a steel tower, a station facility, an airport facility, a harbor facility, or a stadium. Note that the concept of a structure includes not only a building but also a construction (non-building structure) such as a tunnel, a bridge, a dam, a wall, or an iron pillar, and equipment such as a crane, a gate, or a windmill. Further, the concept of the structure includes not only a structure on land (on the ground in a narrow sense) or in the ground, but also a structure on water such as a platform or a megafloat, and a structure under water such as a marine observation facility. The base station device can be rephrased as a processing device or an information processing device.

The base station device 100 may be a donor station or a relay station (relay device). In addition, the base station device 100 may be a fixed station or a mobile station. The mobile station is a wireless communication device (for example, the base station device) configured to be movable. At this time, the base station device 100 may be a device installed in a mobile object or may be a mobile object itself. For example, a relay station device having mobility can be regarded as the base station device 100 as a mobile station. Further, an apparatus that is originally capable of moving, such as a vehicle, a drone, or a smartphone, and has a function of a base station device (at least a part of the function of the base station device) also corresponds to the base station device 100 as a mobile station.

Here, the mobile object may be a mobile terminal such as a smartphone or a mobile phone. In addition, the mobile object may be a mobile object (for example, a vehicle such as an automobile, a bicycle, a bus, a truck, a motorcycle, a train, or a linear motor car) that moves on land (on the ground in a narrow sense) or a mobile object (for example, the subway) that moves in the ground (for example, in the tunnel).

In addition, the mobile object may be a mobile object (for example, a ship such as a passenger ship, a cargo ship, or a hovercraft) that moves over water or a mobile object (for example, a submersible such as a submersible, a submarine, and an unmanned submersible) that moves under water.

Furthermore, the mobile object may be a mobile object (for example, an aircraft such as an airplane, an airship, or a drone) that moves inside the atmosphere or a mobile object (for example, artificial bodies such as an artificial satellite, a spacecraft, a space station, and a probe) that moves outside the atmosphere. A mobile object moving outside the atmosphere can be rephrased as a space mobile object.

In addition, the base station device 100 may be a ground base station device (ground station device) installed on the ground. For example, the base station device 100 may be a base station device arranged in a structure on the ground, or may be a base station device installed in a mobile object moving on the ground. More specifically, the base station device 100 may be an antenna installed in a structure such as a building and a signal processing device connected to the antenna. Of course, the base station device 100 may be a structure or a mobile object itself. The "ground" is a ground in a broad sense including not only land (ground in a narrow sense) but also ground, on water, and in water. Note that the base station device 100 is not limited to the ground base station device. The base station device 100 may be a non-ground base station device (non-ground station device) capable of floating in the air or space. For example, the base station device 100 may be an aircraft station device or a satellite station device.

The aircraft station device is a wireless communication device capable of floating in the atmosphere, such as an aircraft. The aircraft station device may be a device mounted on an aircraft or the like, or may be an aircraft itself. Note that the concept of an aircraft includes not only heavy aircraft such as an airplane and a glider but also light aircraft such as a balloon and an airship. Further, the concept of an aircraft includes not only a heavy aircraft and a light aircraft but also a rotorcraft such as a helicopter and an autogyro. Note that the aircraft station device (alternatively, an aircraft on which an aircraft station device is mounted) may be an unmanned aerial vehicle such as a drone.

Note that the concept of the unmanned aerial vehicle also includes unmanned aircraft system (UAS) and tethered UAS. Further, the concept of unmanned aerial vehicles also includes Lighter than Air UAS (LTA) and Heavier than Air UAS (HTA). Other concepts of unmanned aerial vehicles also include High Altitude UAS Platforms (HAPs).

The satellite station device is a wireless communication device capable of floating outside the atmosphere. The satellite station device may be a device mounted on a space mobile object such as an artificial satellite, or may be a space mobile object itself. The satellite to be the satellite station device may be any of a low earth orbiting (LEO) satellite, a medium earth orbiting (MEO) satellite, a geostationary earth orbiting (GEO) satellite, and a highly elliptical orbiting (HEO) satellite. Of course, the satellite station device may be a device mounted on the low earth orbiting satellite, the medium earth orbiting satellite, the geostationary earth orbiting satellite, or the highly elliptical orbiting satellite.

The size of coverage of the base station device 100 may be large like a macro cell or small like a pico cell. Of course, the size of the coverage of the base station device 100 may be extremely small like a femto cell. In addition, the base station device 100 may have a beamforming capability. In this case, the base station device 100 may form a cell or a service area for each beam.

In the example of FIG. 9, the base station device 100A is connected to the relay device 300A, and the base station device 100B is connected to the relay device 300B. The base station device 100A can indirectly perform wireless communication with the terminal device 200 via the relay device 300A. Similarly, the base station device 100A can indirectly perform wireless communication with the terminal device 200 via the relay device 300A.

[Relay Device]

The relay device 300 is a device to be a relay device of a base station. The relay device 300 is a type of base station device. The relay device can be rephrased as a relay base station device (or a relay base station). The relay device 300 can perform the NOMA communication with the terminal device 200. The relay device 300 relays communication between the base station device 100 and the terminal device 200. Note that the relay device 300 may be configured to be capable of performing the NOMA communication with another relay device 300 and the base station device 100. The relay device 300 may be a ground station device or a non-ground station device. The relay device 300 constitutes a wireless access network RAN together with the base station device 100.

The relay device 300 is a device that transfers information from one communication device to the other communication device. Specifically, it is a device that receives a signal from one communication device and transmits a signal to the other communication device. It is assumed that the relay device 300 performs wireless communication between one communication device and the relay device 300 and between the relay device 300 and the other communication device. Note that the relay device 30 may be a fixed device, a movable device, or a device capable of floating. The size of coverage of the relay device 300 is not limited. For example, the relay device 300 may be a macro cell, a micro cell, or a small cell. Further, the relay device 300 is not limited to the mounted device as long as the function of relay is satisfied. For example, the relay device 300 may be mounted on the terminal device 200 such as a smartphone, may be mounted on an automobile or a human-powered vehicle, may be mounted on a balloon, an airplane, or a drone, or may be mounted on a home appliance such as a television, a game machine, an air conditioner, a refrigerator, or a lighting fixture.

[Terminal Device]

The terminal device 200 is a wireless communication device that wirelessly communicates with the base station device 100 or the relay device 30. The terminal device 200 is, for example, a mobile phone, a smart device (smartphone or tablet), a personal digital assistant (PDA), or a personal computer. Further, the terminal device 200 may be a device such as a business camera provided with a communication function, or may be a motorcycle, a moving relay vehicle, or the like on which a communication device such as a field pickup unit (FPU) is mounted. In addition, the terminal device 200 may be a machine to machine (M2M) device or an Internet of Things (IoT) device.

In addition, the terminal device 200 may be capable of sidelink communication with another terminal device 200. The terminal device 200 may be capable of using an automatic retransmission technology such as HARQ when performing sidelink communication. The terminal device 200 may be capable of performing the NOMA communication with the base station device 100 and the relay device 300. Note that the terminal device 200 may also be capable of the NOMA communication in communication (sidelink) with other terminal devices 200. Further, the terminal device 200 may be capable of performing LPWA communication with another communication device (for example, the base station device 100, the relay device 300, and another terminal device 200). In addition, the wireless communication used by the terminal device 200 may be wireless communication using millimeter waves. Note that the wireless communication (including sidelink communication) used by the terminal device 200 may be wireless communication using radio waves or wireless communication (optical wireless) using infrared rays or visible light.

In addition, the terminal device 200 may be a mobile device. Here, the mobile device is a movable wireless communication device. At this time, the terminal device 200 may be a wireless communication device installed in a mobile object or may be a mobile object itself. For example, the terminal device 200 may be a vehicle that moves on a road such as an automobile, a bus, a truck, or a motorcycle, or a wireless communication device mounted on the vehicle. Note that the mobile object may be a mobile terminal, or may be a mobile object that moves on land (on the ground in a narrow sense), in the ground, on water, or under water. Further, the mobile object may be a mobile object that moves inside the atmosphere, such as a drone or a helicopter, or may be a mobile object that moves outside the atmosphere, such as an artificial satellite.

The terminal device 200 may be simultaneously connected to a plurality of base station devices or a plurality of cells to perform communication. For example, in a case where one base station device supports a communication area via a plurality of cells (for example, pCell and sCell), it is possible to bundle the plurality of cells and communicate between the base station device 100 and the terminal device 200 by a carrier aggregation (CA) technology, a dual connectivity (DC) technology, or a multi-connectivity (MC) technology. Alternatively, the terminal device 200 and the plurality of base station devices 100 can communicate with each other by a coordinated transmission and reception (coordinated multi-point transmission and reception (CoMP)) technology via cells of different base station devices 100.

Note that the terminal device 200 is not necessarily a device directly used by a person. The terminal device 200 may be a sensor installed in a machine or the like in a factory like what is called machine type communication (MTC). In addition, the terminal device 200 may be a machine to machine (M2M) device or an Internet of Things (IoT) device. In addition, the terminal device 200 may be a device having a relay communication function as represented by device to device (D2D) and vehicle to everything (V2X). Further, the terminal device 200 may be a device called a client premises equipment (CPE) used for wireless backhaul or the like.

Hereinafter, a configuration of each device constituting the communication system S according to the embodiment will be specifically described. Note that the configuration of each device described below is merely an example. The configuration of each device may be different from the following configuration.

<3.2. Configuration of Management Device>

Figure 10:
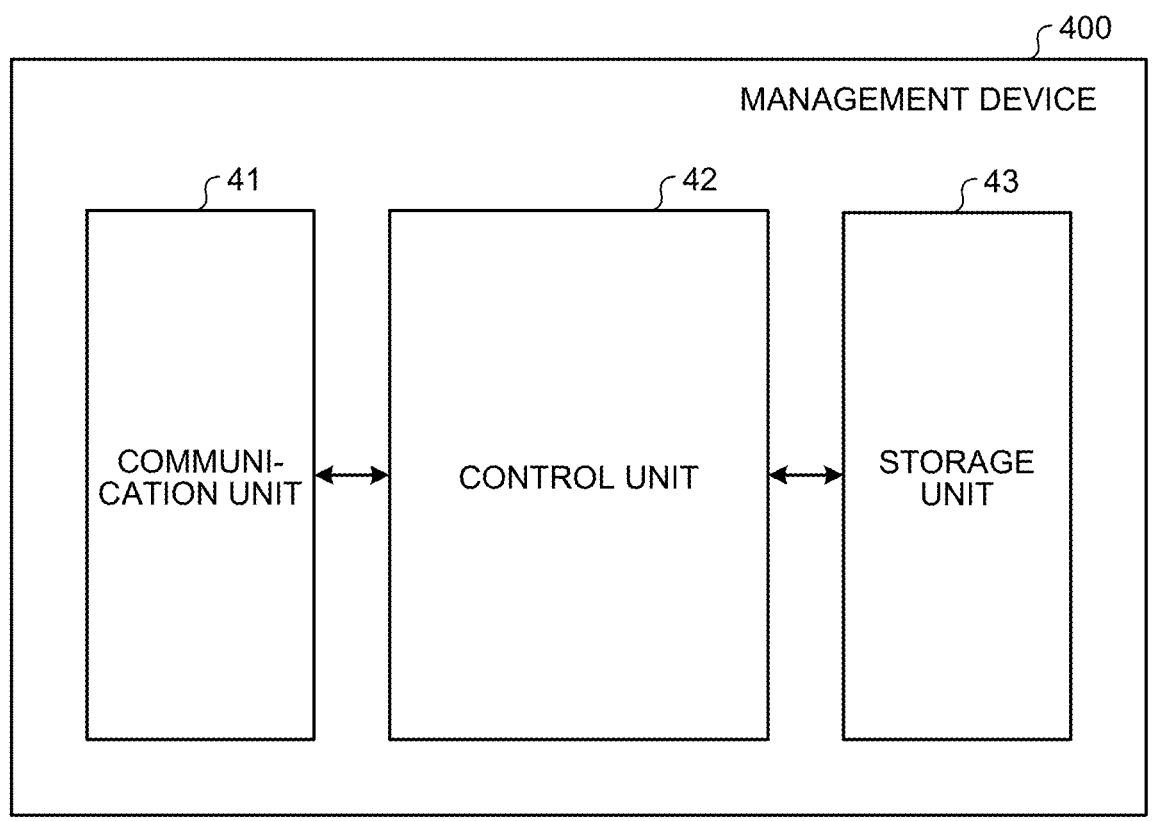
FIG. 10 is a diagram illustrating a configuration example of a management device according to the embodiment of the present disclosure.

FIG. 10 is a diagram illustrating a configuration example of the management device 400 according to the embodiment of the present disclosure. The management device 400 is a device that manages a wireless network. The management device 400 includes a communication unit 41, a storage unit 42, and a control unit 43. Note that the configuration illustrated in FIG. 10 is a functional configuration, and the hardware configuration may be different from the functional configuration. In addition, the functions of the management device 400 may be implemented in a distributed manner in a plurality of physically separated configurations. For example, the management device 400 may include a plurality of server devices.

The communication unit 41 is a communication interface for communicating with other devices. The communication unit 41 may be a network interface or a device connection interface. For example, the communication unit 41 may be a local area network (LAN) interface such as a network interface card (NIC), or may be a USB interface including a universal serial bus (USB) host controller, a USB port, and the like. Further, the communication unit 41 may be a wired interface or a wireless interface. The communication unit 41 functions as a communication means of the management device 400. The communication unit 41 communicates with the base station device 100 under the control of the control unit 13.

The storage unit 42 is a data readable/writable storage device such as a dynamic random access memory (DRAM), a static random access memory (SRAM), a flash memory, or a hard disk. The storage unit 42 functions as a storage means of the management device 400. The storage unit 42 stores, for example, a connection state of the terminal device 200. For example, the storage unit 42 stores a radio resource control (RRC) state and an EPS connection management (ECM) state of the terminal device 200. The storage unit 42 may function as a home memory that stores position information of the terminal device 200.

The control unit 43 is a controller that controls each unit of the management device 400. The control unit 43 is implemented by, for example, a processor such as a central processing unit (CPU) or a micro processing unit (MPU). For example, the control unit 43 is implemented by the processor executing various programs stored in the storage device inside the management device 400 using a random access memory (RAM) or the like as a work area. Note that the control unit 43 may be implemented by an integrated circuit such as an application specific integrated circuit (ASIC) or a field programmable gate array (FPGA). Any of the CPU, the MPU, the ASIC, and the FPGA can be regarded as a controller.

<3.3. Configuration of Base Station Device>

Figure 11:
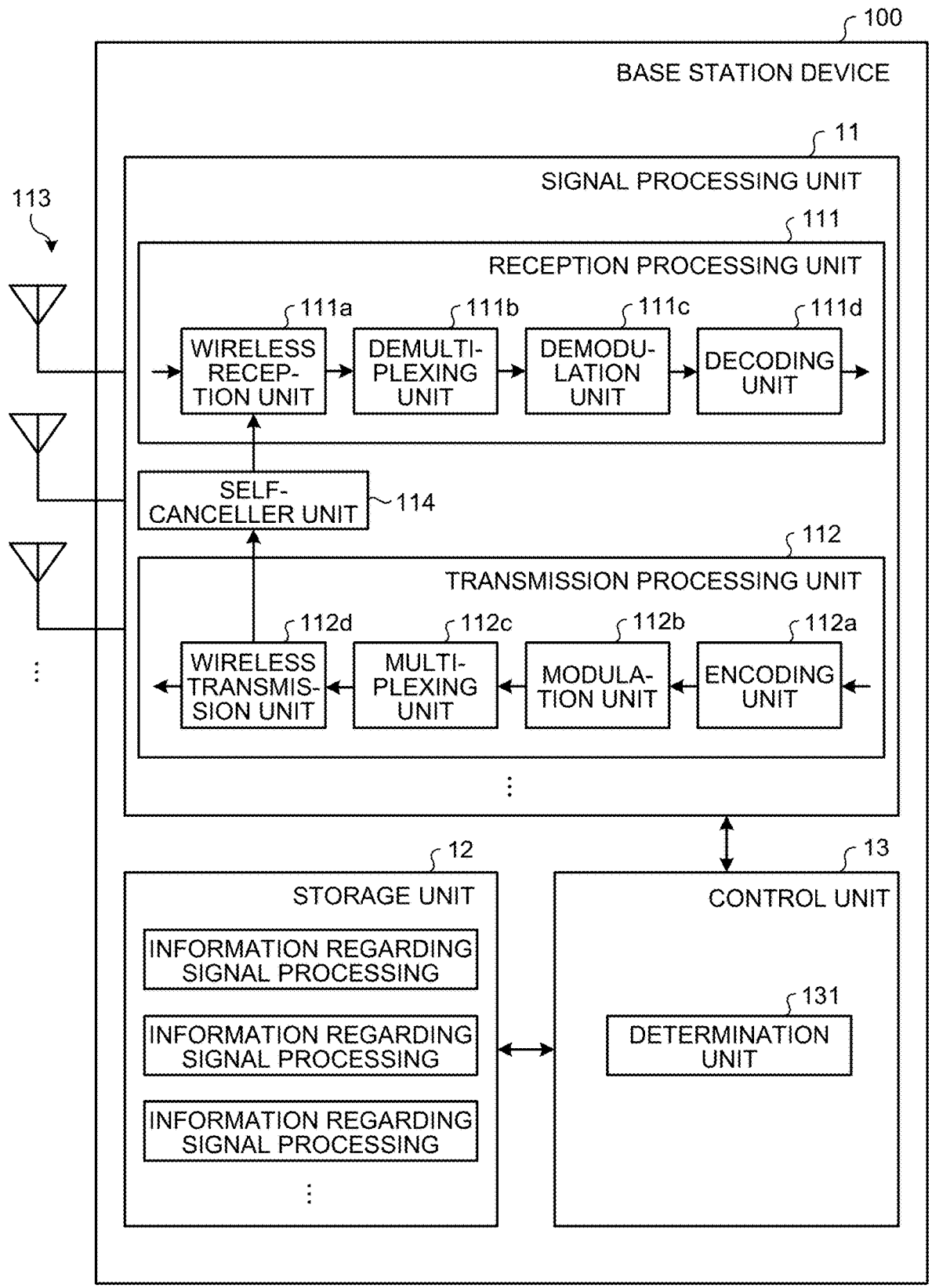
FIG. 11 is a diagram illustrating a configuration example of a base station device according to the embodiment of the present disclosure.

Next, a configuration of the base station device 100 will be described. FIG. 11 is a diagram illustrating a configuration example of the base station device 100 according to the embodiment of the present disclosure. The base station device 100 supports a 2-step random access procedure in addition to a conventional 4-step random access procedure (contention-based random access procedure) and a conventional 3-step random access procedure (non-contention-based random access procedure). Furthermore, the base station device 100 can perform the NOMA communication with the terminal device 200. The base station device 100 includes a signal processing unit 11, a storage unit 12, and a control unit 13. Note that the configuration illustrated in FIG. 11 is a functional configuration, and the hardware configuration may be different from the functional configuration. In addition, the functions of the base station device 100 may be implemented in a distributed manner in a plurality of physically separated configurations.

The signal processing unit 11 is a signal processing unit for wirelessly communicating with other wireless communication devices (for example, the terminal device 200 and the relay device 30). The signal processing unit 11 operates under the control of the control unit 13. The signal processing unit 11 supports one or a plurality of wireless access methods. For example, the signal processing unit 11 that supports both the NR and the LTE. The signal processing unit 11 may support W-CDMA or cdma 2000 in addition to the NR or the LTE. Further, the signal processing unit 11 supports communication using NOMA.

The signal processing unit 11 includes a reception processing unit 111, a transmission processing unit 112, an antenna 113, and a self-canceller unit 114. The signal processing unit 11 may include a plurality of the reception processing units 111, a plurality of the transmission processing units 112, a plurality of the antennas 113, and a plurality of the self-canceller units 114. Note that, in a case where the signal processing unit 11 supports a plurality of wireless access methods, each unit of the signal processing unit 11 can be configured individually for each wireless access method. For example, the reception processing unit 111 and the transmission processing unit 112 may be individually configured by the LTE and the NR.

The reception processing unit 111 processes the uplink signal received via the antenna 113. The reception processing unit 111 includes a wireless reception unit 111a, a demultiplexing unit 111b, a demodulation unit 111c, and a decoding unit 111d.

The wireless reception unit 111a performs, on the uplink signal, down-conversion, removal of an unnecessary frequency component, control of an amplification level, quadrature demodulation, conversion to a digital signal, removal of a guard interval (cyclic prefix), extraction of a frequency domain signal by fast Fourier transform, and the like. The demultiplexing unit 111b demultiplexes an uplink channel such as a physical uplink shared channel (PUSCH) or a physical uplink control channel (PUCCH) and an uplink reference signal from the signal output from the wireless reception unit 111a. The demodulation unit 111c demodulates the reception signal using a modulation method such as binary phase shift keying (BPSK) or quadrature phase shift keying (QPSK) with respect to a modulation symbol of the uplink channel. The modulation method used by the demodulation unit 111c may be 16 quadrature amplitude modulation (QAM), 64 QAM, or 256 QAM. In this case, signal points on a constellation do not necessarily have to be equidistant. The constellation may be a non-uniform constellation (NUC). The decoding unit 111d performs a decoding process on the demodulated coded bits of the uplink channel. Decoded uplink data and uplink control information are output to the control unit 13.

The transmission processing unit 112 performs a process of transmitting the downlink control information and the downlink data. The transmission processing unit 112 includes an encoding unit 112a, a modulation unit 112b, a multiplexing unit 112c, and a wireless transmission unit 112d.

The encoding unit 112a encodes the downlink control information and the downlink data input from the control unit 13 using an encoding method such as block encoding, convolutional encoding, turbo encoding, or the like. The modulation unit 112b modulates the coded bits output from the encoding unit 112a by a predetermined modulation method such as BPSK, QPSK, 16 QAM, 64 QAM, or 256 QAM. In this case, the signal points on the constellation do not necessarily have to be equidistant. The constellation may be a non-uniform constellation. The multiplexing unit 112c multiplexes the modulation symbol of each channel and a downlink reference signal and arranges the multiplexed symbols in a predetermined resource element. The wireless transmission unit 112d performs various types of signal processing on the signal from the multiplexing unit 112c. For example, the wireless transmission unit 112d performs processing such as conversion to a time domain by fast Fourier transform, addition of a guard interval (cyclic prefix), generation of a baseband digital signal, conversion to an analog signal, quadrature modulation, up-conversion, removal of an extra frequency component, and amplification of power. The signal generated by the transmission processing unit 112 is transmitted from the antenna 113.

The self-canceller unit 114 cancels self-interference in which a signal transmitted from the wireless transmission unit 112d leaks into the wireless reception unit 111a.

The storage unit 12 is a storage device capable of reading and writing data, such as a DRAM, an SRAM, a flash memory, or a hard disk. The storage unit 12 functions as a storage means of the base station device 100.

The control unit 13 is a controller that controls each unit of the base station device 100. The control unit 13 is implemented by, for example, a processor such as a central processing unit (CPU) or a micro processing unit (MPU). For example, the control unit 13 is implemented by a processor executing various programs stored in a storage device inside the base station device 100 using a random access memory (RAM) or the like as a work area. Note that the control unit 13 may be implemented by an integrated circuit such as an application specific integrated circuit (ASIC) or a field programmable gate array (FPGA). Any of the CPU, the MPU, the ASIC, and the FPGA can be regarded as a controller.

As illustrated in FIG. 11, the control unit 13 includes a determination unit 131. Each block (determination unit 131) constituting the control unit 13 is a functional block indicating a function of the control unit 13. These functional blocks may be software blocks or hardware blocks. For example, each of the functional blocks described above may be one software module implemented by software (including microprograms), or may be one circuit block on a semiconductor chip (die). Of course, each functional block may be one processor or one integrated circuit. A configuration method of the functional block is arbitrary.

Note that the control unit 13 may be configured by a functional unit different from the above-described functional block. The operation of the block (determination unit 131) constituting the control unit 13 will be described later.

<3.4. Configuration of Relay Device>

Figure 12:
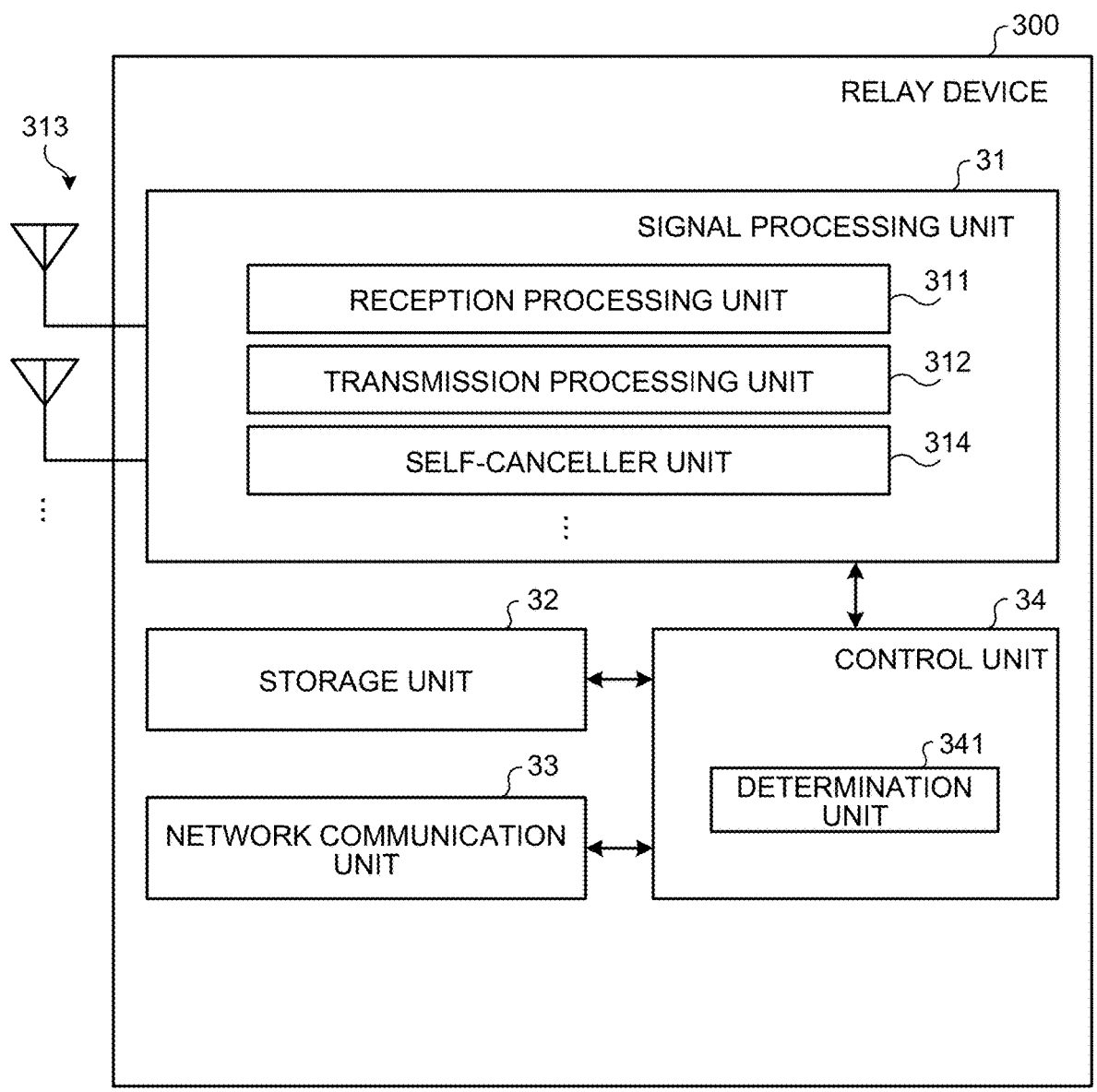
FIG. 12 is a diagram illustrating a configuration example of a relay device according to the embodiment of the present disclosure.

Next, a configuration of the relay device 300 will be described. FIG. 12 is a diagram illustrating a configuration example of the relay device 300 according to the embodiment of the present disclosure. The relay device 300 can perform the NOMA communication with the terminal device 200. The relay device 300 includes a signal processing unit 31, a storage unit 32, a network communication unit 33, and a control unit 34. Note that the configuration illustrated in FIG. 12 is a functional configuration, and the hardware configuration may be different from the functional configuration. In addition, the functions of the relay device 300 may be implemented in a distributed manner in a plurality of physically separated configurations.

The signal processing unit 31 is a signal processing unit for wirelessly communicating with other wireless communication devices (for example, the base station device 100 and the terminal device 200). The signal processing unit 31 operates under the control of the control unit 34. The signal processing unit 31 includes a reception processing unit 311, a transmission processing unit 312, an antenna 313, and a self-canceller unit 314. The configurations of the signal processing unit 31, the reception processing unit 311, the transmission processing unit 312, and the antenna 313 are similar to those of a signal processing unit 21, a reception processing unit 211, a transmission processing unit 212, an antenna 213, and a self-canceller unit 214 of the base station device 100.

The storage unit 32 is a storage device capable of reading and writing data, such as a DRAM, an SRAM, a flash memory, or a hard disk. The storage unit 32 functions as a storage means of the relay device 300. The configuration of the storage unit 32 is similar to that of the storage unit 22 of the base station device 100.

The network communication unit 33 is a communication interface for communicating with other devices. For example, the network communication unit 33 is a LAN interface such as an NIC. The network communication unit 33 may be a wired interface or a wireless interface. The network communication unit 33 functions as a network communication means of the relay device 300. The network communication unit 33 communicates with the base station device 100 under the control of the control unit 34.

The control unit 34 is a controller that controls each unit of the relay device 300. The configuration of the control unit 34 may be similar to that of the control unit 23 of the base station device 100. The control unit 34 includes a determination unit 341. The control unit 34 may be configured by a functional unit different from the above-described functional block.

<3.5. Configuration of Terminal Device>

Figure 13:
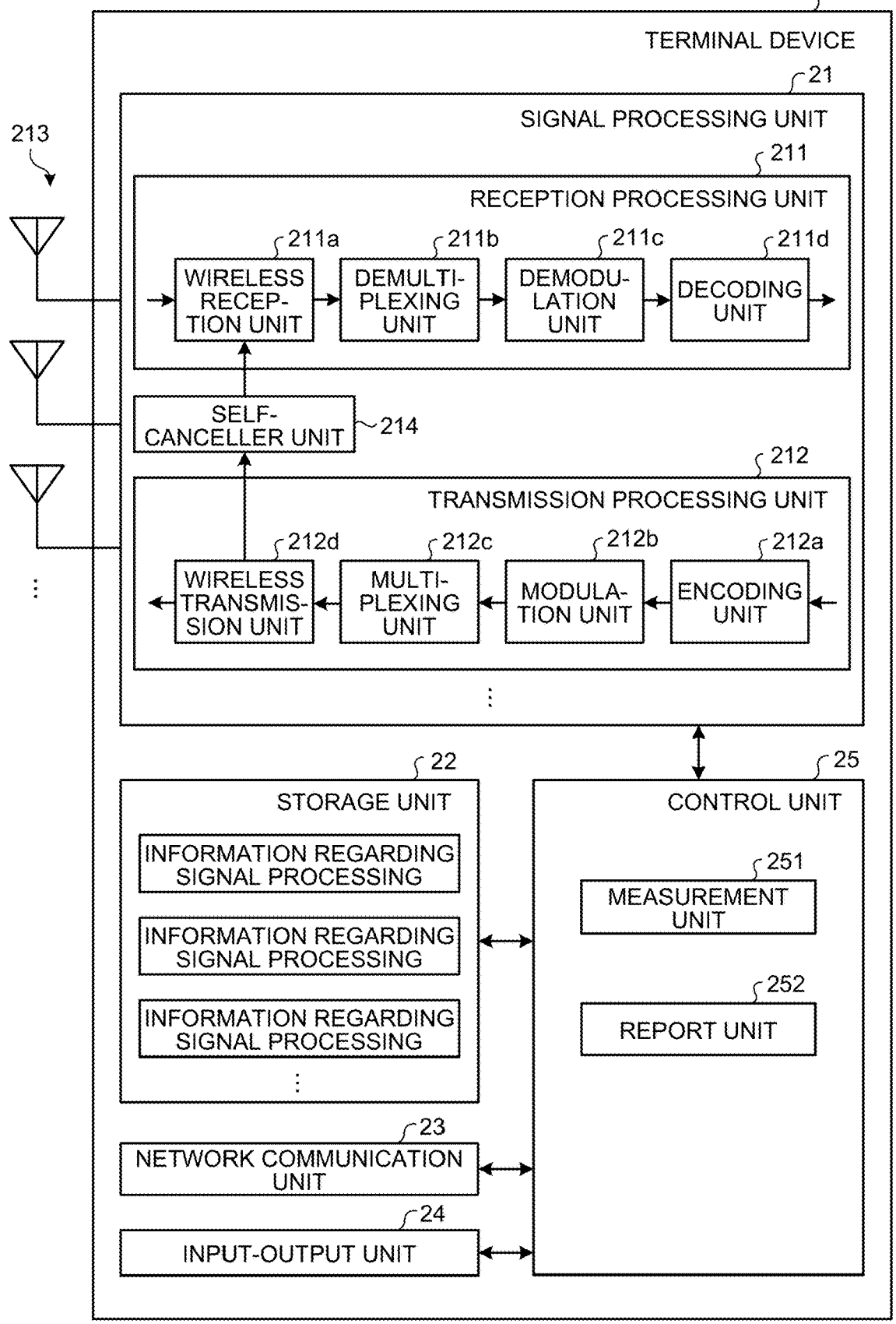
FIG. 13 is a diagram illustrating a configuration example of a terminal device according to the embodiment of the present disclosure.

Next, a configuration of the terminal device 200 will be described. FIG. 13 is a diagram illustrating a configuration example of the terminal device 200 according to the embodiment of the present disclosure. The terminal device 200 can use a 2-step random access procedure in addition to the conventional 4-step random access procedure (contention-based random access procedure) and the conventional 3-step random access procedure (non-contention-based random access procedure). The terminal device 200 can perform the NOMA communication with the base station device 100 and the relay device 30. The terminal device 200 includes a signal processing unit 21, a storage unit 22, a network communication unit 23, an input-output unit 24, and a control unit 25. Note that the configuration illustrated in FIG. 13 is a functional configuration, and the hardware configuration may be different from the functional configuration. In addition, the functions of the terminal device 200 may be implemented in a distributed manner in a plurality of physically separated configurations.

The signal processing unit 21 is a signal processing unit for wirelessly communicating with other wireless communication devices (for example, the base station device 100 and the relay device 30). The signal processing unit 21 operates under the control of the control unit 25. The signal processing unit 21 supports one or a plurality of wireless access methods. For example, the signal processing unit 21 that supports both the NR and the LTE. The signal processing unit 21 may support W-CDMA or cdma 2000 in addition to the NR or the LTE. Further, the signal processing unit 21 supports communication using NOMA.

The signal processing unit 21 includes a reception processing unit 211, a transmission processing unit 212, an antenna 213, and a self-canceller unit 214. The signal processing unit 21 may include a plurality of the reception processing units 211, a plurality of the transmission processing units 212, a plurality of the antennas 213, and a plurality of the self-canceller units 214. Note that, in a case where the signal processing unit 21 supports a plurality of wireless access methods, each unit of the signal processing unit 21 can be configured individually for each wireless access method. For example, the reception processing unit 211 and the transmission processing unit 212 may be individually configured by the LTE and the NR.

The reception processing unit 211 processes the downlink signal received via the antenna 213. The reception processing unit 211 includes a wireless reception unit 211a, a demultiplexing unit 211b, a demodulation unit 211c, and a decoding unit 211d.

The wireless reception unit 211a performs, on the downlink signal, down-conversion, removal of an unnecessary frequency component, control of an amplification level, quadrature demodulation, conversion to a digital signal, removal of a guard interval (cyclic prefix), extraction of a frequency domain signal by fast Fourier transform, and the like. The demultiplexing unit 211b demultiplexes a downlink channel, a downlink synchronization signal, and the downlink reference signal from the signal output from the wireless reception unit 211a. The downlink channel is, for example, a channel such as a physical broadcast channel (PBCH), a physical downlink shared channel (PDSCH), or a physical downlink control channel (PDCCH). The demodulation unit 211c demodulates the reception signal using a modulation method such as BPSK, QPSK, 16 QAM, 64 QAM, or 256 QAM with respect to the modulation symbol of the downlink channel. In this case, the signal points on the constellation do not necessarily have to be equidistant. The constellation may be a non-uniform constellation. The decoding unit 211d performs a decoding process on the demodulated coded bits of the downlink channel. The decoded downlink data and downlink control information are output to the control unit 25.

The transmission processing unit 212 performs transmission processing of the uplink control information and the uplink data. The transmission processing unit 212 includes an encoding unit 212a, a modulation unit 212b, a multiplexing unit 212c, and a wireless transmission unit 212d.

The encoding unit 212a encodes the uplink control information and the uplink data input from the control unit 25 using an encoding method such as block encoding, convolutional encoding, turbo encoding, or the like. The modulation unit 212b modulates the coded bits output from the encoding unit 212a by a predetermined modulation method such as BPSK, QPSK, 16 QAM, 64 QAM, or 256 QAM. In this case, the signal points on the constellation do not necessarily have to be equidistant. The constellation may be a non-uniform constellation. The multiplexing unit 212c multiplexes the modulation symbol of each channel and the uplink reference signal and arranges the multiplexed symbols in a predetermined resource element. The wireless transmission unit 212d performs various types of signal processing on the signal from the multiplexing unit 212c. For example, the wireless transmission unit 212d performs processing such as conversion to a time domain by inverse fast Fourier transform, addition of a guard interval (cyclic prefix), generation of a baseband digital signal, conversion to an analog signal, quadrature modulation, up-conversion, removal of an extra frequency component, and amplification of power. A signal generated by the transmission processing unit 212 is transmitted from the antenna 213.

The self-canceller unit 214 cancels self-interference in which a signal transmitted from the wireless transmission unit 212d leaks into the wireless reception unit 211a. The storage unit 22 is a storage means capable of reading and writing data, such as a DRAM, an SRAM, a flash memory, or a hard disk. The storage unit 22 functions as a storage means of the terminal device 200.

The network communication unit 23 is a communication interface for communicating with other devices. For example, the network communication unit 23 is a LAN interface such as an NIC. The network communication unit 23 may be a wired interface or a wireless interface. The network communication unit 23 functions as a network communication means of the terminal device 200. The network communication unit 23 communicates with other devices under the control of the control unit 25.

The input-output unit 24 is a user interface for exchanging information with the user. For example, the input-output unit 24 is an operation device for the user to perform various operations, such as a keyboard, a mouse, an operation key, and a touch panel. Alternatively, the input-output unit 24 is a display device such as a liquid crystal display or an organic electroluminescence display. The input-output unit 24 may be an acoustic device such as a speaker or a buzzer. In addition, the input-output unit 24 may be a lighting device such as a light emitting diode (LED) lamp. The input-output unit 24 functions as an input-output unit (input means, output means, operation means, or notification means) of the terminal device 200.

The control unit 25 is a controller that controls each unit of the terminal device 200. The control unit 25 is implemented by, for example, a processor such as a CPU or an MPU. For example, the control unit 25 is implemented by a processor executing various programs stored in a storage device inside the terminal device 200 using a RAM or the like as a work area. Note that the control unit 25 may be implemented by an integrated circuit such as an ASIC or an FPGA. Any of the CPU, the MPU, the ASIC, and the FPGA can be regarded as a controller.

As illustrated in FIG. 13, the control unit 25 includes a measurement unit 251 and a report unit 252. Each block (the measurement unit 251 and the report unit 252) constituting the control unit 25 is a functional block indicating a function of the control unit 25. These functional blocks may be software blocks or hardware blocks. For example, each of the functional blocks described above may be one software module implemented by software (including microprograms), or may be one circuit block on a semiconductor chip (die). Of course, each functional block may be one processor or one integrated circuit. A configuration method of the functional block is arbitrary.

Note that the control unit 25 may be configured by a functional unit different from the above-described functional block. The operation of each block (the measurement unit 251 and the report unit 252) constituting the control unit 25 will be described later.

Note that the base station device 100 that will appear in the following description is typically assumed to be a base station such as the eNB or the gNB, but of course the base station device 100 is not limited to the eNB or the gNB. For example, the base station device 100 may be a relay terminal or a terminal such as a leader terminal in a terminal group. In addition, the base station device 100 may be the device (or system) exemplified in <3.1. Overall Configuration of Communication System> or the like. The description of the base station device 100 appearing in the following description can be replaced with the "relay device 300" or the "terminal device 100".

In addition, in the following description, there is a portion where a specific value is illustrated and described when a specific example is illustrated, but the value does not depend on the example, and another value may be used.

Further, the concept of "resource" includes frequency, time, resource element, resource block, bandwidth part, component carrier, symbol, sub-symbol, slot, mini-slot, subframe, frame, PRACH occasion, occasion, code, multi-access physical resource, multi-access signature, and the like. Of course, the resource is not limited thereto.

4. OVERVIEW OF ASSUMED SYSTEM

In the assumed system of the communication system S, a wireless system including a base station device and a terminal device and wirelessly communicating, for example, different quality of service (QoS) between the eMBB signal and the URLLC signal between the base station device and the terminal device is assumed.

The eMBB signal and the URLLC signal have different lengths of allocated resources in addition to the QoS. Specifically, the length of the channel (such as PDSCH/PUSCH/PUCCH) allocated to the URLLC signal tends to be shorter than the length of the channel allocated to the eMBB signal.

Further, a channel quality indicator (CQI) table is different between the eMBB signal and the URLLC signal. The CQI table applied to the eMBB signal includes many high-efficiency modulation and coding rates, and the CQI table applied to the URLLC signal includes many low-efficiency modulation and coding rates. Specifically, the CQI table applied to the eMBB signal includes the 256 QAM, and the CQI table applied to the URLLC signal does not include the 256 QAM. In the CQI table applied to the eMBB signal and the CQI table applied to the URLLC signal, the CQI error rate table applied to the eMBB signal is more efficient in the case of the same index.

Further, a modulation and coding scheme (MCS) table is different between the eMBB signal and the URLLC signal. The MCS table applied to the eMBB signal includes many high-efficiency modulation and coding rates, and the MCS table applied to the URLLC signal includes many low-efficiency modulation and coding rates. Specifically, in the MCS table applied to the eMBB signal and the MCS table applied to the URLLC signal, the MCS table applied to the eMBB signal is more efficient in the case of the same index.

Further, the eMBB signal and the URLLC signal are also different in the presence or absence of repetitive transmission setting. The repetitive transmission setting is not applied to the eMBB signal, and the repetition repetitive transmission setting using a plurality of resources is applied to the URLLC signal.

Further, the eMBB signal and the URLLC signal have different PDSCH/PUSCH mapping types. Specifically, slot-based scheduling (PDSCH/PUSCH mapping type A) tends to be applied to the eMBB signal, and non-slot-based scheduling (PDSCH/PUSCH mapping type B) tends to be performed on the URLLC signal. The slot-based scheduling is a method in which a resource is allocated from the head of the slot on the time axis, and the non-slot-based scheduling is a method in which a resource can be allocated from the middle of the slot on the time axis.

Further, the eMBB signal and the URLLC signal are different in a bandwidth part (BWP) to be used. One or more bandwidth parts are set for the terminal device. One predetermined numerology (subcarrier spacing and symbol length) is set in the bandwidth part. A bandwidth part that is set with a numerology (for example, in FR1, a subcarrier spacing of 15 kHz or 30 kHz) having a narrow subcarrier spacing and a long symbol length is used to transmit and receive the eMBB signal. On the other hand, for transmission and reception of the URLLC signal, a bandwidth part that is set with a numerology (for example, in FR1, a subcarrier spacing of 30 kHz or 60 kHz) having a wide subcarrier spacing and a short symbol length is used.

[Assumed System S_A]

Figure 14:
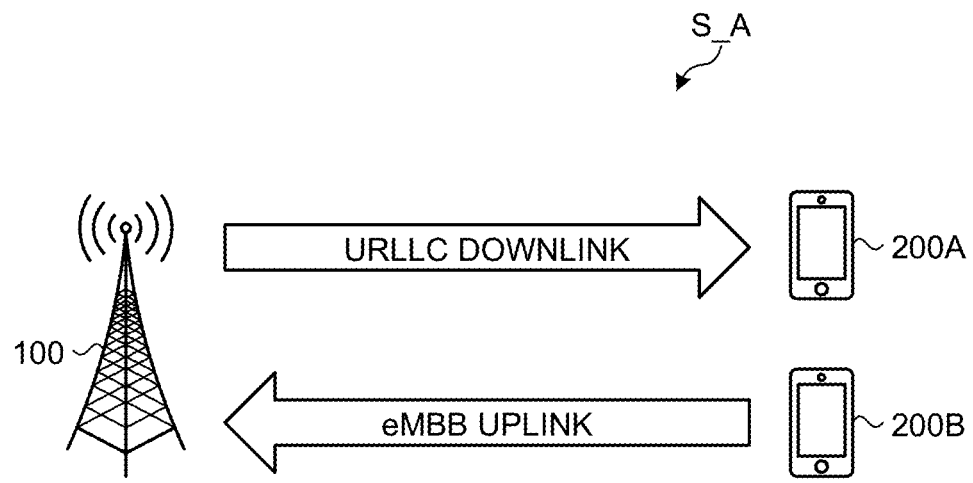
FIG. 14 is a diagram illustrating a configuration example of an assumed system according to the embodiment of the present disclosure.

FIG. 14 is a diagram illustrating a configuration example of an assumed system S_A according to the embodiment of the present disclosure. FIG. 14 illustrates a case where the base station device 100 supports the IBFD.

Since the base station device 100 can perform the IBFD operation, it is possible to receive the wireless signal in the uplink from the terminal device 200B while transmitting the wireless signal to the terminal device 200A in the downlink using the same resource.

In the example of FIG. 14, the base station device 100 transmits the URLLC signal as the downlink signal. The downlink for performing such transmission is also referred to as a URLLC downlink. Further, the base station device 100 receives the eMBB signal as the uplink signal. The uplink for performing such reception is also referred to as an eMBB uplink. The base station device 100 multiplexes the eMBB uplink and the URLLC downlink with respect to the two terminal devices 200A and 200B.

[Assumed System S_B]

Figure 15:
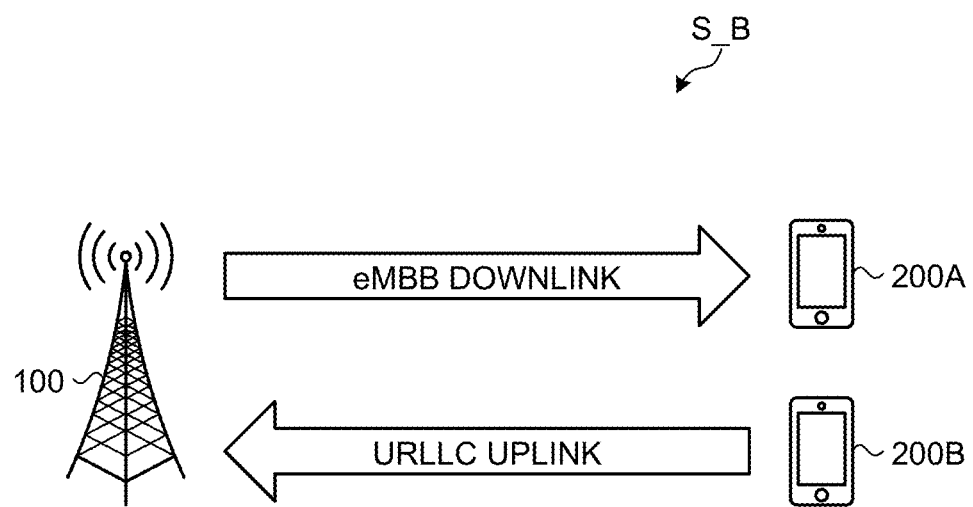
FIG. 15 is a diagram illustrating a configuration example of an assumed system according to the embodiment of the present disclosure.

FIG. 15 is a diagram illustrating a configuration example of an assumed system S_B according to the embodiment of the present disclosure. Similarly to FIG. 14, FIG. 15 illustrates a case where the base station device 100 supports the IBFD. In FIG. 15, the base station device 100 transmits the eMBB signal as the downlink signal. The downlink for performing such transmission is also referred to as an eMBB downlink. Further, the base station device 100 receives the URLLC signal as the uplink signal. The uplink for performing such reception is also referred to as a URLLC uplink. The base station device 100 multiplexes the URLLC uplink and the eMBB downlink with respect to the two terminal devices 200A and 200B.

[Assumed System S_C]

Figure 16:
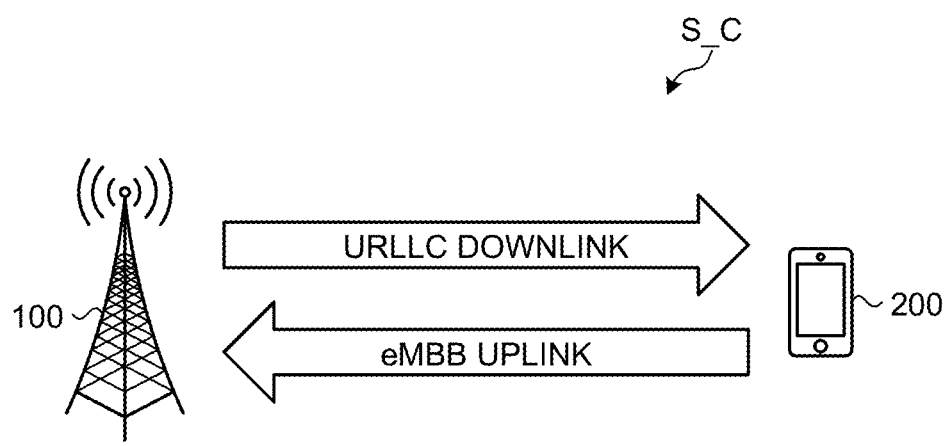
FIG. 16 is a diagram illustrating a configuration example of an assumed system according to the embodiment of the present disclosure.

FIG. 16 is a diagram illustrating a configuration example of an assumed system S_C according to the embodiment of the present disclosure. FIG. 16 illustrates a case where the base station device 100 and the terminal device 200 support the IBFD.

Since the base station device 100 and the terminal device 200 can perform the IBFD operation, the wireless signal can be transmitted from the terminal device 200 to the base station device 100 in the uplink while the wireless signal is transmitted from the base station device 100 to the terminal device 200 in the downlink using the same resource.

In the example of FIG. 16, the base station device 100 transmits the URLLC signal as the downlink signal. Further, the base station device 100 receives the eMBB signal as the uplink signal. The base station device 100 multiplexes the eMBB uplink and the URLLC downlink with respect to one terminal device 200.

[Assumed System S_D]

Figure 17:
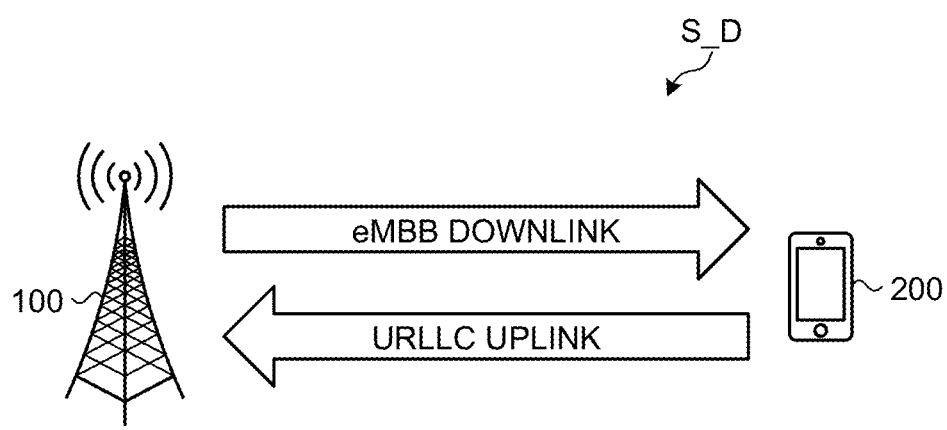
FIG. 17 is a diagram illustrating a configuration example of an assumed system according to the embodiment of the present disclosure.

FIG. 17 is a diagram illustrating a configuration example of an assumed system S_D according to the embodiment of the present disclosure. Similarly to FIG. 16, FIG. 17 illustrates a case where the base station device 100 and the terminal device 200 support the IBFD. In FIG. 17, the base station device 100 transmits the eMBB signal as the downlink signal. Further, the base station device 100 receives the URLLC signal as the uplink signal. The base station device 100 performs multiplexing of the URLLC uplink and the eMBB downlink for one terminal device 200.

[Assumed System S_E]

Figure 18:
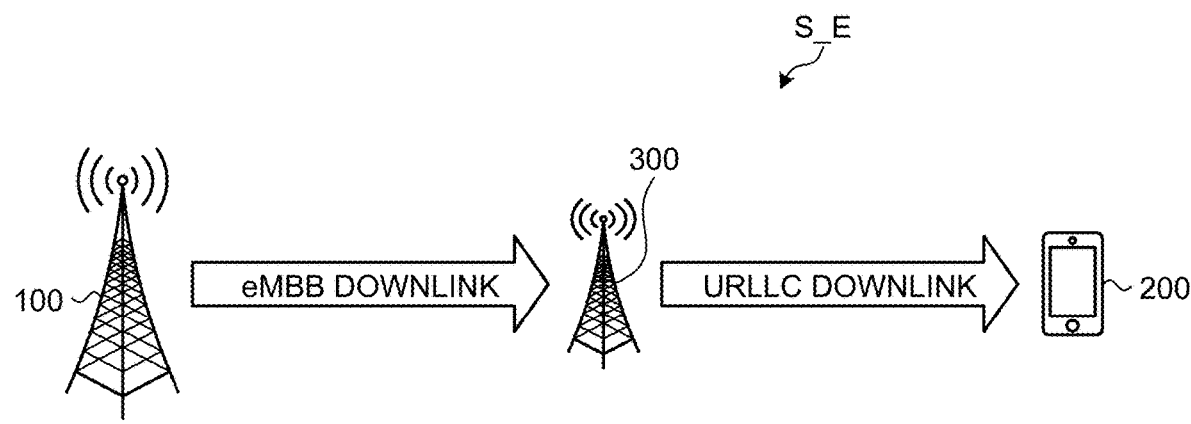
FIG. 18 is a diagram illustrating a configuration example of an assumed system according to the embodiment of the present disclosure.

FIG. 18 is a diagram illustrating a configuration example of an assumed system S_E according to the embodiment of the present disclosure. FIG. 18 illustrates a case where the relay device (relay) 300 supports the IBFD.

Since the relay device 300 can perform the IBFD operation, the wireless signal can be transmitted to the terminal device 200 in the downlink access link while receiving the wireless signal in the downlink backhaul link from the base station device 100 using the same resource.

In the example of FIG. 18, the relay device 300 receives the eMBB signal from the base station device 100. Further, the relay device 300 transmits the URLLC signal to the terminal device 200 using the same resource as the reception of the eMBB signal from the base station device 100. The relay device 300 multiplexes the eMBB downlink backhaul link and the URLLC downlink access link with respect to one base station device 100 and one terminal device 200.

[Assumed System S_F]

Figure 19:
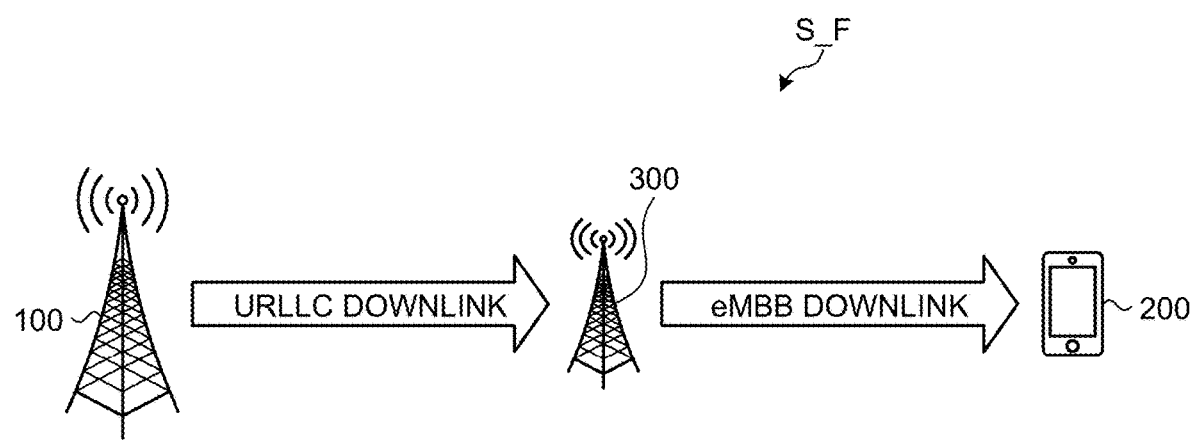
FIG. 19 is a diagram illustrating a configuration example of an assumed system according to the embodiment of the present disclosure.

FIG. 19 is a diagram illustrating a configuration example of an assumed system S_F according to the embodiment of the present disclosure. Similarly to FIG. 18, FIG. 19 illustrates a case where the relay device 300 supports the IBFD. In FIG. 19, the relay device 300 receives the URLLC signal from the base station device 100. Further, the relay device 300 transmits the eMBB signal to the terminal device 200 using the same resource as the reception of the eMBB signal from the base station device 100. The relay device 300 multiplexes the URLLC downlink backhaul link and the eMBB downlink access link with respect to one base station device 100 and one terminal device 200.

[Assumed System S_G]

Figure 20:
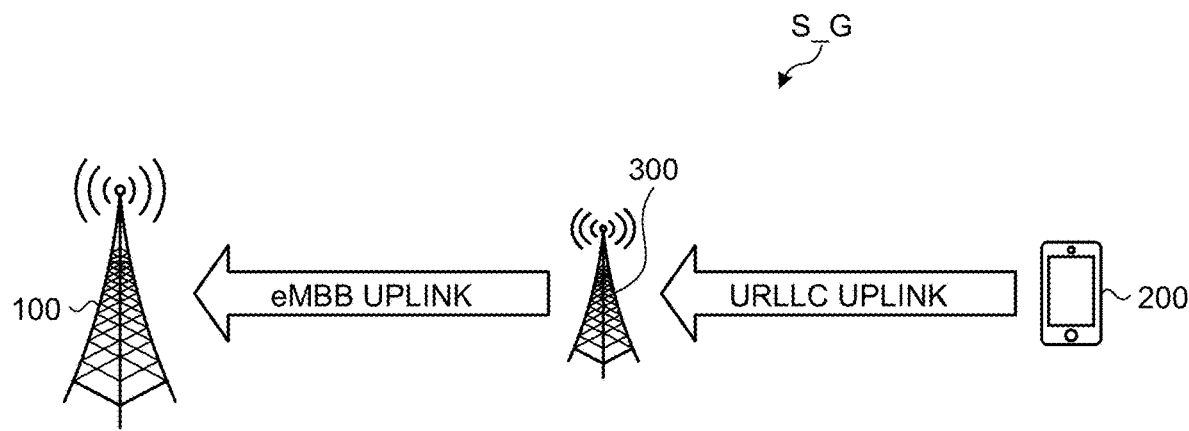
FIG. 20 is a diagram illustrating a configuration example of an assumed system according to the embodiment of the present disclosure.

FIG. 20 is a diagram illustrating a configuration example of an assumed system S_G according to the embodiment of the present disclosure. Similarly to FIGS. 18 and 19, FIG. 20 illustrates a case where the relay device 300 supports the IBFD. In FIG. 20, the wireless signal is received from the terminal device 200 in the uplink access link while the wireless signal is transmitted to the base station device 100 in the uplink backhaul link using the same resource.

The relay device 300 receives the URLLC signal from the terminal device 200. Further, the relay device 300 transmits the eMBB signal to the base station device 100 using the same resource as the reception of the URLLC signal from the terminal device 200. The relay device 300 multiplexes an eMBB uplink backhaul link and an URLLC uplink access link with respect to one base station device 100 and one terminal device 200.

[Assumed System S_H]

Figure 21:
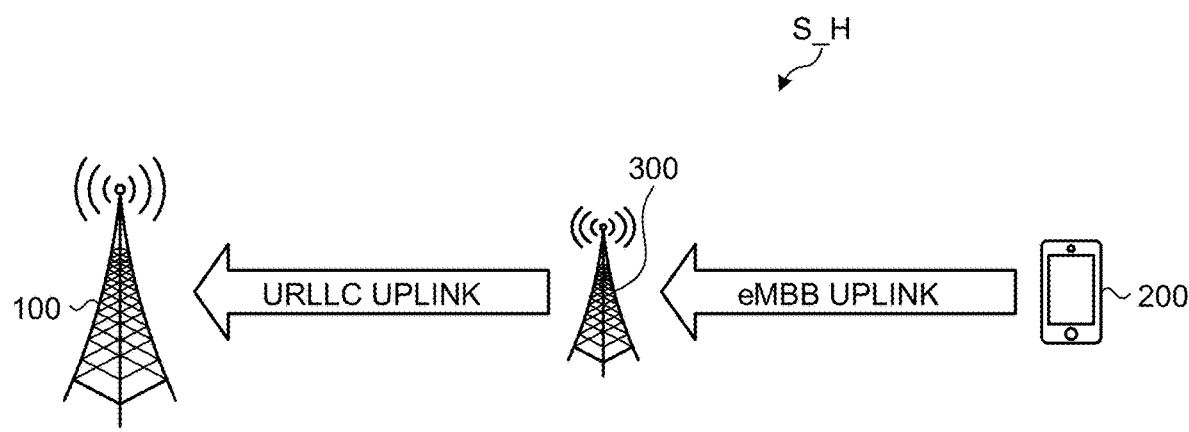
FIG. 21 is a diagram illustrating a configuration example of an assumed system according to the embodiment of the present disclosure.

FIG. 21 is a diagram illustrating a configuration example of an assumed system S_H according to the embodiment of the present disclosure. Similarly to FIGS. 18 to 20, FIG. 21 illustrates a case where the relay device 300 supports the IBFD. In FIG. 21, the relay device 300 receives the eMBB signal from the terminal device 200. Further, the relay device 300 transmits the URLLC signal to the base station device 100 using the same resource as the reception of the eMBB signal from the terminal device 200. The relay device 300 multiplexes the URLLC uplink backhaul link and the eMBB uplink access link with respect to one base station device 100 and one terminal device 200.

Note that, in the assumed systems S_E to S_H, the relay device 300 relays the base station device 100 and the terminal device 200, but it is not limited thereto. For example, the relay device 300 may relay the base station device 100 and another relay device 300, or the other relay devices 300 to each other.

Further, in the assumed systems S_E to S_H, the relay device 300 is a type of the base station device 100, but it is not limited thereto. For example, the relay device 300 may be a type of the terminal device 200. For example, communication between the relay device 300 and the terminal device 200 may be sidelink communication.

[Assumed System S_I]

Figure 22:
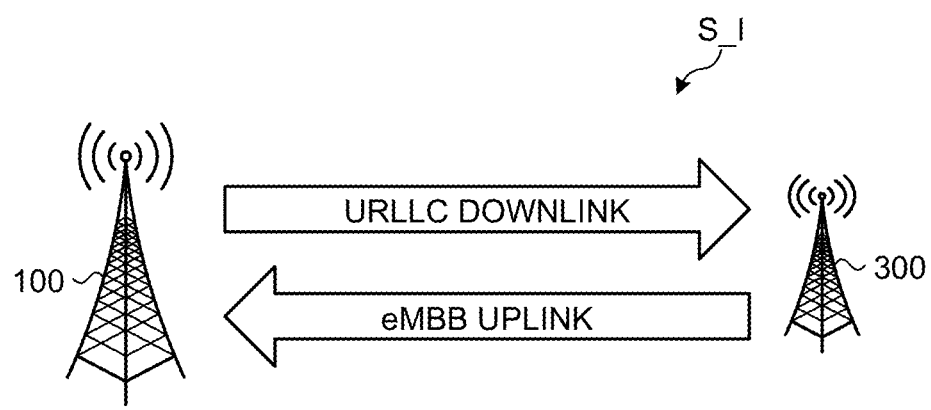
FIG. 22 is a diagram illustrating a configuration example of an assumed system according to the embodiment of the present disclosure.

FIG. 22 is a diagram illustrating a configuration example of an assumed system S_I according to the embodiment of the present disclosure. FIG. 22 illustrates a case where the base station device 100 and the relay device (relay) 300 support the IBFD.

Since the base station device 100 and the relay device 300 can perform the IBFD operation, the base station device 100 can receive the wireless signal from the relay device 300 in the uplink backhaul link while transmitting the wireless signal to the relay device 300 in the downlink backhaul link using the same resource.

In the example of FIG. 22, the relay device 300 receives the URLLC signal from the base station device 100. Further, the relay device 300 transmits the eMBB signal to the base station device 100 using the same resource as the reception of the URLLC signal from the base station device 100. The base station device 100 multiplexes the eMBB uplink backhaul link and the URLLC downlink backhaul link with respect to one relay device 300.

[Assumed System S_J]

Figure 23:
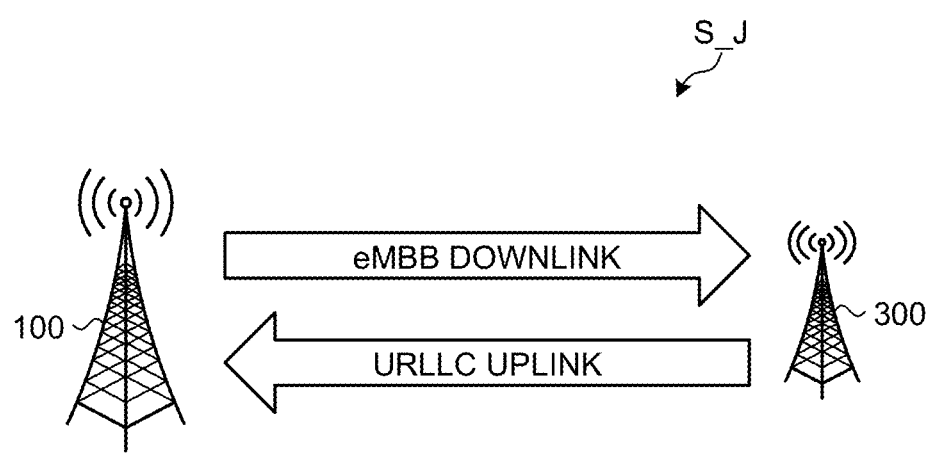
FIG. 23 is a diagram illustrating a configuration example of an assumed system according to the embodiment of the present disclosure.

FIG. 23 is a diagram illustrating a configuration example of an assumed system S_J according to the embodiment of the present disclosure. Similarly to FIG. 22, FIG. 23 illustrates a case where the base station device 100 and the relay device 300 support the IBFD. In FIG. 23, the relay device 300 receives the eMBB signal from the base station device 100. Furthermore, the relay device 300 transmits the URLLC signal to the base station device 100 using the same resource as the reception of the eMBB signal from the base station device 100. The base station device 100 multiplexes the URLLC uplink backhaul link and the eMBB downlink backhaul link with respect to one relay device 300.

[Assumed System S_K]

Figure 24:
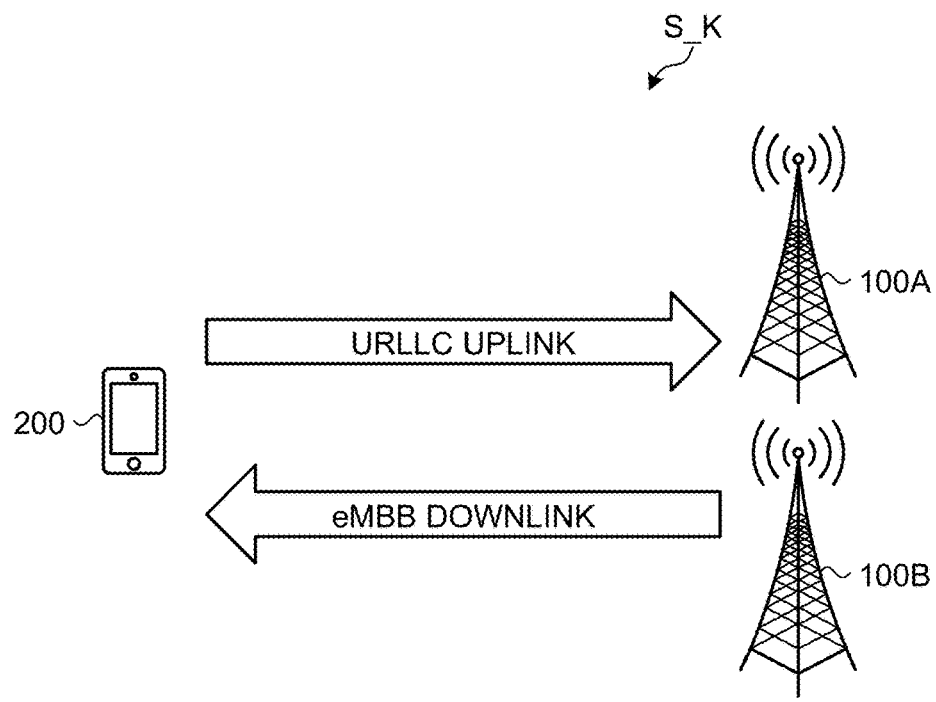
FIG. 24 is a diagram illustrating a configuration example of an assumed system according to the embodiment of the present disclosure.

FIG. 24 is a diagram illustrating a configuration example of an assumed system S_K according to the embodiment of the present disclosure. FIG. 43 illustrates a case where the terminal device 200 supports the IBFD.

Since the terminal device 200 can perform the IBFD operation, the terminal device 200 can receive the wireless signal from the base station device 100B in the downlink access link while transmitting the wireless signal to the base station device 100A in the uplink access link using the same resource.

In the example of FIG. 24, the terminal device 200 transmits the URLLC signal to the base station device 100A. Further, the terminal device 200 receives the eMBB signal from the base station device 100B using the same resource as the transmission of the URLLC signal to the base station device 100A. The terminal device 200 multiplexes the URLLC uplink access link and the eMBB downlink access link with respect to the two base station devices 100A and 100B.

In the example of FIG. 24, for example, transmission and reception point (TRP) communication, communication at the time of handover, and the like are assumed.

[Assumed System S_L]

Figure 25:
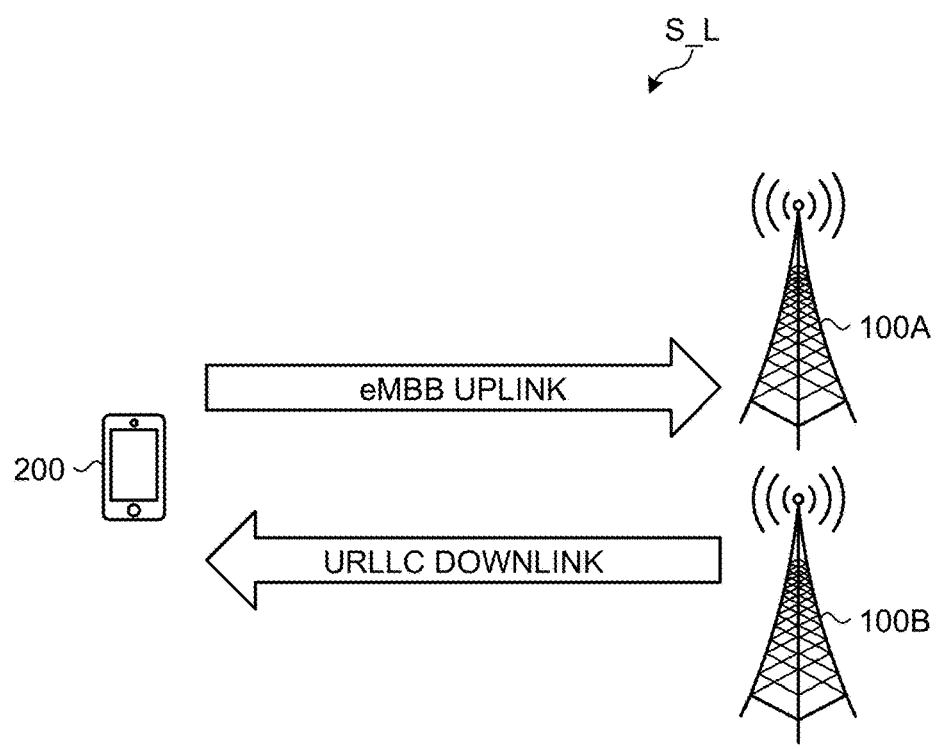
FIG. 25 is a diagram illustrating a configuration example of an assumed system according to the embodiment of the present disclosure.

FIG. 25 is a diagram illustrating a configuration example of an assumed system S_L according to the embodiment of the present disclosure. Similarly to FIG. 24, FIG. 25 illustrates a case where the terminal device 200 supports the IBFD. In FIG. 25, the terminal device 200 transmits the eMBB signal to the base station device 100A. Furthermore, the terminal device 200 receives the URLLC signal from the base station device 100B using the same resource as the transmission of the eMBB signal to the base station device 100A. The terminal device 200 multiplexes the eMBB uplink access link and the URLLC downlink access link with respect to the two base station devices 100A and 100B.

Note that the above-described assumed system S is an example, and the configuration of the assumed system S is not limited to the examples of FIGS. 14 to 25. It is only required to be a wireless system that includes a communication device (for example, the terminal device 200 in FIG. 25) that supports the IBFD that transmits and receives wireless signals in the same resource.

Note that, hereinafter, in order to simplify the description, it is assumed that the base station device 100 (corresponding to a first communication device) capable of the IBFD operation and a plurality of the terminal devices 200A and 200B (corresponding to a communication device and a second communication device) perform wireless communication. That is, although the assumed system in FIGS. 14 and 15 described above will be described, the assumed system to which the technical idea according to the present embodiment is applied is not limited to the assumed systems in FIGS. 14 and 15. For example, the technical idea according to the present embodiment may be applied to an assumed system illustrated in FIGS. 14 to 24. In this case, the communication device, the first communication device, and the second communication device are replaced with any one of the base station device 100, the terminal device 200, and the relay device 300.

5. OVERVIEW OF USED SIGNAL

<5.1. QoS Level>
<5.1.1. Example of Type of Data and QoS Request Values>

Here, the QoS level at which the terminal device 200 measures the channel quality will be described. As described above, in the 5G, the requested reception quality differs depending on the communication use case. Examples of the type of data transmitted for each communication use case and the requested reception quality (QoS request values) include the following.
(Example of eMBB Data)

Examples of the eMBB data include audio data, video data, and streaming. Examples of the QoS request values of each piece of the eMBB data are as follows.
Audio Data
  Allowed delay value: 100 msec
  Packet error rate: $10^{-2}$
Video Data
  Allowed delay value: 150 msec
  Packet error rate: $10^{-3}$
Streaming
  Allowed delay value: 300 msec
  Packet error rate: $10^{-6}$
(Example of URLLC Data)

Examples of the URLLC data include sensor data and a control signal of a robot, remote control sensor data and a control signal of a car, a train, or the like, and sensor data and a control signal of a power distribution system. Examples of the QoS request values of each piece of the URLLC data are as follows.
Robot Sensor Data/Control Signals
  Allowed delay value: 10 msec
  Packet error rate: $10^{-4}$
  Sensor data/control signal for remote control of cars, trains, and the like
  Allowed delay value: 30 msec
  Packet error rate: $10^{-5}$
  Sensor data/control signals for power distribution systems
  Allowed delay value: five msec
  Packet error rate: $10^{-5}$
Note that the eMBB data and the URLLC data described above are examples and are not limited thereto. For example, the eMBB data may be text data.

<5.1.2. Mapping Example of Data and QoS Index>

In a 4G system in 3GPP, the QoS request value is classified as a QoS class identifier (QCI). In a 5G system in the 3GPP, the QoS request value is classified as a 5G QoS Identifier (5QI). FIGS. 26A to 26C are correspondence tables of types of data and QoS request values of 5G. The correspondence tables illustrated in FIGS. 26A to 26C are described in TS 23.501 Table 5.7.4-1.

The QoS request values (QoS characteristics) in the 3GPP are defined by
  a resource type (Resource Type),
  an initial priority level (Default Priority Level),
  a packet delay budget (Packet Delay Budgets: PDB),
  a packet error rate (Packet Error Rate),
  an initial maximum data burst amount (Default Maximum Data Burst Volume),
  a default averaging window (Default Averaging Window),
and the like.

The resource type is determined when a dedicated network resource associated with a guaranteed flow bit rate (GFBR) value of the QoS flow level is allocated. The resource type is classified into any of a guaranteed bit rate (GBR), a critical GBR, and a non-GBR.

The priority level indicates the priority of the scheduling resource between QoS flows.

The packet delay budget is a maximum allowed value of a delay time between the UPF and the terminal device 200 terminated in the N6 interface.

The packet error rate is an allowable value of an error rate of a PDU (for example, an IP packet) in a link layer protocol (for example, the RLC layer in the RAN of the 3GPP).

The averaging window is an interval in which a GFBR and a maximum flow bit rate (MFBR) are calculated.
(Mapping in 3GPP)

The QoS index described above is a QoS index in the 3GPP. In the 3GPP, mapping between QoS and data is performed, for example, at a service data adaptation protocol (SDAP) layer. Specifically, in the SDAP layer, an identifier indicating the QoS corresponding to the IP flow is included in the header and notified.

For example, the eMBB data described above corresponds to 1 to 4 of the 5QI values in FIGS. 26A to 26C. The terminal device 200 according to the present embodiment measures the channel quality for each 5QI value, for example. Alternatively, the terminal device 200 divides the 5QI values into a plurality of groups, sets each group as a QoS level, and measures the channel channel quality for each group.

6. OVERVIEW OF CHANNEL QUALITY MEASUREMENT METHOD

In the present embodiment, the terminal device 200 and the base station device 100 measure the state of a propagation path between the terminal device 200 and the base station device 100 as the channel quality. The terminal device 200 and the base station device 100 measure received power of a predetermined signal or received power of all signals by using the configured resources. The received power of a predetermined signal is also referred to as reference signal received power (RSRP), and the received power of all signals is also referred to as received signal strength indicator (RSSI).

In the 3GPP, examples of types of measurement of the downlink channel include CSI measurement, RLM measurement, and RRM measurement. The CSI (Channel State Information) measurement is also referred to as Layer 1 (L1) measurement, and Radio Resource Management (RRM)

measurement is also referred to as Layer 3 (L3) measurement. Further, in the 3GPP, examples of assumed types of the uplink channel include channel state (CS) measurement (estimation) and RRM measurement.

An L3 measurement result is calculated on the basis of one or more L1 measurement results. For example, the L3 measurement result is calculated by an average of a plurality of L1 measurement results having different measurement resources. For example, the L3 measurement result is calculated by performing L3 filtering using a filter coefficient (filterCoefficient) for a plurality of L1 measurement results having different measurement resources.

(CSI Measurement)

The result of the CSI measurement is mainly used for dynamic resource allocation such as dynamic scheduling.

The signal strength in the downlink CSI measurement is measured by using, for example, a CSI-RS. The downlink CSI measurement is reported as CSI feedback from the terminal device 200 to the base station device 100. The downlink CSI includes a channel quality indicator (CQI), a precoding matrix indicator (PMI), a CSI-RS resource indicator (CRI), an SS/PBCH block resource indicator (SSBRI), a layer indicator (LI), a rank indicator (RI), and/or L1-RSRP.

The CQI is information indicating channel quality with a serving cell. The terminal device 200 calculates the SINR satisfying a predetermined error rate of the PDSCH as a CQI index, and feeds back the CQI index to the base station device 100. The predetermined error rate is, for example, $10^{-1}$ for the eMBB and $10^{-5}$ or $10^{-6}$ for the URLLC.

The PMI is information indicating a precoding matrix desired by the terminal device 200. The terminal device 200 calculates a precoding matrix appropriate for reception of the PDSCH, and feeds back the precoding matrix to the base station device 100 as a PMI.

The CRI is information indicating a CSI-RS with good reception quality. The terminal device 200 detects the CSI-RS with high CSI-RSRP and feeds back a CRI corresponding to the CSI-RS to the base station device 100.

The SSBRI is information indicating an SS/PBCH block with good reception quality. The terminal detects the SS/PBCH block with high SS-RSRP, and feeds back the SSBRI corresponding to the SS/PBCH block to the base station.

The LI is information indicating the strongest layer among the plurality of layers. The terminal device 200 calculates a layer with high reception strength and feeds back the layer as LI to the base station device 100.

The RI is information indicating the number of ranks desired by the terminal device 200. The terminal device 200 calculates an appropriate number of ranks according to the number of antennas and the reception quality, and feeds back the number of ranks to the base station device 100.

The L1-RSRP is information of the RSRP in Layer 1 (physical layer). The L1-RSRP has a feature that a measurement and reporting period is shorter than that of the RSRP in RRM measurement described later.

The downlink CSI measurement is defined by a set (CSI Resource Setting) of a resource for performing channel measurement and a resource for performing interference measurement. The resource for performing channel measurement is defined as an NZP CSI-RS resource. The resource for performing interference measurement is defined as a CSI-IM resource or an NZP CSI-RS resource. The base station device 100 configures one or more CSI Resource Settings for the terminal device 200. The terminal device 200 measures desired signal power and interference power on the basis of the configured CSI Resource Setting, and calculates channel quality (such as SINR or CQI).

The signal strength in the uplink CS measurement is measured using, for example, a sounding reference signal (SRS). As methods of SRS transmission, there are three types of periodic SRS transmission, semi-persistent SRS transmission, and aperiodic SRS transmission. In the periodic SRS transmission, when an SRS resource is configured by the RRC, the terminal device 200 transmits the SRS using the configured SRS resource. In the semi-persistent SRS transmission, when the SRS resource is configured by the RRC and an instruction of activation for the SRS transmission is received by DCI, the terminal device 200 transmits the SRS in the configured SRS resource until an instruction of deactivation is received. In the aperiodic SRS transmission, when the SRS resource is configured by the RRC and an SRS transmission trigger is instructed by the DCI, the terminal transmits the SRS once in the configured SRS resource.

The time/frequency resource on which the SRS is transmitted is configured by the RRC. The SRS is transmitted in rear six symbols of the slot. In the periodic SRS transmission and semi-persistent SRS transmission, the SRS is configured with a period and a slot offset.

(RRM Measurement)

The result of the RRM measurement is mainly used for semi-static resource control such as RRC configuration and handover processing. In the RRM measurement, as an example, Reference Signal Received Power (RSRP), Reference Signal Received Quality (RSRQ), Received Signal Strength Indicator (RSSI), Signal to Interference plus Noise power Ratio (SINR), and the like are measured.

The RSRP (also referred to as L3-RSRP) in downlink RRM measurement is measured using, for example, the SS/PBCH block or the CSI-RS. The RSRP in the RRM measurement is calculated from one or more L1-RSRPs. For example, the RSRP in the RRM measurement is calculated by an average value of a plurality of L1-RSRPs having different measurement resources.

The RSSI is total received power including interference and noise in a predetermined resource. The predetermined resource may be configured from the base station device 100.

The RSRQ is defined by the RSRP×the number of resource blocks of RSSI measurement bandwidth÷RSSI. The SINR is defined by a ratio of signal received power and interference noise power in the predetermined resource.

The RSRP in uplink RRM measurement is measured using, for example, the SRS or PRACH. The RSRP in the RRM measurement is calculated from the one or more L1-RSRPs. For example, the RSRP in the RRM measurement is calculated by the average value of the plurality of L1-RSRPs having different measurement resources.

(Inter-Link Interference in Embodiment)

When a predetermined terminal device 200A (first terminal device) performs uplink transmission and at the same time another terminal device 200B (second terminal device) performs downlink reception in the same time/frequency resource, inter-terminal interference in which an uplink transmission signal gives interference to downlink reception is generated. Furthermore, when a predetermined base station device 100A (first base station) performs downlink transmission and at the same time the adjacent base station device 100B (second base station) performs uplink reception in the same time/frequency resource, inter-base station interference (inter-cell interference) in which a downlink transmission signal gives interference to uplink reception is generated. These types of interference are also referred to as cross-link interference (CLI). In the present embodiment, the influence of inter-link interference is reduced by performing scheduling in consideration of inter-link interference.

(Measurement of Interference Between Terminal Devices)

In the 3GPP, interference between terminal devices (CLI) is measured and reported as L3 measurement. The CLI is measured in Sounding Reference Signal-Reference Signal Received Power (SRS-RSRP) or Cross-Link Interference-Received Signal Strength Indicator (CLI-RSSI).

The SRS-RSRP is received power of the SRS. Specifically, the SRS-RSRP is defined as a linear average of power of resource elements on which the SRS is carried. An SRS resource is configured for the terminal device 200. The terminal device 200 measures the received power of the SRS in the configured SRS resource.

The CLI-RSSI is an RSSI for CLI measurement. Specifically, the CLI-RSSI is defined as a linear average of the total received power on a configured OFDM symbol of the set measurement bandwidth. The OFDM symbol for measuring the CLI-RSSI is configured for the terminal device 200. Specifically, measurement subcarrier spacing, the measurement bandwidth (the number of starting PRBs and PRBs), and measurement timing (period, time offset, start symbol, and number of symbols) are set to the terminal device 200. The terminal device 200 measures the RSSI using the configured OFDM symbol.

In the present embodiment, the SRS-RSRP or the CLI-RSSI measured by the terminal device 200 is reported to the network. The terminal device 200 reports a measurement result of the CLI periodically or at a timing when a predetermined event is triggered. As a trigger condition of the predetermined event, there is a case where the measurement result of the CLI exceeds a predetermined threshold. The SRS-RSRP or CLI-RSSI is reported in descending order of values by the configured number.

The base station device 100 may perform terminal scheduling using the measurement result of the CLI reported from the terminal device 200. Specifically, the base station device 100 may determine a TDD configuration, a configuration of a physical channel, PUSCH/PDSCH scheduling, resource block allocation, and the like of each terminal device 200 by using the measurement result of the CLI.

(Inter-Base Station Interference Measurement)

In the 3GPP, inter-base station interference is measured by using a remote interference management reference signal (RIM-RS). The RIM-RS may be used by the base station device 100 to measure inter-cell interference and to provide information regarding estimated interference to other base station devices 100. Two different types of RIM-RS can be configured. The first RIM-RS type may be used to carry information. The second RIM-RS type is based on a configuration.

The resource on which the RIM-RS is transmitted is configured by Operations, Administration and Maintenance (OAM). Specifically, the OAM configures, for the base station device 100, on/off of RIM-RS monitoring, information of periodic RIM-RS monitoring, and reporting of necessary information derived from a dedicated RIM-RS. The OAM is an example of the management device 400 of the communication system S illustrated in FIG. 9, for example.

7. OPERATION EXAMPLE OF COMMUNICATION SYSTEM

FIG. 27 is a sequence diagram for explaining an operation example of the communication system S according to the embodiment of the present disclosure. The base station device 100 and the terminal device 200A of the communication system according to the present embodiment receive a plurality of pieces of data of different QoS types. The base station device 100 and the terminal device 200A measure the channel quality for each combination of QoS levels. Note that, hereinafter, a case where the terminal device 200A measures the channel quality with the base station device 100 in consideration of the interference from the second terminal device 200B will be described.

As illustrated in FIG. 27, the base station device 100 first acquires information for channel quality measurement from the terminal device 200A and the second terminal device 200B (step S1). Next, the base station device 100 sets a configuration of the measurement resource for measuring the channel quality (step S2).

The terminal device 200A measures the channel quality on the basis of the set configuration or the like (step S3). The terminal device 200A reports the measured channel quality to the base station device 100 (step S4).

The base station device 100 determines a communication method between the terminal device 200A and the second terminal device 200B on the basis of the channel quality (step S5). For example, the base station device 100 determines whether or not to communicate with the terminal device 200A and the second terminal device 200B by the IBFD.

The base station device 100 communicates with the terminal device 200 and the second terminal device 200B using the determined communication method (step S6).

Details of each step will be described below.

<7.1. Acquisition of Information for Measurement>

(Terminal Information)

The base station device 100 that controls the network acquires information regarding the subordinate terminal device 200 (the terminal device 200 connected to the network, or the terminal device 200 camping on the base station device 100). The base station device 100 collects a limit value (capability) of the QoS index that can be transmitted and received by the terminal device 200 as the information regarding the subordinate terminal device 200.

Examples of types of capabilities related to the QoS include the following. For example, a QoS index (QCI or 5GI) that can be processed by the terminal device 200 is defined corresponding to the following capability information.

Terminal type
Terminal category (UE category)
Maximum transmission power
Decode processing capability
Antenna
Support band
Support bandwidth
Number of supported carriers
Functions related to URLLC

[Terminal Type]

Examples of the terminal type include the eMBB (enhanced Mobile Broad Band), the URLLC (Ultra-Reliable and Low Latency Communication), or massive Machine Type Communication (mMTC).

[Terminal Category]

In the LTE, a processing capability of the terminal device 200 is defined as a terminal category. For example, UE categories 1 to 21 are defined assuming terminals of the eMBB, and UE categories 0, M1, and M2 are defined assuming the terminal devices 200 of the mMTC. The base station device 100 can recognize the capability regarding the QoS of the terminal device 200 from the information of the terminal category.

[Maximum Transmission Power]

The maximum transmission power is defined as UE power class.

The terminal devices 200 of the eMBB, the URLLC, and the mMTC are assumed to be different in maximum transmission power from each other due to differences in use cases and deployments. That is, the terminal device 200 reports the information regarding the UE power class to the base station device 100, so that the base station device 100 can recognize the capability of the terminal device 200 regarding the QoS.

Specifically, the maximum transmission power is associated such that UE power class 1 is 33 dBm, UE power class 2 is 26 dBm, and UE power class 3 is 23 dBm. The terminal devices 200 of these UE power classes are assumed to be the terminal devices 200 that can process the eMBB and/or the URLLC. When notified of the UE power class indicating the maximum transmission power, the base station device 100 can recognize the terminal device 200 as the eMBB or the URLLC. On the other hand, the maximum transmission power of the terminal device 200 in the mMTC is assumed to be 20 dBm or 14 dBm. When notified of the UE power class indicating the maximum transmission power, the base station device 100 can recognize the terminal device 200 as the mMTC.

[Decoding Processing Capability]

A decoding processing capability is defined as a UE processing capability. In the UE processing capability, for example, a processing capability 1 and a processing capability 2 are defined. The processing capability 1 assumes the terminal device 200 (for example, a smartphone, or the like) that processes an eMBB traffic. In the processing capability 2, a processing capability is defined by assuming the terminal device 200 (for example, a robot, an automobile, or the like) that processes a URLLC traffic. Therefore, in the processing capability 2, the maximum processing delay is set shorter than that in the processing capability 1.

Note that these processing capabilities may be defined individually for the link and/or the physical channel. Specifically, the terminal device 200 may support different processing capabilities in the uplink and the downlink, or may support different processing capabilities in the control channel (PDCCH) and the data channel (PDSCH).

[Antenna]

As the capability information of the antenna, for example, at least one of an antenna panel mounted on the terminal device 200, the number of antennas, the number of antenna elements, information of the polarized antenna, the shape of the antenna, or the like can be mentioned.

Specifically, as the capability information of the antenna, there are information regarding an antenna that can be used for reception, information regarding an antenna that can be used for transmission, and a relationship (beam correspondence) between a transmission antenna and a reception antenna, and the like.

[Support Band]

Examples of the support band include the type and the number of operating bands supported by the terminal device 200. The terminal device 200 having a large number of supported operating bands is recognized as a terminal device 200 having a high processing capability.

[Support Bandwidth]

Examples of the supported bandwidth include a bandwidth supported by the terminal device 200.

[Number of Supported Carriers]

Examples of the number of supported carriers include the number of cells that can be simultaneously connected by carrier aggregation and/or multi-connectivity. The terminal device 200 having a large number of cells that can be simultaneously connected is recognized as the terminal device 200 having a high processing capability.

[Function Related to URLLC]

The terminal device 200 reports capability information regarding a function related to the URLLC to the base station device 100. The base station device 100 can recognize that the terminal device 200 is the terminal device 200 capable of processing the URLLC.

The terminal device 200 having a function related to the URLLC is, for example, the terminal device 200 that supports one or more functions such as a function of transmitting and receiving a channel shorter than a slot, a configured grant, support (cqi-TableAlt) of the CQI table of a target BLER of $10^{-5}$, support of the MCS table corresponding to the target BLER of $10^{-5}$, and support of a wide subcarrier spacing (for example, 60 kHz). The function of transmitting and receiving processing of the channel shorter than the slot is, for example, a function related to the reception of the PDSCH using the PDSCH mapping type B.

(Environment Information)

The base station device 100 that controls the network acquires environment information regarding an environment in which the subordinate terminal device 200 performs transmission and reception.

Examples of types of the environment information related to the QoS include the following.

Communication environment status

Mobility

[Communication Environment Status]

It is assumed that the status of the propagation path changes according to the communication environment of the terminal device 200. The base station device 100 appropriately processes traffics of various QoS types according to a communication environment. The terminal device 200 notifies the base station device 100 of information regarding the communication environment.

The communication environment status is, for example, information such as indoor (home, office, mall, and the like) or outdoor (city or country).

As another example, the communication environment status is information regarding propagation path parameters such as multipath power delay profile (PDP) and delay spread.

[Mobility]

The limit value (QoS level) of the QoS that can be secured changes according to the moving speed of the terminal device 200. The base station device 100 appropriately processes traffics of various QoS types according to mobility. The terminal device 200 notifies the base station device 100 of information of mobility.

The mobility information is, for example, information obtained by quantizing speed information such as fixed speed, low speed, or high speed with a predetermined granularity.

As another example, the mobility information is the number of times of cell switching (the number of times of handover).

As another example, the mobility information is information regarding Doppler (for example, the Doppler shift).

The base station device 100 can restrict the QoS setting by acquiring the above-described capability information and environment information in advance, and can reduce processing and reduce control overhead in the base station device 100 and the terminal device 200. For example, when the terminal device 200 does not have the capability to process the URLLC, the base station device 100 can omit measurement of the channel quality of the QoS level corresponding to the URLLC. As described above, since the base station device 100 acquires the information (capability information and environmental information) regarding the terminal device 200 in advance, it is possible to reduce processing and reduce control overhead in the base station device 100 and the terminal device 200.

<7.2. Configuration of Measurement Resource>

Subsequently, a configuration of the measurement resource associated with each QoS level is set.

Examples of the type of configuration set by the base station device 100 include the following.

Resource to be measured
Desired signal to be measured
Interference signal to be measured
QoS setting of the signal to be measured (Resource to be Measured)

The resource to be measured is defined by, for example, a time axis, a frequency axis, and/or a spatial axis. For example, as a time axis, periodic resource setting is performed by the base station device 100. The base station device 100 sets a measurement period, an offset, and a measurement interval. Alternatively, aperiodic resource setting is performed by the base station device 100 as a time axis. In this case, an event that triggers measurement is set.

As the frequency axis, the base station device 100 sets at least one of a measurement carrier, a measurement center frequency or a bandwidth, or a minimum frequency value and a maximum frequency value of a band to be measured.

As the spatial axis, the base station device 100 sets at least one of a measurement direction, a measurement antenna, or a measurement position for measuring the channel quality.

(Desired Signal to be Measured)

The base station device 100 transmits a desired signal as a measurement signal for the terminal device 200A to measure the channel quality. The terminal device 200A measures received power (RSRP) of the desired signal.

The base station device 100 transmits, for example, a known signal as the desired signal. Examples of the known signal include a pilot signal and a reference signal. Further, examples of downlink signals used for power measurement as known signals used in the 3GPP include the following signals.

CRS(Cell-specific Reference Signal)
CSI-RS
PSS(Primary Synchronization Signal)/SSS(Secondary Synchronization Signal)/PBCH(Physical Broadcast Channel)
Demodulation reference signal (DMRS) of PBCH
DMRS of Physical Downlink Shared Channel (PDSCH)
DMRS (subband DMRS or wideband DMRS) of Physical Downlink Control Channel (PDCCH)
PRS(Positioning Reference Signal)
RIM-RS Further, examples of the uplink signal used for power measurement include the following signals.

PRACH(Physical Random Access Channel)
DMRS of Physical Uplink Shared Channel (PUSCH)
DMRS of Physical Uplink Shared Channel (PUCCH)
SRS(Sounding Reference Signal)

Further, examples of sidelink signals used for power measurement include the following signals.

PSSS(Primary Sidelink Synchronization Signal)/SSSS (Secondary Sidelink Synchronization Signal)
PSDCH(Physical Sidelink Discovery Channel)
DMRS of Physical Sidelink Shared Channel (PSSCH)
DMRS of Physical Sidelink Control Channel (PSCCH)
DMRS of Physical Sidelink Feedback Channel (PSFCH)

Alternatively, the terminal device 200A may measure the received power using a data signal or a control signal as the desired signal. In this case, examples of signals used for power measurement in the 3GPP include PDSCH, PDCCH, PUSCH, PUCCH, PSSCH, PSCCH, PSFCH, and the like.

(Interference Signal to be Measured)

As an example of the present embodiment, a test signal is transmitted as a signal for measuring interference. The base station device 100 and the terminal device 200, which measure interference, measure interference in a set type and resource of the test signal.

Examples of types of downlink test signals include the following downlink signals used in the 3GPP.

CRS(Cell-specific Reference Signal)
CSI-RS
PSS(Primary Synchronization Signal)/SSS(Secondary Synchronization Signal)/PBCH(Broadcast Channel)
Demodulation reference signal (DMRS) of PBCH
DMRS of Physical Downlink Shared Channel (PDSCH)
DMRS (subband DMRS or wideband DMRS) of Physical Downlink Control Channel (PDCCH)
PRS(Positioning Reference Signal)
RIM-RS Further, examples of types of uplink test signal include the following uplink signals used in the 3GPP.

PRACH(Physical Random Access Channel)
DMRS of Physical Uplink Shared Channel (PUSCH)
DMRS of Physical Uplink Shared Channel (PUCCH)
SRS(Sounding Reference Signal)

Further, examples of types of sidelink test signals include the following sidelink signals used in the 3GPP.

PSSS(Primary Sidelink Synchronization Signal)/SSSS (Secondary Sidelink Synchronization Signal)
PSDCH(Physical Sidelink Discovery Channel)
DMRS of Physical Sidelink Shared Channel (PSSCH)
DMRS of Physical Sidelink Control Channel (PSCCH)
DMRS of Physical Sidelink Feedback Channel (PSFCH)

(Resource of Interference Signal to be Measured)

In an example of the present embodiment, a resource for measuring interference is configured.

For example, interference from the base station device 100 to the terminal device 200 and interference from the base station device 100 to the base station device 100 can be considered as part of the interference. The terminal device 200A and the base station device 100 measure the interference by measuring the downlink resources. As the downlink resource, there are a resource of a known signal, a resource in which, for example, a CRS is located, a resource in which an SS is located, an NZP CSI-RS resource, a RIM-RS resource, and the like. Alternatively, as the downlink resource, there are a blank resource, a CSI-IM resource for example, a ZP-CSI-RS resource, or the like. In addition, the specified resource may be measured as the measurement of the downlink resource. Examples of the specified resource include a downlink, flexible, or IBFD resource and a predetermined symbol instructed, and the like.

Furthermore, as part of the interference, interference from the terminal device 200 to another terminal device 200 or interference from the terminal device 200 to the base station device 100 can be considered. By measuring the uplink resources or the sidelink resources, the terminal device 200A and the base station device 100 measure interference thereof. The measurement of the uplink resource or the sidelink resource is performed on a resource of a known signal or a blank resource, similarly to the downlink resource. Examples of the resource of the known signal include an SRS resource and the like. Examples of the blank resource include an SRS-interference measurement (SRS-IM) resource and the like. Alternatively, the specified resource may be measured as the measurement of the uplink resource or the sidelink resource. Examples of the specified resource include an uplink, sidelink, flexible, or IBFD resource and a predetermined symbol instructed, and the like.

The resource can be configured in a link direction (uplink, downlink, and side). The direction of the resource is determined by one or more instructions of an SIB, dedicated RRC signaling, a GC-PDCCH, and a UE-dedicated PDCCH. The downlink resource is a resource for receiving a downlink physical channel and/or a downlink physical signal. The uplink resource is a resource for transmitting an uplink physical channel and/or an uplink physical signal. The sidelink resource is a resource for transmitting and receiving a sidelink physical channel and/or a sidelink physical signal. The flexible resource is a resource for sending and receiving a downlink physical channel/signal, an uplink physical channel/signal, and/or a sidelink physical channel/signal. The IBFD resource is at least a resource on which the IBFD may be executed. That is, the resources may have different link directions in different terminal devices in the same cell.

For example, as described above, when the terminal device 200A measures the channel quality (CQI, RSRQ, SINR), the resource for measuring the desired signal (resource for channel measurement) and the resource for measuring an interference signal (resource for interference measurement) are associated with each other. For example, the base station device 100 configures one resource for channel measurement and one or more resources for interference measurement as a CSI Resource Set.

(QoS Setting of Signal to be Measured)

The base station device 100 sets the QoS level of a signal to be measured. As the QoS setting of the signal to be measured, there are a setting of a QoS index (QCI, 5QI or UP), a setting related to the CQI table and/or an MCS table, a setting of assumed transmission power, a setting of the target BLER, and the like.

The base station device 100 includes, for example, a QoS index indicating the target BLER in the configuration as setting of the QoS index. The terminal device 200A measures the channel quality assuming the target BLER corresponding to the QoS index with the resource instructed in the configuration.

Further, the base station device 100 includes, for example, a CQI table and/or an MCS table assuming a predetermined target BLER in the configuration, as a setting related to the CQI table, for example. The terminal device 200A measures the channel quality assuming the target BLER corresponding to the CQI table and/or the MCS table with the resource instructed in the configuration.

Furthermore, the base station device 100 includes, for example, the target BLER in the measurement setting as the setting of the target BLER. The terminal device 200A measures the channel quality assuming the target BLER.

<7.3. Measurement of Channel Quality>

Subsequently, the terminal device 200A measures the channel quality at each QoS level from the configuration set in advance from the base station device 100.

(Method of Setting QoS Level in Advance)

As a method of measuring the channel quality at each QoS level, there is a method in which a configuration is set in advance for each signal/interference of different QoS levels.

As an example, the base station device 100 configures in advance radio resources to be measured to be different for each QoS level.

More specifically, for example, the first radio resource is configured by a first setting in which the target BLER corresponds to $10^{-1}$, and the second radio resource is configured by a second setting in which the target BLER corresponds to $10^{-5}$. The terminal device 200A measures the channel quality by using each of the first radio resource and the second radio resource. As the first radio resource, a resource in which the eMBB data is located is assumed. As the second radio resource, a resource in which the URLLC data is located is assumed.

The base station device 100 configures the first radio resource and the second radio resource in advance in association with each QoS level. Thus, by measuring the channel quality of the first radio resource and the second radio resource, the terminal device 200A can measure the channel quality associated with the QoS level.

As another example of the method of measuring the channel quality at each QoS level, there is a method in which the base station device 100 sets in advance such that a signal to be measured is different at each QoS level.

In this case, for example, a first signal is configured by the first setting in which the target BLER corresponds to $10^{-1}$, and a second signal is configured by the second setting in which the target BLER corresponds to $10^{-5}$. The terminal device 200A measures the channel quality by using each of the first signal and the second signal. The first signal is assumed to be the eMBB signal. The second signal is assumed to be the URLLC signal.

As described above, the base station device 100 sets the first signal and the second signal in advance in association with each QoS level. Thus, by measuring the received power of the first signal and the second signal, for example, the terminal device 200A can measure the channel quality associated with the QoS level.

As another example of the method of measuring the channel quality at each QoS level, there is a method in which a CSI Resource Set corresponding to each QoS level is configured in the terminal device 200. Note that one CSI Resource Set is configured by CSI-ReportConfig.

In this case, for example, a first CSI Resource Set in which the target BLER corresponds to $10^{-1}$ is configured by the CSI-ReportConfig, and a second CSI Resource Set in which the target BLER corresponds to $10^{-5}$ is configured by the CSI-ReportConfig. The terminal device 200A measures the channel quality by using each of the first CSI Resource Set and the second CSI Resource Set. The first CSI Resource Set is assumed to be the eMBB data. The second CSI Resource Set is assumed to be the URLLC data.

As another example of the method of measuring the channel quality at each QoS level, there is a method in which an RRM measurement setting (measConfig) corresponding to each QoS level is configured in the terminal device 200.

In this case, for example, a first RRM measurement setting (first measConfig) in which the target BLER corresponds to $10^{-1}$ is configured, and a second RRM measurement setting (second measConfig) in which the target BLER corresponds to $10^{-5}$ is configured. The terminal device 200A measures the channel quality by using each of the first RRM measurement setting and the second RRM measurement setting. The first RRM measurement setting is assumed to be the eMBB data. The second RRM measurement setting is assumed to be the URLLC data.

Note that, in a case where a measurement target of the channel quality is assumed to be the eMBB data or the eMBB signal, the terminal device 200A measures the channel quality on the assumption that, for example, the subcarrier spacing is 15 kHz or 30 kHz. For example, the terminal device 200A measures the channel quality assuming that the eMBB data or the eMBB signal is allocated to one slot.

Further, in a case where the measurement target of the channel quality is assumed to be the URLLC data or a URLLC signal, the terminal device 200A measures the channel quality on the assumption that, for example, the subcarrier spacing is 60 kHz. For example, the terminal device 200A measures the channel quality on the assumption that the URLLC data or the URLLC signal is allocated to a sub slot (for example, slots of less than 14 symbols, such as two symbols, three symbols, or seven symbols).

(Method of Additionally Setting QoS Level)
(Base Station Device Instructs QoS Level)

As the method of measuring the channel quality at each QoS level, there is a method in which the base station device 100 sets a common measurement setting between QoS levels in advance, and then sets the QoS level to be measured by additional information. Here, examples of the common measurement setting include CSI-ReportConfigCommon and measConfigCommon. Furthermore, examples of the additional information include RRC settings such as CSI-ReportConfigDedicated and measConfigDedicated, and DCI.

As an example of the additional information, the base station device 100 specifies a measured QoS level (QoS index) by a control signal (for example, DCI) before the measurement timing.

In this case, when receiving information regarding the measured QoS level included in the control signal, the terminal device 200A measures the channel quality in the measurement resource closest to the timing of receiving the control signal.

Alternatively, when receiving the information regarding the measured QoS level included in the control signal, the terminal device 200A measures the channel quality in the most recent measurement resource at a timing later than a predetermined section from the timing at which the control signal is received. Note that the value of the predetermined section may be defined in advance in association with the processing capability or the like, or may be set from the base station device 100.

Alternatively, when receiving the information regarding the measured QoS level included in the control signal, the terminal device 200A measures the channel quality in the measurement resource instructed by the information included in the control signal.

As described above, when the QoS level to be measured by the base station device 100 is specified, the control signal used for the instruction is desirably a control signal received by both the second terminal device 200B that transmits the test signal as the interference signal and the terminal device 200A that measures the channel quality. The control signal is carried by, for example, a terminal group common PDCCH.

Since the base station device 100 transmits the control signal receivable by both the terminal device 200A and the second terminal device 200B, an instruction can be transmitted to a plurality of terminal devices 200 with one control signal, and control overhead can be reduced.

Note that the base station device 100 may individually transmit each of a control signal instructing transmission of the test signal and a control signal instructing measurement of the channel quality.

(Measurement Terminal Device Determines QoS Level)

In the above-described example, the base station device 100 specifies the QoS level to be measured, but it is not limited thereto. For example, the QoS level of the channel to be measured by the terminal device 200A that measures the channel quality may be determined. In this case, when a predetermined event occurs, the terminal device 200A measures the QoS index associated with the event.

Examples of the type of the predetermined event include a case where channel quality with the base station device 100 (serving cell) to be connected has fluctuated. The terminal device 200A considers that the channel quality has fluctuated when the measured channel quality exceeds or falls below a predetermined threshold of channel quality. For example, in a case where the channel quality of the eMBB has fluctuated exceeding the threshold by a predetermined value or more, the terminal device 200A measures the URLLC channel quality using such fluctuation as a trigger. Note that the threshold varies depending on the QoS level.

Alternatively, as the predetermined event, there is a case where the channel quality with the neighboring base station (neighbor cell) has fluctuated. When the measured channel quality exceeds or falls below a predetermined channel quality threshold, it is considered that the channel quality has fluctuated. For example, in a case where the channel quality in the eMBB of a neighbor cell has fluctuated exceeding a threshold by a predetermined value or more, the terminal device 200A measures the channel quality in the eMBB of the serving cell with the fluctuation as a trigger. Note that the threshold varies depending on the QoS level.

Further, as the predetermined event, there is a case where the environment in which the terminal device 200A measures the channel quality has changed. As the change in the environment, for example, the terminal device 200A may move a predetermined distance. For example, in the terminal device 200A that periodically estimates the position, in a case of moving away from the previously measured and reported position by a predetermined distance or more, the terminal device 200A performs measurement. Note that the distance varies depending on the QoS level.

Further, as the predetermined event, there is a case where a measurement request signal (an example of an instruction signal) is received from another terminal device 200. For example, when receiving a signal requesting measurement of the channel quality from another terminal device 200 through terminal-to-terminal communication (sidelink), the terminal device 200A measures the channel quality with a setting associated with the QoS level instructed by the signal.

(Interfering Terminal Device Determines QoS Level)

In the above-described example, the terminal device 200A determines the QoS level to be measured, but it is not limited thereto. For example, the QoS level of the channel measured by the second terminal device 200B that transmits the test signal as the interference signal may be determined.

In this case, the second terminal device 200B may include the information specifying the QoS level in the test signal, or may transmit the measurement request signal including the specification of the QoS level separately from the test signal.

The second terminal device 200B may periodically transmit the test signal or the measurement request signal, or may transmit the test signal or the measurement request signal in association with a predetermined event.

Examples of the type of the predetermined event include a case where data (traffic) corresponding to a predetermined QoS index is generated. For example, when a trigger for transmitting a scheduling request (SR) associated with data corresponding to the predetermined QoS index is generated, the second terminal device 200B transmits the test signal or the measurement request signal by using a setting associated with the QoS index.

Alternatively, for example, when a trigger for transmitting a buffer status report (BSR) associated with data corresponding to the predetermined QoS index is generated, the second terminal device 200B transmits the test signal or the measurement request signal by using a setting associated with the QoS index.

(Setting Common to QoS Levels)

For example, the following settings are included as measurement settings common to each QoS level, for example.

Candidates for measurement resource

Measurement band, measurement carrier, measurement center frequency

Part of information of measurement target

The candidates for the measurement resource are set by a period and an offset. Further, part of the information of the measurement target includes, for example, information (subcarrier spacing) of an interfering terminal (second terminal device 200B). Note that the part of the information of the measurement target may include information of the interfering terminal and information of a signal of the interfering terminal (sequence, transmission power, and the like).

(Additional Information)

The control signal transmitted as the additional information by the base station device 100 or the measurement request signal transmitted by the second terminal device 200B includes, for example, the following information.

Information of measurement timing (a slot in which measurement is performed, and the like)

Information of measurement frequency band (bandwidth, resource block, and the like)

Part of information of measurement target

Part of the information of the measurement target includes, for example, information (subcarrier spacing) of the interfering terminal (second terminal device 200B).

Note that the part of the information of the measurement target may include information of the interfering terminal and information of a signal of the interfering terminal (sequence, transmission power, and the like).

<7.4. Report of Channel Quality>

The terminal device 200A reports the channel quality measured at each QoS level to the base station device 100.

(Report Timing)

The terminal device 200A reports the channel quality periodically. The terminal device 200A reports in a period set from the base station device 100, for example. In a case where the channel quality cannot be measured or in a case where the measurement is not instructed, the terminal device 200A may skip the report without performing the report. Note that, in a case where the report of channel quality is periodic, it is desirable that the channel quality measurement described above is also periodic.

Alternatively, the terminal device 200A reports the channel quality aperiodically. The terminal device 200A is instructed to report by the control signal from the base station device 100, for example. Alternatively, the terminal device 200A may perform the report at a timing when the report event is satisfied. The terminal device 200A reports the channel quality, for example, when strong interference is received. That is, the terminal device 200A reports the channel quality when the channel quality exceeds or falls below a predetermined threshold. Such a threshold may be a different value depending on the QoS level.

Note that when the report of channel quality is periodic, the channel quality measurement described above may be periodic or aperiodic.

(Report Content)

[SINR Information]

The terminal device 200A reports measured SINR information corresponding to each QoS level to the base station device 100.

The terminal device 200A calculates the SINR on the basis of received power of a signal measured at each QoS level, and reports the SINR to the base station device 100.

Alternatively, the terminal device 200A calculates the SINR information assuming each QoS level on the basis of received power of a predetermined signal, and reports the SINR information to the base station device 100. In this case, the predetermined signal is commonly transmitted at each QoS level. The terminal device 200A calculates the SINR by calculating transmission power or interference power assuming each QoS level.

More specifically, for example, it is assumed that the base station device 100 transmits the eMBB signal as the desired signal. The assumed transmission power is different between the eMBB signal and the URLLC signal. Accordingly, the terminal device 200A calculates transmission power assuming the URLLC from the received eMBB signal, and calculates the SINR corresponding to the URLLC.

As described above, the terminal device 200A reports the SINR information assuming the QoS level to the base station device 100, so that the desired signal transmitted by the base station device 100 or the test signal transmitted by the second terminal device 200B can be reduced, and the control overhead can be reduced.

Note that, as an example of calculation assuming each QoS level, there is a method of adding a power offset to the measured power according to the QoS level.

[Interference Allowable Amount]

Alternatively, the terminal device 200A reports interference tolerance information indicating how much interference corresponding to each QoS level (for example, the eMBB and the URLLC) can be tolerated to the base station device 100.

The terminal device 200A transmits a combination of reception strength of the desired signal and reception strength of the interference signal (test signal) as the interference tolerance information. As the interference tolerance information, specifically, there are a signal to interference ratio (SIR), a signal to interference plus noise ratio (SINR), a channel quality indicator (CQI), or a difference between a measured SINR and a target SINR, or the like.

It is desirable that the interference tolerance information be sent as information of a true value, dB, or a quantized predetermined index. Furthermore, by transmitting the difference between a measured value (for example, the measured SINR) and a target value (for example, the target SINR) as the interference tolerance information, the amount of information of the interference tolerance information can be reduced as compared with the case where the measured value is transmitted at all QoS levels. Alternatively, more detailed information can be transmitted with the same amount of information as when transmitting measured values at all QoS levels, and the quantization granularity can be further improved.

Note that the terminal device 200A transmits a combination of the reception strength of the desired signal and the reception strength of the interference signal for each QoS level, but it is not limited thereto. For example, the terminal device 200A may transmit the reception strength of the desired signal and the reception strength of the interference signal at each QoS level.

More specifically, the terminal device 200A reports interference information corresponding to each QoS level in addition to information (for example, RSRP) regarding the reception strength of the desired signal received from the base station device 100. Examples of the interference information include received signal strength indicator (RSSI) and reference signal received power (RSRP) of the interference signal, and the like.

The base station device 100 that has received the report from the terminal device 200A estimates the measured SINR corresponding to each QoS level from the information regarding the reception strength and the interference information corresponding to each QoS level.

Note that the terminal device 200A may simultaneously (for example, on the same resource) transmit the information regarding the reception strength of the desired signal and the interference information corresponding to each QoS level.

Alternatively, the terminal device 200A may transmit each of the information regarding the reception strength and the interference information separately (for example, on different resources). More specifically, for example, the terminal device 200A reports the information regarding the reception strength and the interference information in respective different periods.

Alternatively, an event that the terminal device 200A uses as a trigger of the report of the information regarding the reception strength may be different from an event that the terminal device 200A uses as a trigger of the report of the interference information.

Thus, the terminal device 200A can reduce the number of times of transmitting the information regarding the reception strength of the desired signal to one time as compared with when transmitting the information regarding the channel quality corresponding to each QoS level (combination of the reception strength of the desired signal and the reception strength of the interference signal). Therefore, the terminal device 200A can compress the overhead of the measurement information to be reported.

[Offset Information]

Alternatively, the terminal device 200A reports reference measurement information and offset measurement information to the base station device 100. Here, the reference measurement information is measurement information (for example, the SINR information) corresponding to a QoS level to be a reference (reference level, for example, the eMBB) among QoS levels. Furthermore, the offset measurement information is information indicating a difference between measurement information corresponding to the QoS level (for example, the URLLC) excluding the QoS level (for example, the eMBB) as the reference and the reference measurement information.

The base station device 100 estimates measurement information (for example, the SINR information) corresponding to each QoS level from the reference measurement information and the offset measurement information.

Note that the terminal device 200A may transmit the reference measurement information and the offset measurement information simultaneously (for example, on the same resource). Alternatively, the terminal device 200A may transmit each of the reference measurement information and the offset measurement information separately (for example, on different resources). More specifically, for example, the terminal device 200A reports the information regarding the reception strength and the interference information in respective different periods.

Alternatively, an event that the terminal device 200A uses as a trigger of the report of the reference measurement information may be different from an event that the terminal device 200A uses as a trigger of the report of the offset measurement information.

Thus, the terminal device 200A can reduce the information amount of the offset measurement information as compared with when transmitting the measurement information corresponding to each QoS level. Therefore, the terminal device 200A can compress the overhead of the measurement information to be reported.

[IBFD Possibility Information]

Alternatively, the terminal device 200A reports IBFD possibility information indicating whether or not the base station device 100 can perform the IBFD in communication with the own device to the base station device 100 as measurement information. Here, the information indicating whether or not the IBFD can be performed is information indicating whether or not a target block error rate (BLER) of an assumed QoS level can be satisfied when the base station device 100 communicates with the terminal device 200A and another terminal device (for example, the terminal device 200B) by the IBFD.

For example, in a case where the measured SINR is equal to or more than the threshold corresponding to each QoS level, the terminal device 200A determines that the target BLER cannot be satisfied and the IBFD by the base station device 100 is not allowed. Further, in a case where the measured SINR is less than the threshold corresponding to each QoS level, the terminal device 200A determines that the target BLER can be satisfied and the IBFD by the base station device 100 is allowed. The terminal device 200A transmits the IBFD possibility information indicating a determination result to the base station device 100 for each QoS level.

The IBFD possibility information is, for example, one-bit information indicated by "1" in a case where the IBFD can be performed (IBFD by the base station device 100 is allowed) and "0" in a case where the IBFD cannot be performed (IBFD by the base station device 100 is not allowed).

As described above, the terminal device 200A reports the IBFD possibility information as the measurement information to the base station device 100, so that the information amount of the measurement information reported to the base station device 100 can be reduced.

[Terminal Information]

Note that the terminal device 200A may report information regarding inter-terminal interference to the base station device 100 in addition to the measurement information. For example, the terminal device 200A may report information regarding an interfering terminal device (for example, the terminal device 200B) that gives strong interference to the terminal device 200A, in addition to the IBFD possibility information. Here, the terminal device 200A determines whether or not a predetermined terminal device 200 is an interfering terminal device according to whether or not interference given by the predetermined terminal device 200 is equal to or greater than a predetermined threshold.

Further, examples of the information regarding the interfering terminal device include the following information.

Type of interfering terminal (RAT)
Identification information of interfering terminal (Terminal ID, C-RNTI, identification information of measured SRS, and the like)
Cell ID to which interfering terminal is connected
Direction in which inter-terminal interference is received
Position of interfering terminal (latitude, longitude, and altitude)
State of interfering terminal (connection state, mobility state, and the like)
Type of data to be interference (control information or data, eMBB or URLLC, traffic type, and the like)

As described above, by the terminal device 200A transmitting the information regarding the interfering terminal device to the base station device 100, the base station device 100 can more reliably estimate whether or not interference is given to the terminal device 200A when the IBFD is performed, and can further reduce interference given to the terminal device 200A when the IBFD is performed.

Note that, in a case where there is no interfering terminal device that gives strong interference, the terminal device 200A does not need to report the measurement information and the information regarding the inter-terminal interference to the base station device 100.

As described above, the terminal device 200A reports the measurement information to the base station device 100 in a case where there is an interfering terminal device, so that the amount of information for reporting the measurement information to the base station device 100 can be reduced.

Furthermore, the information regarding the inter-terminal interference may be information regarding the measurement environment of the measurement terminal device (here, the terminal device 200A) in addition to the information regarding the interfering terminal device. Examples of the information regarding the measurement environment of the measurement terminal device include the following information.
Timing information (frame information and time stamp) measured by terminal device 200
Position information (latitude, longitude, and altitude) of timing measured by terminal device 200
Moving speed (moving direction, speed, and mobility state) of terminal device 200
Traffic buffer amount of terminal device 200

As described above, by the terminal device 200A transmitting the information regarding the measurement environment of the measurement terminal device to the base station device 100, the base station device 100 can more reliably estimate whether or not interference is given to the terminal device 200A when the IBFD is performed, and can further reduce interference given to the terminal device 200A when the IBFD is performed.

<7.5. Determination of Communication Method>

The base station device 100 determines whether or not to perform communication applying the IBFD with the terminal device 200A on the basis of the report regarding the channel quality received from the terminal device 200A.

More specifically, the base station device 100 determines whether or not to perform the communication applying the IBFD on the basis of the channel quality corresponding to the QoS level reported from the terminal device 200A and the QoS type of data scheduled to be transmitted or received by the terminal device 200A. The base station device 100 performs scheduling on the terminal device 200A according to the determination result.

(When IBFD is Applied)

When it is determined to perform the communication applying the IBFD, the base station device 100 performs communication control for appropriately performing the IBFD on the uplink terminal device (for example, the terminal device 200A) and/or the downlink terminal device (for example, the terminal device 200B).

The base station device 100 transmits all or part of the following communication control information to the uplink terminal device.
Control information regarding transmission power
Control information regarding transmission time/frequency resource
Control information regarding transmission beam
Base station device 100 transmits all or part of following communication control information to downlink terminal device.
Control information regarding reception time/frequency resource
Control information regarding reception beam
Control information regarding interference processing The control information regarding the reception time/frequency resources includes, for example, information of a slot and a resource block of the PDSCH. The control information regarding the reception beam includes TCI state information.

The control information regarding the interference processing includes information regarding the interfering terminal device, for example, ID information (C-RNTI, scrambling ID, and the like) of the interfering terminal device and information indicating the position and direction of the interfering terminal device. Further, the control information regarding the interference processing includes information regarding interference data, for example, allocation resource information (resource block, symbol, antenna port, and the like) of the interference data, position information of a DMRS of the interference data, information of a transmission beam of giving interference data, and the like.

As described above, the base station device 100 transmits the information regarding the interference processing, so that the downlink terminal device can execute interference reduction processing on the inter-terminal interference by using the information regarding the interference processing. By using the information regarding the interference processing, the downlink terminal device can perform the interference reduction processing without blindly detecting the interference, and a processing load of the interference reduction processing in the downlink terminal device can be reduced.

(When IBFD is not Applied)

When it is determined not to perform the communication applying the IBFD, the base station device 100 performs control to give priority to transmission or reception of one terminal device 200 and stop transmission or reception of the other terminal device 200 with respect to a pair of terminal devices 200 (an uplink terminal device and a downlink terminal device) that has been the determination target as to whether or not to perform the IBFD.

8. IN-BAND FULL-DUPLEX COMMUNICATION SETTING OPERATION

<8.1. Operation Sequence when Setting IBFD>

Figure 28:
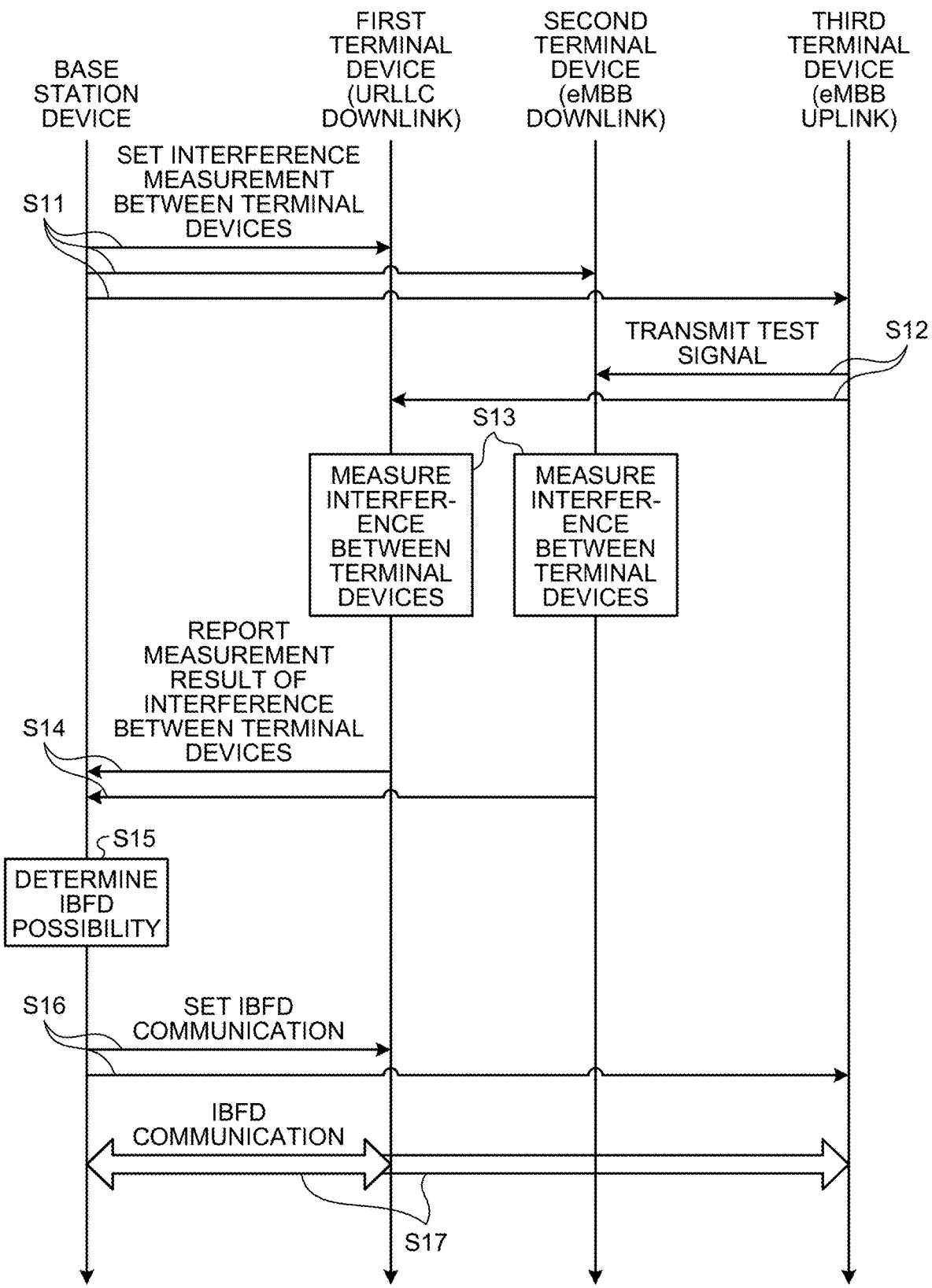
FIG. 28 is a diagram illustrating an example of an operation sequence when setting IBFD according to the embodiment of the present disclosure.

FIG. 28 is a diagram illustrating an example of an operation sequence when setting the IBFD according to the embodiment of the present disclosure. It is assumed that the base station device illustrated in FIG. 28 transmits the URLLC signal to the first terminal device by using the downlink access link, transmits the eMBB signal to the second terminal device by using the downlink access link, and receives the eMBB signal from a third terminal device by using the uplink access link.

In FIG. 28, the base station device sets interference measurement between terminal devices for the first terminal device, the second terminal device, and the third terminal device (step S11). When detecting the setting of the interference measurement, each terminal device transmits the test signal to another terminal device (step S12). For example, the first terminal device transmits the test signal to the second terminal device and the third terminal device as the other terminal device, and the second terminal device transmits the test signal to the first terminal device and the third terminal device as the other terminal device. The third terminal device transmits the test signal to the first terminal device and the second terminal device as the other terminal devices. When receiving the test signal from another terminal device, each terminal device measures interference between the terminal devices (step S13). Each terminal device transmits a measurement result of interference between the terminal devices to the base station device (step S14).

When receiving the measurement result of interference between the terminal devices for each terminal device, the base station device determines a possibility to execute the IBFD on the basis of the measurement result (step S15). When determining that it is possible to execute the IBFD, the base station device instructs the first terminal device of the URLLC downlink access link and the third terminal device of the eMBB uplink access link to set the IBFD (step S16). The base station device sets the IBFD between the downlink access link of the URLLC signal and the uplink access link of the eMBB signal (step S17). Consequently, the base station device receives the eMBB signal from the third terminal device in the uplink access link while transmitting the URLLC signal to the first terminal device in the downlink access link by using the same frequency band.

<8.2. Operation Sequence when Setting OBFD>

Figure 29:
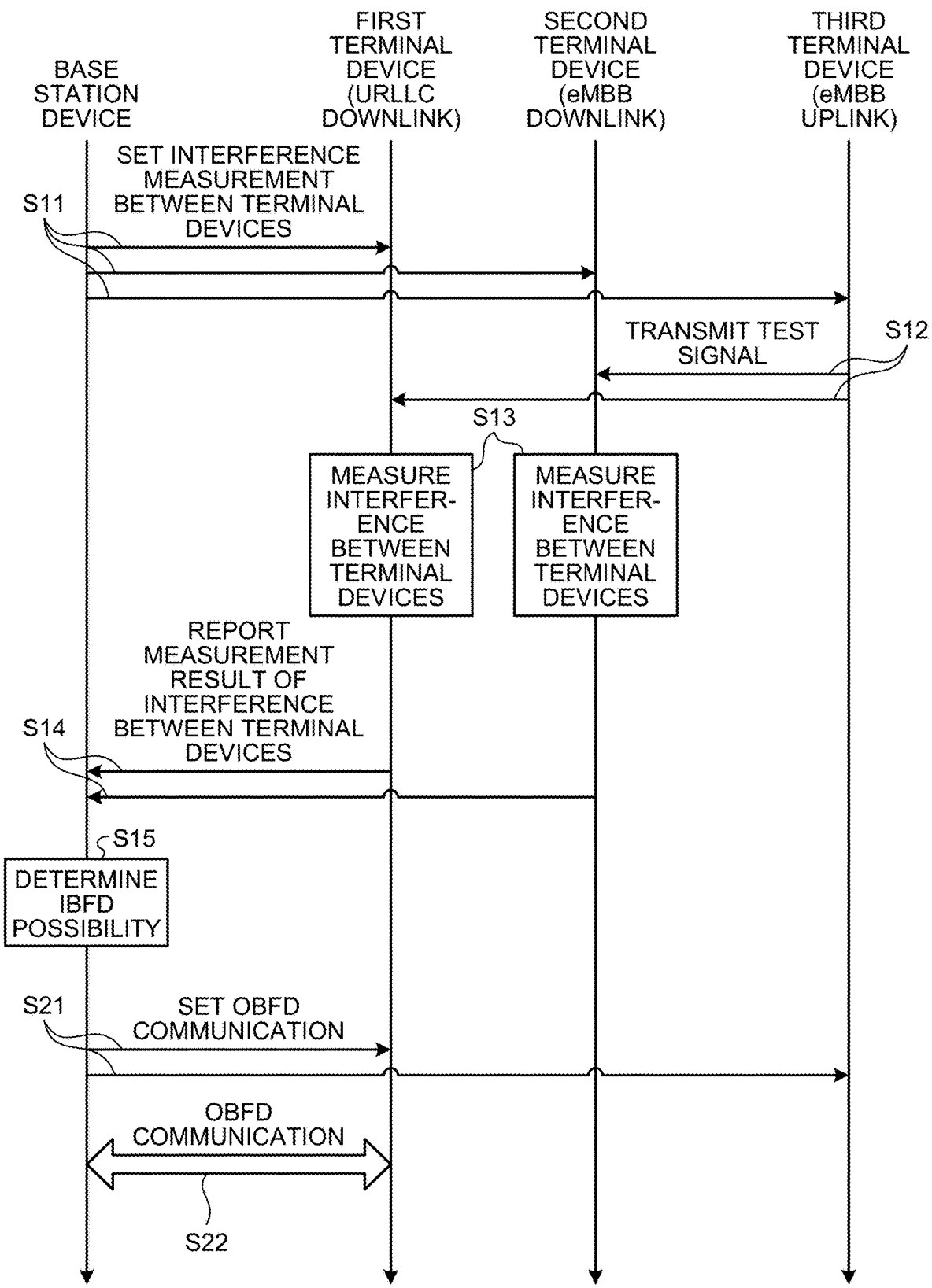
FIG. 29 is a diagram illustrating an example of a communication sequence when setting an OBFD according to the embodiment of the present disclosure.

FIG. 29 is a diagram illustrating an example of a communication sequence when setting the OBFD according to the embodiment of the present disclosure. Note that the same components as those in FIG. 28 are denoted by the same reference numerals, and the description of the overlapping components and operations will be omitted.

When determining in step S15 that the IBFD cannot be executed, the base station device instructs each terminal device to set the OBFD (step S21). Note that the base station device may set, for example, single-link communication or the like within a predetermined time, in addition to the OBFD. The base station device stops transmitting the eMBB signal of the uplink access link to the third terminal device, and sets non-full-duplex communication, that is, the single-link communication with the downlink access link of the URLLC signal to the first terminal device (step S22). Consequently, the base station device stops transmitting the eMBB signal to the third terminal device, and transmits the URLLC signal to the first terminal device.

<8.3. Flow of Determination Processing of Possibility to Execute IBFD>

Figure 30:
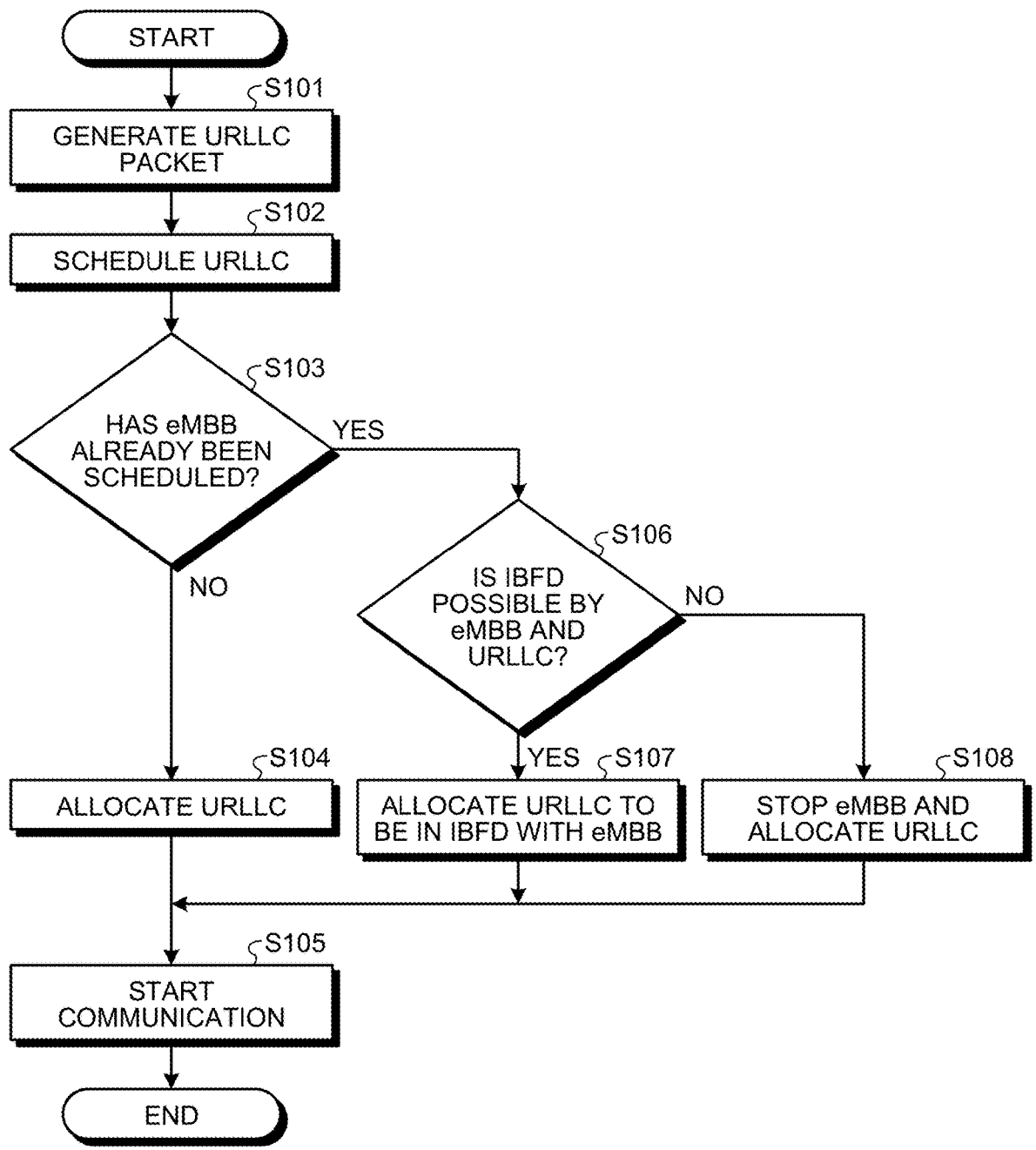
FIG. 30 is a diagram illustrating an example of a flow of determination processing of a possibility to execute IBFD according to the embodiment of the present disclosure.

FIG. 30 is a diagram illustrating an example of a flow of determination processing of a possibility to execute the IBFD according to the embodiment of the present disclosure. Note that the determination processing of the possibility to execute the IBFD is the content of the determination processing in step S15 in FIGS. 28 and 29. When the URLLC signal is generated (step S101), the base station device performs scheduling of the URLLC signal (step S102). The base station device determines whether or not the radio resource scheduled to be allocated to the URLLC signal has been scheduled in another link (for example, the eMBB signal) (step S103).

When the eMBB signal has not been scheduled (step S103: No), the base station device allocates the URLLC signal to the radio resource scheduled to be allocated (step S104), starts communication of the URLLC signal (step S105), and ends the processing operation illustrated in FIG. 30.

When the eMBB signal has been scheduled (step S103: Yes), the base station device determines whether or not it is possible to execute the IBFD between the eMBB signal and the URLLC signal on the basis of channel state information including interference between the terminal devices measured in advance (step S106).

When it is possible to execute the IBFD between the eMBB signal and the URLLC signal (step S106: Yes), the base station device allocates the URLLC signal to the scheduled radio resource so as to be in the IBFD with the eMBB signal (step S107), and proceeds to step S105 to start communication of the URLLC signal. When the IBFD between the eMBB signal and the URLLC signal is not possible (step S106: No), the base station device stops the eMBB signal, allocates the URLLC signal to the scheduled radio resource (step S108), and proceeds to step S105 to start communication of the URLLC signal. Note that step S108 is a process of executing non-full-duplex communication of executing communication of the URLLC signal in a single link.

As described above, the first terminal device according to the present embodiment includes the communication unit (signal processing unit 21) and the control unit 25. The communication unit performs wireless communication with the base station device 100 that supports the IBFD (In Band full duplex) communication that transmits and receives wireless signals using at least a part of resources of the same frequency and the same time. The control unit 25 measures channel quality with the base station device 100 at each level of quality of service (QoS) requested for wireless communication with the base station device 100 on the basis of interference from the third terminal device that performs wireless communication with the base station device 100.

Thus, the base station device 100 can determine the pairing of the terminal devices 200 for performing the IBFD on the basis of the channel quality for each QoS level, and it is possible to grasp an interference status in more detail and perform more precise scheduling.

Further, the base station device 100 determines the pairing of the terminal devices 200 for performing the IBFD, and performs the IBFD with the determined pairing, so that the frequency utilization efficiency can be further improved.

9. MODIFICATION EXAMPLES

<9.1. First Modification Example>

In the above-described embodiment, the terminal device 200 measures the inter-terminal interference, but it is not limited thereto. For example, the base station device 100 may measure inter-base station interference. Such measurement is executed by, for example, the above-described assumed systems S_C to S_L. FIG. 31 is a sequence diagram for explaining an operation example of the communication system S according to a first modification example of the embodiment of the present disclosure.

In the sequence illustrated in FIG. 31, the OAM controls resources of the first base station device and the second base station device. In FIG. 31, the OAM sets the interference measurement between the base station devices for the first base station device and the second base station device (step S31). When detecting the setting of the interference measurement, the second base station device transmits a test signal to the first base station device (step S32). When receiving the test signal from the second base station device, the first base station device measures interference between the base station devices (step S33). The first base station device transmits a measurement result of interference between the base station devices to the OAM (step S34).

When receiving the measurement result of the interference between the base station devices from the first base station device, the OAM determines resources (uplink symbol, downlink symbol, flexible symbol, and the like) of the first base station device and the second base station device on the basis of the measurement result (step S35). The OAM instructs the first base station device and the second base station device to configure the determined resource (step S36). The first base station device configures an instructed resource and performs uplink communication (step S37). The second base station device configures an instructed resource and performs downlink communication (step S38).

<9.2. Second Modification Example>

In the above-described embodiment, the case of the cellular communication system has been mainly described as the communication system S, but it is not limited thereto. The technology of the present disclosure may be applied to other types of wireless communication systems such as a wireless local area network (LAN) system.

In a case of a wireless LAN, as an example of mapping between a type of data and a QoS index, the QoS index is defined as a terminal priority (User Priority: UP) in IEEE. More specifically, the following eight terminal priorities and types of data (traffics) corresponding to indexes thereof are defined in IEEE.

7: Network management traffic
6: Voice traffic with less than 10 ms latency
5: Video traffic with less than 100 ms latency
4: "Controlled-load" traffic for mission-critical data applications
3: Traffic meriting "extra-effort" by the network for prompt delivery, for example, executives' e-mail
2: Reserved for future use
0: Traffic meriting the network's "best-effort" for prompt delivery. This is the default priority.
1: Background traffic such as bulk data transfers and backups Further, examples of the desired signal (known signal) and the test signal transmitted by an access point and/or a station for use in power measurement in the terminal device 200 include a preamble (short training field: STF), a long training field (LTF)), a pilot subcarrier, and the like. Note that, in the wireless LAN, the access point corresponds to the base station device 100 in the above-described embodiment, and the station corresponds to the terminal device 200 in the above-described embodiment.

Alternatively, the terminal device 200 may measure the received power of the PHY header, the PHY data, and the like as the desired signal.

As described above, the communication system S according to the present embodiment is not limited to the cellular communication system, and can be applied to all wireless communication systems that implement the IBFD.

<9.3. Other Modification Examples>

The above-described embodiment and modification examples are examples, and various modification examples and applications are possible.

Furthermore, for convenience of description, the URLLC signal, the eMBB signal, and the like are exemplified as the protection target, but the protection target is not limited thereto and is only needed to be a signal that requires a lower delay than the interference signal, and can be appropriately changed.

The control device that controls the management device 400, the base station device 100, the relay device 300, or the terminal device 200 of the present embodiment may be implemented by a dedicated computer system or a general-purpose computer system.

For example, a communication program for executing the above-described operation (for example, transmission/reception processing) is stored in a computer-readable recording medium such as an optical disk, a semiconductor memory, a magnetic tape, or a flexible disk and distributed. Then, for example, by installing the program in a computer and executing the above-described processing, the control device can be configured. At this time, the control device may be a device (for example, a personal computer) outside the base station device 100, the relay device 300, or the terminal device 200. Further, the control device may be a device (for example, the control unit 13, the control unit 25, or the control unit 34) inside the base station device 100, the relay device 300, or the terminal device 200.

In addition, the communication program may be stored in a disk device included in a server device on a network such as the Internet so that the communication program can be downloaded to a computer. Furthermore, the above-described functions may be implemented by cooperation of an operating system (OS) and application software. In this case, a portion other than the OS may be stored in a medium and distributed, or a portion other than the OS may be stored in a server device, and downloading to a computer, or the like can be performed.

Furthermore, among the processes described in the above embodiments, all or part of the processes described as being performed automatically can be performed manually, or all or part of the processes described as being performed manually can be performed automatically by a publicly known method. Further, the processing procedure, specific name, and information including various data and parameters illustrated in the document and the drawings can be arbitrarily changed unless otherwise specified. For example, the various types of information illustrated in each figure are not limited to the illustrated information.

Further, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in any unit according to various loads, usage conditions, and the like.

Further, the above-described embodiments can be appropriately combined in a region in which the processing contents do not contradict each other. Furthermore, the order of respective steps illustrated in the flowcharts and the sequence diagrams of the above-described embodiments can be changed as appropriate.

Furthermore, for example, the present embodiment can be implemented as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of a part of the device).

Note that, in the present embodiment, the system means a set of a plurality of components (devices, modules (parts), and the like), and it does not matter whether or not all the components are in the same housing. Therefore, a plurality of devices housed in separate housings and connected via a network and one device in which a plurality of modules is housed in one housing are both systems.

Furthermore, for example, the present embodiment can employ a configuration of cloud computing in which one function is shared and processed by a plurality of devices in cooperation via a network.

10. CONCLUSION

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modification examples within the scope of the technical idea described in the claims, and it is naturally understood that these also belong to the technical scope of the present disclosure.

Furthermore, the effects described in the present description are merely illustrative or exemplary, and are not restrictive. That is, the technology according to the present disclosure can exhibit other effects obvious to those skilled in the art from the description of the present description together with or instead of the above effects.

Note that the following configurations also belong to the technical scope of the present disclosure.

(1)
A communication device comprising:
a communication unit that performs wireless communication with a first communication device that supports in-band full-duplex (IBFD) communication that transmits and receives wireless signals using at least a part of resources of a same frequency and a same time; and
a control unit that measures channel quality with the first communication device at each level of quality of service requested for the wireless communication with the first communication device on a basis of interference from a second communication device that performs wireless communication with the first communication device.

(2)
The communication device according to (1), wherein the control unit measures the channel quality by using a resource allocated for the each level of the quality of service.

(3)
The communication device according to (1) or (2), wherein the control unit measures the channel quality by using a measurement signal allocated for the each level of the quality of service.

(4)
The communication device according to (3), wherein the measurement signal is a known signal transmitted by the second communication device with the quality of service at the level for measuring the channel quality.

(5)
The communication device according to (3), wherein the measurement signal is a known signal transmitted by the first communication device.

(6)
The communication device according to any one of (1) to (5), wherein
the communication unit receives an instruction signal instructing measurement of the channel quality from the first communication device, and
when receiving the instruction signal, the control unit measures the channel quality at the level of the quality of service included in the instruction signal.

(7)
The communication device according to any one of (1) to (6), wherein
the communication unit receives an instruction signal instructing measurement of the channel quality from the second communication device, and
when receiving the instruction signal, the control unit measures the channel quality at the level of the quality of service included in the instruction signal.

(8)
The communication device according to any one of (1) to (7), wherein
the control unit measures the channel quality in response to a fluctuation in an environment in which the channel quality is measured.

(9)
The communication device according to any one of (1) to (8), wherein the control unit reports measurement information regarding the channel quality measured to the first communication device for the each level of the corresponding quality of service.

(10)
The communication device according to (9), wherein the measurement information includes at least one of signal to interference plus noise ratio (SINR) information or information regarding an interference allowable amount.

(11)
The communication device according to (9), wherein the measurement information includes at least one of signal strength information regarding signal strength of a wireless signal transmitted by the first communication device or interference information regarding a wireless signal transmitted by the second communication device corresponding to the level of the quality of service.

(12)
The communication device according to (11), wherein the control unit reports the signal strength information and the interference information to the first communication device at respective different timings.

(13)
The communication device according to any one of (9) to (12), wherein the control unit reports, to the first communication device, reference measurement information that is the measurement information corresponding to a reference level among the levels of the quality of service, and offset measurement information indicating a difference between the measurement information corresponding to the level excluding the reference level and the reference measurement information.

(14)
The communication device according to (9), wherein the measurement information includes IBFD information indicating whether or not the first communication device is capable of performing communication by the IBFD.

(15)
A communication device comprising:
a communication unit that performs wireless communication with a first communication device that supports in-band full-duplex (IBFD) communication that transmits and receives wireless signals using at least a part of resources of a same frequency and a same time; and a control unit that transmits a measurement signal at each level of quality of service requested for wireless communication with the first communication device in order for a third communication device that performs wireless communication with the first communication device to measure interference given to the third communication device.

(16)

A communication device comprising:

a communication unit that performs wireless communication with a second communication device and a third communication device through in-band full-duplex (IBFD) communication using at least a part of resources of a same frequency and a same time or full duplex (FD) communication using the resources with at least one of the frequency or the time being different; and a control unit that receives, from the third communication device, measurement information regarding channel quality measured by the third communication device at each level of quality of service requested for the wireless communication with the third communication device on a basis of interference from the second communication device, and controls the communication unit to perform one of the IBFD communication or the FD communication with the second communication device and the third communication device on a basis of the measurement information.

(17)

A communication method comprising:

performing wireless communication with a first communication device that supports in-band full-duplex (IBFD) communication that transmits and receives wireless signals using at least a part of resources of a same frequency and a same time; and measuring channel quality with the first communication device at each level of quality of service requested for the wireless communication with the first communication device on a basis of interference from a second communication device that performs wireless communication with the first communication device.

(18)

A communication method comprising:

performing wireless communication with a first communication device that supports in-band full-duplex (IBFD) communication that transmits and receives wireless signals using at least a part of resources of a same frequency and a same time; and transmitting a measurement signal at each level of quality of service (QoS) requested for wireless communication with the first communication device in order for a third communication device that performs wireless communication with the first communication device to measure interference given to the third communication device.

(19)

A communication method comprising:

performing wireless communication with a second communication device and a third communication device through in-band full-duplex (IBFD) communication using at least a part of resources of a same frequency and a same time or full duplex (FD) communication using the resources with at least one of the frequency or the time being different;

receiving, from the third communication device, measurement information regarding channel quality measured by the third communication device at each level of quality of service requested for the wireless communication with the third communication device on a basis of interference from the second communication device; and performing one of the IBFD communication or the FD communication with the second communication device and the third communication device on a basis of the measurement information.

REFERENCE SIGNS LIST

100 BASE STATION DEVICE
200 TERMINAL DEVICE
300 RELAY DEVICE
400 MANAGEMENT DEVICE
11, 21 SIGNAL PROCESSING UNIT
13, 25 CONTROL UNIT

The invention claimed is:

1. A communication device comprising:

a transceiver that performs wireless communication with a first communication device that supports in-band full-duplex (IBFD) communication that transmits and receives wireless signals using at least a part of resources of a same frequency and a same time; and control circuitry that measures channel quality with the first communication device at each level of quality of service requested for the wireless communication with the first communication device on a basis of interference from a second communication device that performs wireless communication with the first communication device, wherein the control circuitry reports measurement information regarding the channel quality measured to the first communication device for the each level of the corresponding quality of service, and wherein the control circuitry reports, to the first communication device, reference measurement information that is the measurement information corresponding to a reference level among the levels of the quality of service, and offset measurement information indicating a difference between the measurement information corresponding to the level excluding the reference level and the reference measurement information.

2. The communication device according to claim 1, wherein the control circuitry measures the channel quality by using a resource allocated for the each level of the quality of service.

3. The communication device according to claim 1, wherein the control circuitry measures the channel quality by using a measurement signal allocated for the each level of the quality of service.

4. The communication device according to claim 3, wherein the measurement signal is a known signal transmitted by the second communication device with the quality of service at the level for measuring the channel quality.

5. The communication device according to claim 3, wherein the measurement signal is a known signal transmitted by the first communication device.

6. The communication device according to claim 1, wherein
the transceiver receives an instruction signal instructing measurement of the channel quality from the first communication device, and
when receiving the instruction signal, the control circuitry measures the channel quality at the level of the quality of service included in the instruction signal.

7. The communication device according to claim 1, wherein
the transceiver receives an instruction signal instructing measurement of the channel quality from the second communication device, and
when receiving the instruction signal, the control circuitry measures the channel quality at the level of the quality of service included in the instruction signal.

8. The communication device according to claim 1, wherein
the control circuitry measures the channel quality in response to a fluctuation in an environment in which the channel quality is measured.

9. The communication device according to claim 1, wherein the measurement information includes at least one of signal to interference plus noise ratio (SINR) information or information regarding an interference allowable amount.

10. The communication device according to claim 1, wherein the measurement information includes at least one of signal strength information regarding signal strength of a wireless signal transmitted by the first communication device or interference information regarding a wireless signal transmitted by the second communication device corresponding to the level of the quality of service.

11. The communication device according to claim 10, wherein the control circuitry reports the signal strength information and the interference information to the first communication device at respective different timings.

12. The communication device according to claim 1, wherein the measurement information includes IBFD information indicating whether or not the first communication device is capable of performing communication by the IBFD.

13. A communication method comprising:
performing wireless communication with a first communication device that supports in-band full-duplex (IBFD) communication that transmits and receives wireless signals using at least a part of resources of a same frequency and a same time; and
measuring channel quality with the first communication device at each level of quality of service requested for the wireless communication with the first communication device on a basis of interference from a second communication device that performs wireless communication with the first communication device,
wherein the method further comprises:
reporting measurement information regarding the channel quality measured to the first communication device for the each level of the corresponding quality of service, and
reporting to the first communication device, reference measurement information that is the measurement information corresponding to a reference level among the levels of the quality of service, and offset measurement information indicating a difference between the measurement information corresponding to the level excluding the reference level and the reference measurement information.

* * * * *